United States Patent
Yu et al.

(10) Patent No.: US 12,034,483 B2
(45) Date of Patent: Jul. 9, 2024

(54) OPTICAL CABLE FOR TRANSMISSION OF AUDIO AND VIDEO SIGNALS

(71) Applicant: WINGCOMM Co. Ltd., Nantong (CN)

(72) Inventors: Jianming Yu, Nantong (CN); Zuodong Wang, Beijing (CN); Wei Mao, Palo Alto, CA (US); Yun Bai, Beijing (CN)

(73) Assignee: WINGCOMM CO. LTD., Nantong (CN)

( * ) Notice: Subject to any disclaimer, the term of this patent is extended or adjusted under 35 U.S.C. 154(b) by 59 days.

(21) Appl. No.: 17/834,570

(22) Filed: Jun. 7, 2022

(65) Prior Publication Data
US 2022/0393763 A1 Dec. 8, 2022

(30) Foreign Application Priority Data
Jun. 8, 2021 (CN) .......................... 202110635897.5

(51) Int. Cl.
| H04B 10/25 | (2013.01) |
| H04B 10/2581 | (2013.01) |
| H04B 10/50 | (2013.01) |
| H04B 10/524 | (2013.01) |
| H04B 10/54 | (2013.01) |
| H04N 7/22 | (2006.01) |
| H04N 21/4363 | (2011.01) |

(52) U.S. Cl.
CPC ......... *H04B 10/2581* (2013.01); *H04B 10/25* (2013.01); *H04B 10/503* (2013.01); *H04B 10/524* (2013.01); *H04B 10/541* (2013.01); *H04N 7/22* (2013.01); *H04N 21/43632* (2013.01)

(58) Field of Classification Search
CPC ......... H04B 10/25; H04B 10/40; H04B 10/43
See application file for complete search history.

(56) References Cited

U.S. PATENT DOCUMENTS 5,959,293 A * 9/1999 Ishikawa ............... H04B 10/071
  385/12
2013/0287400 A1 * 10/2013 Hurwitz ............... H04M 11/025
  398/79

(Continued)

FOREIGN PATENT DOCUMENTS

WO   WO02/078218   * 10/2002   ............. H04B 10/50

*Primary Examiner* — Nathan M Cors
(74) *Attorney, Agent, or Firm* — David R. Stevens; Stevens Law Group

(57) ABSTRACT

Systems and methods for optical transmission of one-or-more out-of-band signals associated with audio-video signal communication are described. In one aspect, an optical receiver receives a first out-of-band electrical signal and a second out-of-band electrical signal from a video sink. The first out-of-band electrical signal may correspond to an audio-video stream previously received or concurrently being received from a video source optical transmitter at the optical receiver. The second out-of-band electrical signal may also correspond to the audio-video stream. The optical receiver may combine the first out-of-band electrical signal and the second out-of-band electrical signal into a transmit electrical signal. In one aspect, the optical receiver converts the transmit electrical signal into an optical signal, and transmits the optical signal to an optical transmitter via an optical communication channel.

22 Claims, 25 Drawing Sheets

(56) References Cited

U.S. PATENT DOCUMENTS

2015/0288448 A1* 10/2015 Masarik ................. H04B 10/40
398/117
2015/0311974 A1* 10/2015 Thompson ............. H04B 3/235
398/13

* cited by examiner

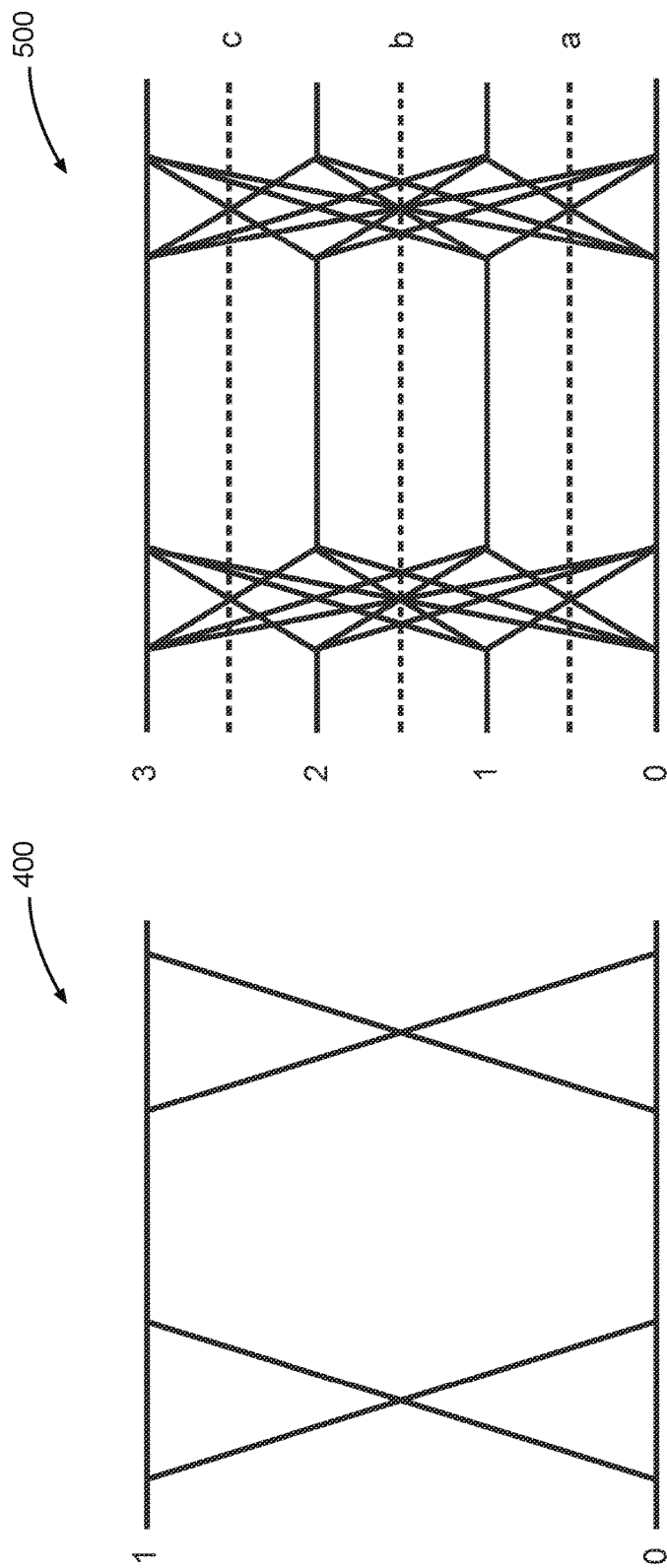
FIG. 4
FIG. 5
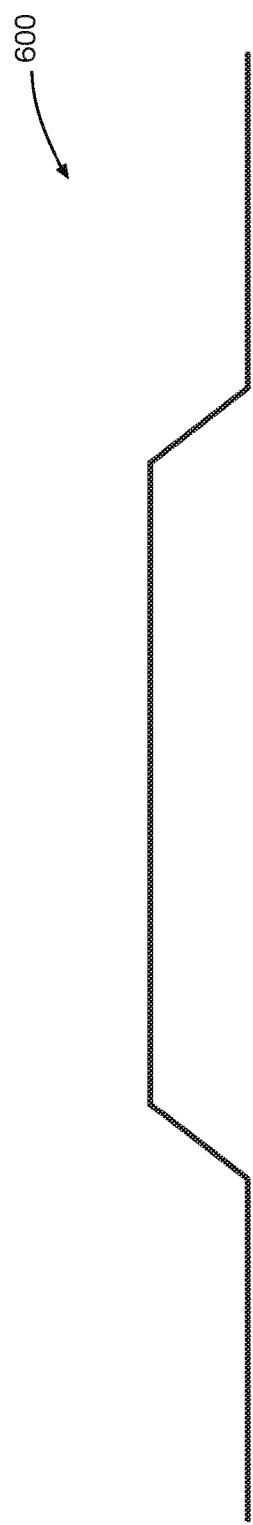
FIG. 6

OPTICAL CABLE FOR TRANSMISSION OF AUDIO AND VIDEO SIGNALS

CROSS-REFERENCE TO RELATED APPLICATION

This application claims the benefit of Chinese Application Serial No. 202110635897.5, filed Jun. 8, 2021, which is hereby incorporated herein by reference in its entirety.

RELATED APPLICATIONS

This application is related to U.S. application Ser. No. 17/834,536, filed Jun. 7, 2022, which is incorporated herein by reference for all purposes.

BACKGROUND

Technical Field

The present disclosure relates to systems and methods for transmitting audio and/or video signals via an optical communication channel.

Background Art

With the continuous development of display technology, display resolutions have been continuously improved, from high-definition resolutions of 720p to 1080p to the present ultra-high-definition display of 2k, 4k, or even 8k. Accordingly, the transmission rate of audio/video data ranges from 100 MHz to gigahertz, to several tens of gigahertz. For example, the transmission rate of HDMI 2.1 reaches 48 Gbps, while the theoretical maximum transmission bandwidth of DisplayPort 2.0 protocol reaches 80 Gbps.

Protocols such as the high-definition multimedia interface (HDMI) protocol, digital visual interface (DVI) protocol and DisplayPort (DP) protocol include one or more out-of-band signals besides audio/video data signals. For example, the HDMI and DVI protocols include serial data (SDA), serial clock (SCL) and hot plug detect (HPD) signals. Consumer electronics control (CEC), audio return channel (ARC) and enhanced audio return channel (eARC) out-of-band signals are included in the HDMI protocol. Auxiliary (AUX), configuration 1 (CONFIG1) and configuration 2 (CONFIG2) signals are included as out-of-band signals in the DP protocol. The reliable transmission of these out-of-band signals also plays an important role in the realization of high-speed audio/video transmission.

At present, the improvement of audio/video signal transmission speed is mainly limited by the low bandwidth and high loss of the associated transmission medium. Usually, this medium is a copper medium. Therefore, with the trend of increasing display resolution, copper-based transmission schemes for digital audio/video signals are limited with respect to transmission bandwidth, range, and maintaining signal integrity.

On the other hand, optical fiber transmission of high-speed signals has been widely used in the field of data communication, and the technologies of 25 G and 100 G optical modules and active cables are mature. At present, optical modules using PAM4 technology are being used for optical data transmission. The development of these technologies makes it possible to use optical fiber to transmit audio/video signals.

Past work to transmit digital audio/video signals and the associated out-of-band signals via an optical communication channel includes:

1. The optical module is used to convert audio/video signals into photoelectric electro-optical signals. The scheme uses serial-parallel and parallel-serial conversion to convert the electrical signals of audio/video protocols such as HDMI, DVI or DisplayPort into serial signals. This scheme has a low integration level, and needs to integrate additional serial-parallel and parallel-serial conversion circuits and optical modules, so it is difficult to obtain better results in terms of cable volume and system power consumption.

2. Four optical fibers are used to transmit audio/video signals as active cables for in HDMI, DVI or DisplayPort protocols. Other out-of-band signals are directly connected by copper wires. Out-of-band signals transmitted over long distances can be affected by electromagnetic interference, cable attenuation, cable delay mismatch and other factors, so it is difficult to realize cables at transmission distance of over ten meters. In addition, the scheme cannot realize lighter and easier-to-use active cables because it uses more copper wires.

3. In a HDMI, DVI or DisplayPort active optical cable, four optical fibers are used to transmit audio/video signals, and two optical fibers are used to transmit the out-of-band signals. This scheme uses optical fiber to transmit out-of-band signals on the basis of scheme 2, so that the length of active cable manufactured by this scheme can reach more than 100 meters. Because all signals are transmitted by optical fiber, the cable is light and flexible. The disadvantage of this scheme is that six lasers, six photodetectors and six optical fibers need to be used in the whole design, so the design and production complexity is high, and the manufacturing yield of the whole system is difficult to guarantee. In addition, due to the use of six photoelectric and electro-optical conversion channels, the power consumption of this scheme is relatively high.

SUMMARY

Aspects of the invention are directed to systems and methods for implementing an optical connector that connects a source of one or more audio-video signals to an audio-video signal sink via an optical communication channel.

One method includes an optical transmitter receiving a plurality of audio-video electrical signals at an optical transmitter. The optical transmitter may also receive a plurality of out-of-band electrical signals. The optical transmitter may collectively modulate the audio-video electrical signals to generate a composite electrical signal, and bias current-modulate an average power level of the composite electrical signal using the electrical out-of-band signals. In one aspect, the optical transmitter generates a modulated electrical signal based on the bias current-modulating, and converts the modulated electrical signal into a modulated optical signal using a laser diode. The optical transmitter may transmit the modulated optical signal to an optical receiver over an optical communication channel.

In one aspect, an optical receiver receives a modulated optical signal over an optical communication channel. The modulated optical signal may collectively represent a composite electrical signal of a one or more audio-video signals and one or more out-of-band signals. The optical receiver can convert the modulated optical signal into a modulated electrical signal, and perform an average power detection on the modulated electrical signal. In one aspect, the optical receiver extracts the one or more out-of-band electrical signals from the modulated electrical signal based on the average power detection. The optical receiver may extract the one or more audio-video electrical signals from the modulated electrical signal.

One method includes an optical receiver receiving a first out-of-band electrical signal and a second out-of-band electrical signal from a video sink. The first out-of-band electrical signal may correspond to an audio-video stream previously received or concurrently being received from a video source optical transmitter at the optical receiver. The second out-of-band electrical signal may also correspond to the audio-video stream. In one aspect, the optical receiver combines the first out-of-band electrical signal and the second out-of-band electrical signal into a transmit electrical signal. The optical receiver can convert the transmit electrical signal into an optical signal, and transmit the optical signal to an optical transmitter via an optical communication channel.

In one aspect, an optical transmitter receives an optical signal from an optical receiver over an optical communication channel. The optical signal may be comprised of a first out-of-band signal and a second out-of-band signal. The first out-of-band signal may correspond to an audio-video stream transmitted by the optical transmitter, and the second out-of-band signal may correspond to the audio-video stream. In one aspect, the optical transmitter converts the optical signal into a receive electrical signal. The optical transmitter may extract a first out-of-band electrical signal corresponding to the first out-of-band signal and a second out-of-band electrical signal corresponding to the second out-of-band signal from the receive electrical signal. In one aspect, the optical transmitter transmits the first out-of-band electrical signal and the second out-of-band electrical signal to a video source.

Aspects include apparatuses that implement the described methods.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 4 is a waveform diagram depicting a non-return to zero (NRZ) waveform.

FIG. 5 is a waveform diagram depicting a pulse-amplitude modulated (PAM) waveform.

FIG. 6 is a waveform diagram depicting an out-of-band signal.

DETAILED DESCRIPTION

Figure 1:
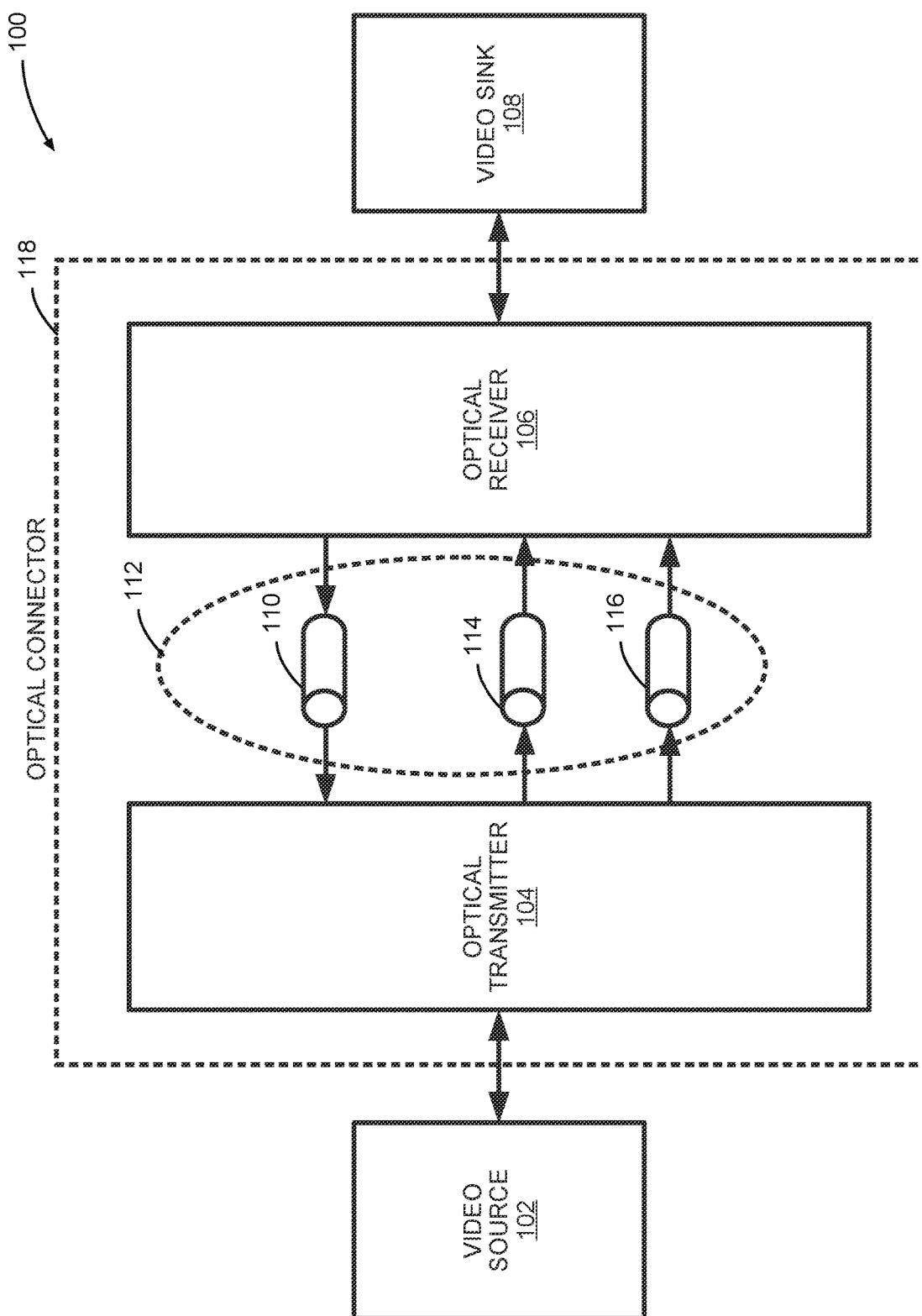
FIG. 1 is a block diagram depicting an embodiment of an optical connector interface.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein address the limitations associated with transmitting digital audio/video signals and associated out-of-band signals over copper conductors or over one or more optical communication channels. One aspect provides an all-optical transmission method for audio/video protocol signals, which solves the problems associated with the prior art, uses high-order pulse amplitude modulation for optical fiber transmission of high-speed audio/video signals, and uses laser bias current modulation for transmission of out-of-band signals. This solution allows realizing high bandwidth, low cost, low delay, high reliability, high compatibility and long transmission distance.

In one aspect, an audio/video signal transmission method uses advanced pulse amplitude modulation (PAM) to transmit (digital) audio/video signals and bias current modulation of lasers to transmit out-of-band signals. High-order pulse amplitude modulation of high-speed audio/video signals and laser bias modulation of out-of-band signals form a multi-dimensional modulation mode of optical signals, which:

Reduces the number of lasers, photodetectors and optical fibers used by the system,
Reduces the design and production complexity, and
Improves the production yield of audio/video active cables.

At the same time, because the number of optical fiber channels is reduced, the weight of the cable is reduced compared to contemporary cables, and the cable can be lighter and more flexible. In one aspect, the audio/video signal transmission method uses a small number of channels to transmit signals. The associated transmission distance may be more than 100 meters while ensuring error-free transmission. In addition, power consumption may be much smaller than that of the contemporary scheme of using 6 optical fibers to transmit audio/video signals and out-of-band signals.

FIG. 1 is a block diagram depicting an embodiment of an optical connector interface 100. As depicted, optical connector interface 100 includes video source 102, optical connector 118, and video sink 108. Optical connector 118 further includes optical transmitter 104, optical receiver 106, and optical communication channel 112. Optical communication channel 112 may further include optical communication channel 110, optical communication channel 114, and optical communication channel 116. In one aspect, each of optical communication channel 110, 114, and 116 is a unidirectional optical communication channel comprised of one or more optical fibers.

In one aspect, video source 102 is a source of digital audio-video data, such as HDMI data, DVI data, or DP data. Video source 102 may be any of a desktop computer, a laptop computer, a set top box, a video game console, a DVD player, a Blu Ray player, a digital signal processor, or any other source of digital audio-video data. As presented herein, a combination of digital audio signals and digital video signals communicated by a digital video source to a digital video sink may be described by the terms "audio-video signals," or "audio/video signals."

In one aspect, video sink 108 is a sink for digital audio-video data, such as HDMI data, DVI data, or DP data. Video sink 108 may be any of a television, a computer monitor, a liquid crystal display (LED), an organic light emitting diode display (OLED), or some other digital audio-video data sink.

In one aspect, optical transmitter 104 receives one or more digital audio-video signals from video source 102. These digital audio-video signals may include one or more high-speed audio-video electrical signals and one or more out-of-band electrical signals that are transmitted at a lower bandwidth as compared to the high-speed audio-video electrical signals. In one aspect, each high-speed audio-video electrical signal may be in a non-return to zero (NRZ)

format. Optical transmitter may combine one or more high-speed audio-video electrical signals in groups to generate one or more modulated high-speed audio-video electrical signals. In one aspect, a modulated high-speed audio-video electrical signal includes one or more high-speed audio-video electrical signals modulated using pulse-amplitude modulation (PAM). For example, 4-level PAM (PAM4), or 8-level PAM (PAM8), or even higher PAM modulation levels may be used when generating a modulated high-speed audio-video signal.

Optical transmitter 104 may convert the modulated high-speed audio-video electrical signals and the out-of-band electrical signals into one or more modulated optical signals. In one aspect, a modulated optical signal is an optical signal that is comprised of one of more high-speed audio-video signals modulated in a pulse-amplitude modulation format, with the out-of-band signals modulating an average optical power of the pulse-amplitude modulated high-speed audio-video signals. In one aspect, one or more laser diodes and associated circuitry are used to generate the modulated optical signals. Examples of laser diodes used to generate the modulated optical signals include vertical cavity surface-emitting lasers (VCSELs), and other kinds of laser diodes. Optical transmitter 104 may transmit the modulated optical signals to an optical receiver over optical communication channels 114 and 116.

In one aspect, optical transmitter 104 receives one or more modulated out-of-band optical signals from an optical receiver (e.g., optical receiver 106) via optical communication channel 110. Optical transmitter may convert these out-of-band optical signals to a corresponding set of modulated out-of-band electrical signals. This conversion may be performed a photoelectric conversion circuit that may be comprised of one or more photodetectors.

Optical transmitter 104 may include a demodulation circuit that demodulates the modulated out-of-band electrical signals to generate one or more out-of-band electrical signals. These out-of-band electrical signals are transmitted to video source 102.

Optical receiver 106 may receive the modulated optical signals over optical communication channels 114 and 116. In one aspect, optical receiver 106 includes one or more photoelectric conversion circuits that convert the received modulated optical signals into corresponding modulated electrical signals. In one aspect, the photoelectric conversion circuits are comprised of one or more photodetectors or photodetector arrays.

In one aspect, the modulated electrical signals are demodulated by one or more demodulation circuits. Each demodulation circuit:
  Extracts an out-of-band electrical signal from the associated modulated electrical signal,
  Extracts a modulated high-speed audio-video electrical signal from the associated modulated electrical signal, and
  Extracts one or more high-speed audio-video electrical signals from the modulated high-speed audio-video signal.

In one aspect, extracting the one or more high-speed audio-video electrical signals may include converting the modulated high-speed audio-video electrical signal from a PAM modulation format to one or more high-speed audio-video electrical signals, with each high-speed audio-video electrical signal being in an NRZ format.

Optical receiver 106 may transmit the out-of-band electrical signals and the high-speed audio-video electrical signals to video sink 108.

In one aspect, optical receiver 106 receives one or more out-of-band electrical signals from video sink 108. Optical receiver 106 may convert these out-of-band electrical signals may modulate the out-of-band electrical signals to generate one or more modulated out-of-band electrical signals. These modulated out-of-band electrical signals may be converted into out-of-band optical signals by one or more electro-optical conversion circuits, and transmitted to optical transmitter 104 via optical communication channel 110. In one aspect, electro-optical the conversion circuits may include one or more laser diodes.

Optical connector 118 may be used to connect a digital audio-video source (e.g., video source 102) to a digital audio-video sink (e.g., video sink 108). Examples of digital video sources include HDMI sources, DP sources and DVI sources. Optical connector 118 enables connecting video source 102 to video sink 108 via optical communication link 112.

Figure 2:
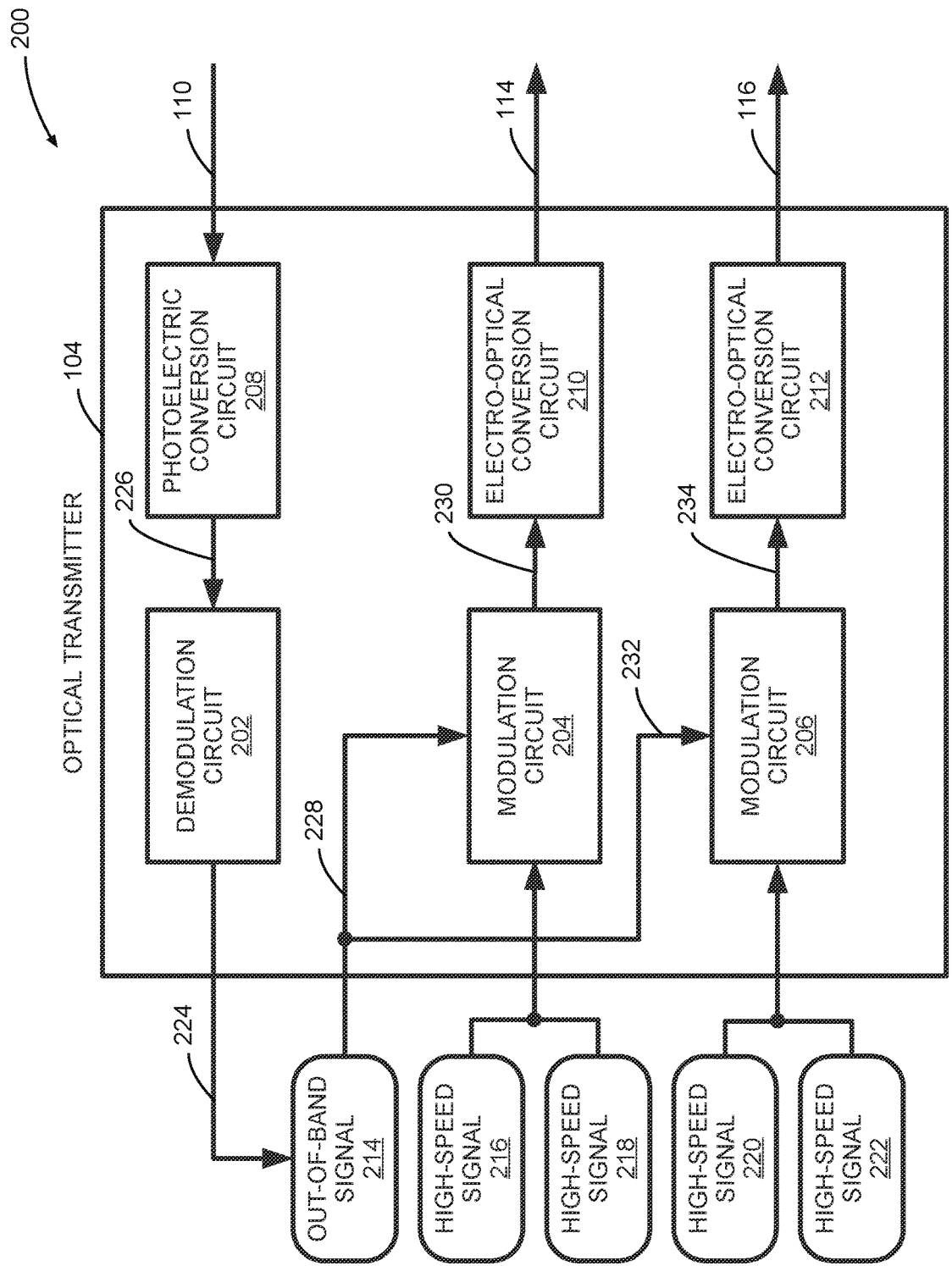
FIG. 2 is a block diagram depicting an embodiment of an optical transmitter interface.

FIG. 2 is a block diagram depicting an embodiment of an optical transmitter interface 200. As depicted, optical transmitter interface 200 includes optical transmitter 104, and optical communication channels 110, 114, and 116. Optical transmitter 104 further includes demodulation circuit 202, modulation circuit 204, modulation circuit 206, photoelectric conversion circuit 208, electro-optical conversion circuit 210, and electro-optical conversion circuit 212. FIG. 2 depicts an embodiment of an internal architecture of optical transmitter 104.

In one aspect, optical transmitter 104 receives one or more out-of-band electrical signals as out-of-band signal 214, from video source 102. Out-of-band signal 214 may be comprised of one or more out-of-band electrical signals (e.g., out-of-band signals 228 and 232). Optical transmitter 104 may also receive one or more high-speed audio-video electrical signals from video source 102. For example, optical transmitter 104 may receive high-speed signal 216, high-speed signal 218, high-speed signal 220, and high-speed signal 222, from video source 102. In one aspect, each of high-speed signal 216 through 222 is a high-speed audio-video electrical signal (i.e., a high-speed digital audio-video signal). In one aspect, each of high-speed signal 216 through 222 is an NRZ digital audio-video signal.

In one aspect, high-speed signals 216 and 218 are input to modulation circuit 204. High-speed signals 220 and 222 may be input to modulation circuit 206. One or more out-of-band signals 228 from out-of-band signal 214 may be input to modulation circuit 204. One or more out-of-band signals 232 from out-of-band signal 214 may be input to modulation circuit 206.

Modulation circuit 204 may be configured to:
  Modulate high-speed signals 216 and 218 to generate a modulated high-speed audio-video electrical signal,
  Perform an average power modulation on the modulated high-speed audio-video electrical signal based on out-of-band signals 228, and
  Generate a modulated electrical signal 230 comprising the modulated high-speed audio-video electrical signal with an average power modulation that is determined by out-of-band signal 228.

The modulated electrical signal 230 generated by modulation circuit 204 may be transmitted to electro-optical conversion circuit 210. Electro-optical conversion circuit 210 may convert the modulated electrical signal 230 to a modulated optical signal, and transmit the modulated optical signal over optical communication channel 114, to optical receiver 106. In one aspect, electro-optical conversion circuit 210 may be comprised of one or more laser diodes, or one or more arrays of laser diodes.

Modulation circuit 206 may be configured to:

Modulate high-speed signals 220 and 222 to generate a modulated high-speed audio-video electrical signal, Perform an average power modulation on the modulated high-speed audio-video electrical signal based on out-of-band signals 232, and Generate a modulated electrical signal 234 comprising the modulated high-speed audio-video electrical signal with an average power modulation that is determined by out-of-band signal 232.

The modulated electrical signal 234 generated by modulation circuit 206 may be transmitted to electro-optical conversion circuit 212. Electro-optical conversion circuit 212 may convert the modulated electrical signal 234 to a modulated optical signal, and transmit the modulated optical signal over optical communication channel 116, to optical receiver 106. In one aspect, electro-optical conversion circuit 210 may be comprised of one or more laser diodes, or one or more arrays of laser diodes.

In one aspect, optical transmitter 104 receives one or more modulated out-of-band optical signals over optical communication channel 110, from optical receiver 106. These modulated out-of-band optical signals may be received by photoelectric conversion circuit 208. Photoelectric conversion circuit 208 may be comprised of one or more photodetectors, or one or more arrays of photodetectors. In one aspect, photoelectric conversion circuit 208 converts the modulated out-of-band optical signals into a corresponding set of modulated out-of-band electrical signals 226. Demodulation circuit 202 demodulates the modulated out-of-band electrical signals 226, and generates one or more out-of-band electrical signals 224 that are transmitted to video source 102 as out-of-band signal 214.

Figure 3:
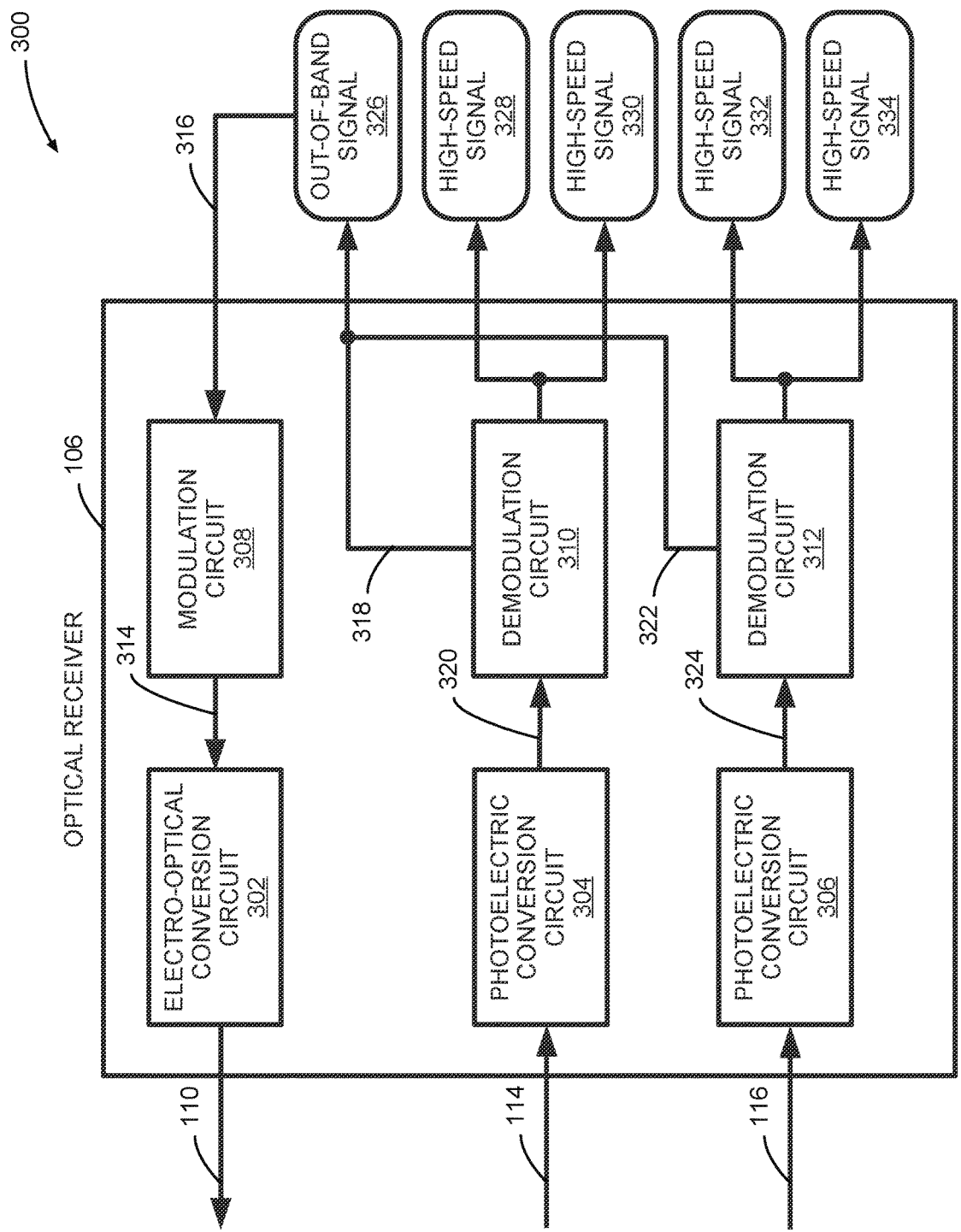
FIG. 3 is a block diagram depicting an embodiment of an optical receiver interface.

FIG. 3 is a block diagram depicting an embodiment of an optical receiver interface 300. As depicted, optical receiver interface 300 includes optical receiver 106, and optical communication channels 110, 114, and 116. Optical receiver 106 further includes modulation circuit 308, demodulation circuit 310, demodulation circuit 312, electro-optical conversion circuit 302, photoelectric conversion circuit 304, and photoelectric conversion circuit 306. FIG. 3 depicts an embodiment of an internal architecture of optical receiver 106.

In one aspect, optical receiver 106 receives one or more modulated optical signals via optical communication channels 114 and 116. Each modulated optical signal may be comprised of one or more high-speed signals (i.e., high-speed audio-video signals) that are modulated using a PAM modulation scheme, further average-power-modulated by one or more out-of-band signals.

In one aspect, the modulated optical signal received via optical communication channel 114 is received by photoelectric conversion circuit 304, which converts the modulated optical signal into a modulated electrical signal 320. Photoelectric conversion circuit 304 may be comprised of one or more photodetectors, or one or more arrays of photodetectors. Demodulation circuit 310 receives the modulated electrical signal 320, and extracts out-of-band signal 318, high-speed signal 328, and high-speed signal 330 from modulated electrical signal 320. In one aspect, out-of-band signal 318 is similar to out-of-band signal 228; high-speed signal 328 is similar to high-speed signal 216; and high-speed signal 330 is similar to high-speed signal 218.

In one aspect, the modulated optical signal received via optical communication channel 116 is received by photoelectric conversion circuit 306, which converts the modulated optical signal into a modulated electrical signal 324. Photoelectric conversion circuit 306 may be comprised of one or more photodetectors, or one or more arrays of photodetectors. Demodulation circuit 312 receives the modulated electrical signal 324, and extracts out-of-band signal 322, high-speed signal 332, and high-speed signal 334 from modulated electrical signal 324. In one aspect, out-of-band signal 322 is similar to out-of-band signal 232; high-speed signal 332 is similar to high-speed signal 220; and high-speed signal 334 is similar to high-speed signal 222.

In one aspect, out-of-band signal 318 and out-of-band signal 322 may be combined to generate out-of-band signal 326. Out-of-band signal 326, and high-speed signals 328 through 334 are all electrical signals that may be transmitted to video sink 108.

In one aspect, modulation circuit 308 receives an out-of-band signal electrical signal 316 from out-of-band signal 326. Modulation circuit 308 may modulate out-of-band electrical signal 316 using, for example, time-division multiplexing. Modulation circuit 308 outputs a modulated out-of-band electrical signal 314, that is received by electro-optical conversion circuit 302. Electro-optical conversion circuit 302 may be comprised of one or more laser diodes, or one or more arrays of laser diodes. Electro-optical conversion circuit 302 may convert modulated out-of-band electrical signal 314 to a modulated out-of-band optical signal and transmit this modulated out-of-band optical signal to optical transmitter 104 via optical communication channel 110. In one aspect, out-of-band signal 326 is comprised of out-of-band signals 318 and 322.

In one aspect, optical connector 118 implements an all-optical transmission circuit for digital audio/video signals and out-of-band signals that includes a transmitter module (i.e., optical transmitter 104) and a receiving end module (i.e., optical receiver 106).

In one aspect, the transmitting end module comprises a high-speed audio/video signal modulation circuit and an out-of-band signal modulation circuit, wherein the high-speed audio/video signal modulation circuit modulates the high-speed audio/video signals into the modulation signals of the laser in a high-order pulse amplitude modulation mode; the out-of-band signal modulation circuit modulates the out-of-band signals into the bias current signals of the laser.

In one aspect, the receiving end module comprises a high-speed audio/video signal demodulation circuit and an out-of-band signal demodulation circuit, where the high-speed audio/video signal demodulation circuit modulates and demodulates the high-speed audio/video signals from high-order pulse amplitude back to NRZ coding, and transmits them to the display end. In the out-of-band signal demodulation circuit, an average optical power detection circuit is used to separate out-of-band signals and transmit them to the display end (i.e., video sink 108). In one aspect, the laser driving circuit at the transmitting end (e.g., electro-optical conversion circuit 210) acts as a linear drive, and does not perform amplitude-limiting amplification on the signals to ensure that the eye diagram is not distorted.

The source end (e.g., video source 102) is connected with the transmitting end, and the receiving end is connected with the display device end (e.g., video sink 108). The transmitting end performs high-order pulse amplitude modulation (PAM4 or PAM8 modulation) on the high-speed audio-video signals (NRZ coding) at the source end to modulate the modulation current of the laser, and also modulates the out-of-band signals at the source end to the bias current of the laser. This allows a simultaneous transmission of the high-speed audio-video signal(s) and the out-of-band signals in one optical path (e.g., optical communication channel 114). The modulated signals are transmitted to a receiving end through an optical path, and the receiving end detects the out-of-band signals through an average optical power detection circuit and demodulates the high-order pulse amplitude modulated signals into one or more NRZ signals. The NRZ signals are output to a video sink (e.g., video sink 108).

Since the out-of-band signals in each audio and video transmission protocol are bidirectional communication signals, the all-optical transmission method provided by the invention needs another path for transmitting the out-of-band signals from the receiving end to the transmitting end. This is accomplished by optical communication channel and the corresponding transmit and receive components in optical receiver 106 and optical transmitter 104, respectively. In one aspect, modulation circuit 308 at the receiving end modulates the out-of-band signal by high-order pulse amplitude modulation or time division multiplexing, and then converts the modulated signals into an optical signal and transmits them to the transmitting end. The transmitting end converts the optical signals into electrical signals, demultiplexes or demodulates them (using, for example, demodulation circuit 202) to obtain the out-of-band signals, and transmits them to the source end.

FIG. 4 is a waveform diagram depicting a non-return to zero (NRZ) waveform 400. As depicted, NRZ waveform 400 is a binary waveform that takes either of two voltage levels—0 (i.e., zero or low voltage) or 1 (i.e., high voltage, e.g. 1.8V, 3.3V, or 5V). In one aspect, signals such as high-speed signal 216, high-speed signal 218, high-speed signal 220, and high-speed signal 222 is an NRZ waveform (signal).

FIG. 5 is a waveform diagram depicting a pulse-amplitude modulated (PAM) waveform 500. As depicted, PAM waveform 500 has four signal levels—0, 1, 2, and 3, representing a PAM4 modulation scheme. Three threshold levels, a, b, and c, are set as decision levels when modulating PAM waveform 500. These threshold levels (also referred to as "decision thresholds") are used as decision levels when demodulating PAM waveform 500. Specifically:

If PAM waveform 500 has a signal level less than a, then the receiver determines that the encoded symbol is 0.
If PAM waveform 500 has a signal level greater than a but less than b, then the receiver determines that the encoded symbol is 1.
If PAM waveform 500 has a signal level greater than b but less than c, then the receiver determines that the encoded symbol is 2.
If PAM waveform 500 has a signal level greater than c, then the receiver determines that the encoded symbol is 3.

PAM waveform 500 supports four encoded symbols—0, 1, 2, 3. In one aspect, PAM waveform 500 may be synthesized as a combination of two NRZ waveforms. Together, two NRZ waveforms can map to maximum of four possible symbols—(0, 0), (0, 1), (1, 0), and (1, 1). These symbols are mapped to encoded symbols 0, 1, 2, and 3, respectively.

FIG. 6 is a waveform diagram depicting an out-of-band signal 600. As depicted, out-of-band signal 600 is a binary signal that has a lower bandwidth as compared to NRZ waveform 500 or PAM waveform 600. Examples of out-of-band signal 600 include out-of-band signals 224, 228, and 232.

Figure 7:
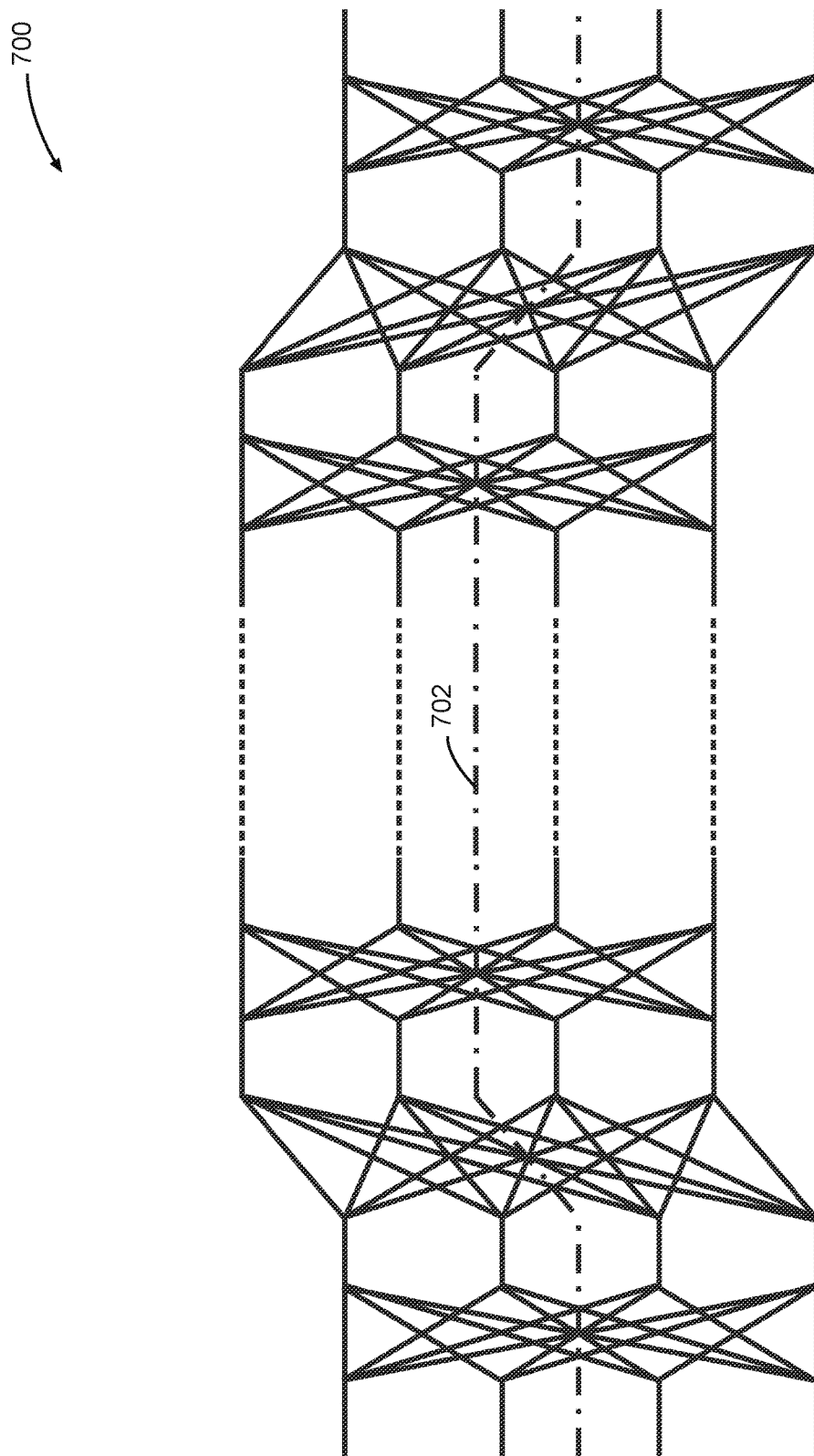
FIG. 7 is a waveform diagram depicting a modulated signal.

FIG. 7 is a waveform diagram depicting a modulated signal 700. As depicted, modulated signal may include an out-of-band signal (e.g., out-of-band signal 600) modulating an average optical power 702 of a PAM waveform (e.g., PAM waveform 500). Examples of modulated signal 700 include modulated electrical signals 230 and 234.

Figure 8:
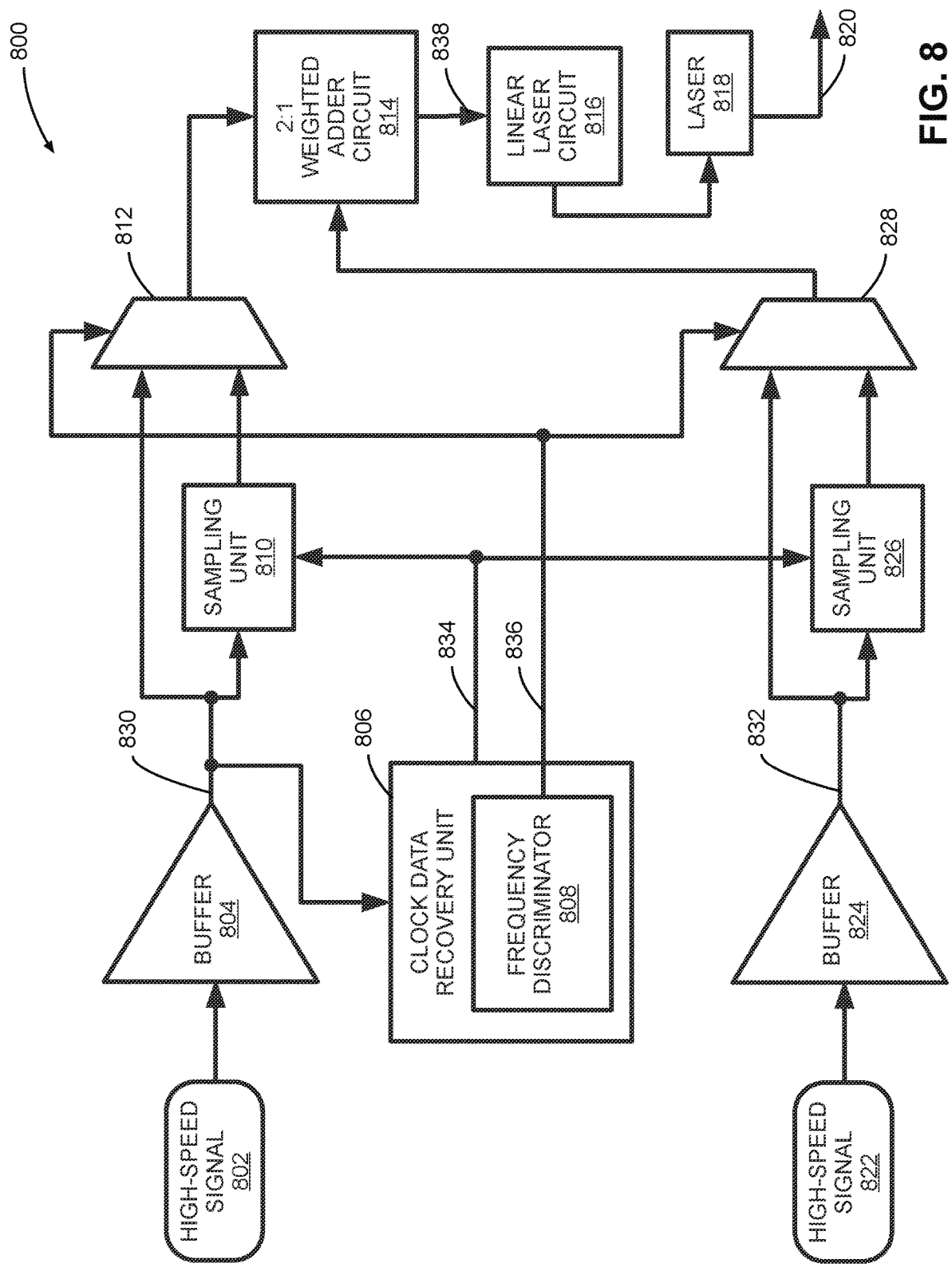
FIG. 8 is a block diagram depicting an embodiment of a high-speed modulation circuit.

FIG. 8 is a block diagram depicting an embodiment of a high-speed modulation circuit 800. As depicted, high-speed modulation circuit 800 includes buffer 804, buffer 824, clock data recovery unit 806, frequency discriminator 808, sampling unit 810, sampling unit 826, selection switch 812, selection switch 828, 2:1 weighted adder circuit 814, linear laser circuit 816, and laser 818.

In one aspect, high-speed modulation circuit 800 receives high-speed signal 802 and high-speed signal 822. High-speed signals 802 and 822 may be high-speed audio-video electrical signals (e.g., similar to high-speed signals 216 and 218, or high-speed signals 220 and 222, respectively). Each of high-speed signal 802 and 822 may be an electrical NRZ signal similar to NRZ waveform 400. High-speed modulation circuit 800 may combine high-speed signals 802 and 822 to generate a PAM4 optical signal.

In one aspect, buffer 804 provides amplification and signal conditioning to high-speed signal 804 to generate conditioned signal 830. The signal conditioning may include amplification and/or bandwidth compensation. Buffer 824 may provide amplification and signal conditioning to high-speed signal 822 and generate conditioned signal 832. The signal conditioning may include amplification and/or bandwidth compensation. In one aspect, each of conditioned signal 830 and conditioned signal 832 is an electrical NRZ signal.

Conditioned signal 830 may be transmitted from buffer 804 to clock data recovery circuit 806, sampling unit 810, and selection switch 812. Conditioned signal 832 may be transmitted to sampling unit 826 and selection switch 828.

In one aspect, clock data recovery unit 806 is configured to sample conditioned signal 830, and extract a clock signal 834 (i.e., a sampling clock) synchronized with conditioned signal 830 (i.e., synchronized with high-speed signal 802). Clock data recovery unit 806 may output clock signal 834 to sampling unit 810 and sampling unit 826. Each of sampling unit 810 and 826 may use clock signal 834 to sample conditioned signal 830 and conditioned signal 832, respectively.

In one aspect, frequency discriminator 808 may be a switching source for each of selection 812 and selection switch 828, using switching signal 836. This switching enables high-speed modulation circuit 800 to switch between a low-bandwidth communication mode and high-bandwidth communication mode with error-correction signals. In one aspect, frequency discriminator 808 distinguishes between low-bandwidth and high-bandwidth audio/video signals based on analyzing conditioned signal 830, and accordingly switches between the low-bandwidth communication mode and the high-bandwidth communication mode.

In a low-bandwidth communication mode, selection 812 and selection switch 828 may be switched by frequency discriminator 808 so that conditioned signal 830 and conditioned signal 832 are directly transmitted to 2:1 weighted adder circuit 814, respectively. 2:1 weighted adder circuit 814 may combine (e.g., weight and add) conditioned signal 830 and conditioned signal 832 to generate a PAM4 electrical signal 838. PAM4 electrical signal 838 may be similar to PAM waveform 500. Linear laser circuit 816 uses PAM4 electrical signal 838 to drive laser 818. Laser 818 generates a PAM4 optical signal 820. PAM4 optical signal 820 may be transmitted over an optical communication channel such as an optical fiber.

In a high-bandwidth communication mode with error-correction signals, selection switch 812 and selection switch 828 may be switched by frequency discriminator 808 so that the outputs from sampling unit 810 and sampling unit 818 are transmitted to 2:1 weighted adder circuit 814, respectively. 2:1 weighted adder circuit 814 may combine (e.g., weight and add) these two signals to generate PAM4 electrical signal 838. PAM4 electrical signal 838 may be similar to PAM waveform 500. Linear laser circuit 816 uses PAM4 electrical signal 838 to drive laser 818. Laser 818 generates a PAM4 optical signal 820. PAM4 optical signal 820 may be transmitted over an optical communication channel such an optical fiber.

High-speed modulation circuit 800 can be used to convert high-speed signals into an optical PAM signal that can be transmitted over an optical communication channel. High-speed modulation circuit 800 may be used in conjunction with an out-of-band signal to generate a modulated (electrical or optical) signal.

In one aspect, high-speed signals 802 and 822 respectively pass through buffers 804 and 824 for bandwidth compensation. Conditioned signal 830 output from buffer 804 is transmitted to clock data recovery unit 806. Clock data recovery unit 806 extracts clock signal 834 (i.e., a sampling clock) synchronized with high-speed signal 802. Conditioned signals 830 and 832 are sampled by sampling unit 810 and 826, respectively. The outputs of sampling unit 810 and 826 may be weighted and added by 2:1 weighted adder circuit 814 with a weight of 2:1 to obtain PAM4 electrical signal 838. PAM4 electrical signal 838 may be modulated onto a modulation current of laser 818 by laser linear driving circuit 816.

In one aspect, selection switch 812 and selection switch 828 can alternatively directly output conditioned signal 830 and conditioned signal 832, respectively, to 2:1 weighted adder circuit 814 without sampling by the clock signal 810. This signal path is mainly used for signal transmission without error codes without using a clock recovery circuit (i.e., clock data recovery unit 806) under the condition that the bandwidth of the audio and video signal is relatively low. In such a case, a path without sampling units 810 and 826 can be selected for signal transmission. In this mode, clock data recovery unit 806, and sampling units 810 and 826 may be turned off to save power consumption.

In one aspect, high-speed signal communication using a signal path that includes sampling units 810 and 826 versus a low-bandwidth communication using a path that does not include sampling units 810 and 826 may be automatically switched by judging the communication speed by frequency discriminator 808.

In one aspect, PAM8 modulation can be used for modulation, so that three high-speed signals (i.e., three high-speed NRZ signals) can be transmitted over a single optical communication channel. To enable PAM8 modulation, 2:1 weighted adder circuit 814 may be replaced by a 1:2:4 weighted adder circuit. Higher order pulse amplitude modulation methods such as PAM16 and PAM32 are may also be used, at the expense of a corresponding increase in circuit complexity with the increase in modulation order.

Figure 9:
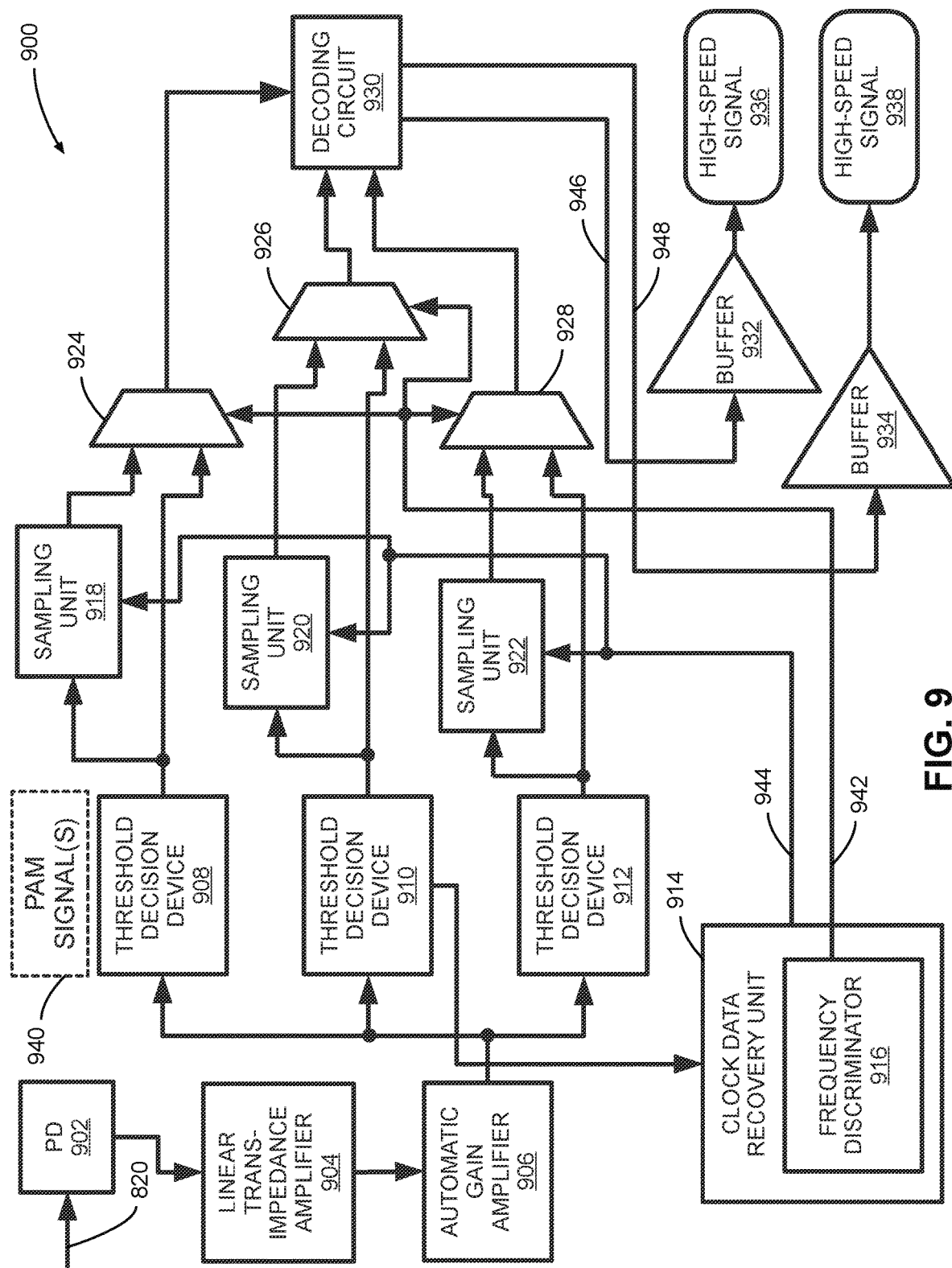
FIG. 9 is a block diagram depicting an embodiment of a high-speed demodulation circuit.

FIG. 9 is a block diagram depicting an embodiment of a high-speed demodulation circuit 900. As depicted, high-speed demodulation circuit 900 includes photodetector PD 902, linear transimpedance amplifier 904, automatic gain amplifier 906, threshold decision device 908, threshold decision device 910, threshold decision device 912, clock data recovery unit 914, frequency discriminator 916, sampling unit 918, sampling unit 920, sampling unit 922, selection switch 924, selection switch 926, selection switch 928, decoding circuit 930, buffer 932, and buffer 934.

In one aspect, PD 902 receives PAM4 optical signal 820, and converts this signal into a PAM4 electrical signal. The PAM4 electrical signal output by PD 902 is linearly amplified by linear amplifier 904. Automatic gain amplifier 906 provides amplitude control on the linearly amplified electrical signal. Automatic gain amplifier 906 may output a conditioned PAM4 electrical signal (PAM signal(s)) 940.

In one aspect, conditioned PAM4 electrical signal 940 is routed to each of threshold decision device 908, threshold decision device 910, and threshold decision device 912. Each of threshold detection device 908 through 912 may be configured to detect whether conditioned PAM4 electrical signal 940 is greater than a certain threshold. For example, using the three threshold levels a, b and c depicted in FIG. 5:

Threshold decision device 908 can detect whether an amplitude of conditioned PAM4 electrical signal 940 is greater than or less than threshold level a. If the amplitude of conditioned PAM4 electrical signal 940 is less than a, then threshold decision device 908 outputs a logic 0 signal. If the amplitude of conditioned PAM4 electrical signal 940 is greater than a, then threshold decision device 908 outputs a logic 1 signal.

Threshold decision device 910 can detect whether an amplitude of conditioned PAM4 electrical signal 940 is greater than or less than threshold level b. If the amplitude of conditioned PAM4 electrical signal 940 is less than b, then threshold decision device 910 outputs a logic 0 signal. If the amplitude of conditioned PAM4 electrical signal 940 is greater than b, then threshold decision device 910 outputs a logic 1 signal.

Threshold decision device 912 can detect whether an amplitude of conditioned PAM4 electrical signal 940 is greater than or less than threshold level c. If the amplitude of conditioned PAM4 electrical signal 940 is less than c, then threshold decision device 912 outputs a logic 0 signal. If the amplitude of conditioned PAM4 electrical signal 940 is greater than c, then threshold decision device 912 outputs a logic 1 signal.

Automatic gain amplifier 906 can accordingly adjust amplification levels so that conditioned PAM4 electrical signal 940 is within the appropriate signal limits and conforms to the appropriate threshold levels of a, b, and c. Collectively, the three outputs of threshold decision devices 912, 910, and 908 respectively may be referred to as a "temperature code." Essentially, each of threshold decision device 912, 910, and 908 outputs a binary signal. A temperature code is the three-bit word with the binary signal of threshold decision device 912 as the most-significant bit (MSB) and the binary signal of threshold decision device 908 as the least-significant bit (LSB).

Referring to the four signal amplitude levels 0, 1, 2, and 3 in FIG. 5:

If conditioned PAM4 electrical signal 940 is less than a, then threshold decision devices 912, 910, and 908 output a temperature code of 000, respectively. This corresponds to a signal amplitude of 0.

If conditioned PAM4 electrical signal 940 is greater than a but less than b, then threshold decision devices 912, 910, and 908 output a temperature code of 001, respectively. This corresponds to a signal amplitude of 1.

If conditioned PAM4 electrical signal 940 is greater than b but less than c, then threshold decision devices 912, 910, and 908 output a temperature code of 011, respectively. This corresponds to a signal amplitude of 2.

If conditioned PAM4 electrical signal 940 is greater than c, then threshold decision devices 912, 910, and 908 output a temperature code of 111, respectively. This corresponds to a signal amplitude of 3.

In one aspect:

The output signal generated by threshold decision device 908 is output to sampling unit 918 and to selection switch 924.

The output signal generated by threshold decision device 910 is output to sampling unit 920, to selection switch 926, and to clock data recovery unit 914.

The output signal generated by threshold decision device 912 is output to sampling unit 922 and to selection switch 928.

Clock data recovery unit 914 can use the signal output by threshold decision device 910 to determine whether PAM4 optical signal 820 is associated with a high-bandwidth communication mode or a low-bandwidth communication mode. If PAM4 optical signal 820 is associated with a low-bandwidth communication mode, then a switching signal 942 output by frequency discriminator 916 switches selection switches 924, 926, and 928 to transmit the signals directly output by threshold decision devices 908, 910, and 912, respectively. The outputs of selection switches 924, 926, and 928 are transmitted to decoding circuit 930. In this case, decoding circuit 930 receives the direct outputs from threshold decision devices 908, 910, and 912, via selection switches 924, 926, and 928, respectively. At the same time, sampling units 918 through 922 may be shut down or switched into a low power state to conserve power.

If PAM4 optical signal 820 is associated with a high-bandwidth communication mode, then clock data recovery unit 914 extracts clock signal 944 from the signal received from threshold decision device 910. Clock signal 944 is distributed to sampling units 918, 922, and 924. Each of sampling unit 918, 920 and 922 can use clock signal 944 to sample the output signal from threshold decision device 908, 910, and 912, respectively. In the high bandwidth mode, clock data recovery unit 914 switches selection switches 924, 926, and 928 to transmit the sampled signals output by sampling units 918, 920, and 922, respectively. These sampled signals are received by decoding circuit 930.

In one aspect, decoding circuit 930 is configured to convert a temperature code into a pair of NRZ waveforms—NRZ waveform 946 and NRZ waveform 948. Alternatively, decoding circuit 930 converts a temperature code into a two-bit binary code, with each bit of the two-bit binary code corresponding to a unique NRZ waveform. This conversion may be based on the following rule:

Temperature code 000 corresponds to NRZ waveform 946 having a value of 0, and NRZ waveform 948 having a value of 0.

Temperature code 001 corresponds to NRZ waveform 946 having a value of 1, and NRZ waveform 948 having a value of 0.

Temperature code 011 corresponds to NRZ waveform 946 having a value of 0, and NRZ waveform 948 having a value of 1.

Temperature code 111 corresponds to NRZ waveform 946 having a value of 1, and NRZ waveform 948 having a value of 1.

In one aspect, NRZ waveform 946 and 948 are amplified by buffer 932 and 934 respectively. The outputs of buffer 932 and 934 are high-speed signal 936, and high-speed signal 938, respectively. Both high-speed signals 936 and 938 are high-speed electrical signals. In one aspect, high-speed signal 936 corresponds to high-speed signal 802, and high-speed signal 938 corresponds to high-speed signal 822.

In one aspect, high-speed demodulation circuit 900 is a high-order pulse amplitude demodulation circuit. High-speed demodulation circuit 900 may be implemented in a receiving end structure (e.g., in optical receiver 106). In one aspect, clock data recovery unit 914 is a clock recovery circuit that recovers a clock signal synchronized with the high-speed audio/video signal (e.g., PAM4 optical signal 820). Automatic gain amplifier 906 can function as an automatic gain control unit that controls the signal amplitude and outputs the amplitude-controlled signal to three threshold decision circuits (i.e., threshold decision devices 908, 910, and 912). A collective output of the threshold decision circuits is the temperature code of the input PAM4 signal (e.g., PAM4 optical signal 820).

In high-speed demodulation circuit 900, the recovered clock (e.g., clock signal 944) is used for audio/video signals with higher bandwidth, and each of sampling unit 918, 920, and 922 samples the signals and decodes the decision results. For audio/video signals with lower bandwidth, the result is decoded directly, and clock data recovery unit 914 is turned off along with sampling units 918, 920 and 922, to reduce power consumption. In one aspect, frequency discriminator 916 is used to distinguish the bandwidths of audio/video signals, and each of selection switch 924, 926, and 928 is automatically controlled (via switching signal 942) to select an output path for sampling with the recovered clock or a direct output path. A switch of clock data recovery unit 914 can also be controlled to control power consumption.

In one aspect, high-speed demodulation circuit uses automatic gain control amplifier 906 to convert an output of liner transimpedance amplifier 904 into a signal with a specific amplitude for signal amplitude decision. Transimpedance amplifier 904 may be implemented as a linear structure, which does not perform amplitude-limiting amplification on the signals. This linear amplification ensures that an eye diagram associated with PAM4 optical signal 820 is not distorted.

In one aspect, photoelectric detector PD 902 converts PAM4 optical signal 820 into an electrical signal, which passes through transimpedance amplifier 904 and automatic gain amplifier 906. The audio/video signals included in PAM4 optical signal 820 are amplified to a certain extent, and then pass through threshold decision devices 908, 910 and 912. Each of threshold decision device 908, 910 and 912 may be configured with different decision thresholds (e.g., decision threshold a, decision threshold b and decision threshold c). In one aspect, decision threshold c>decision threshold b>decision threshold a.

Clock signal 944 is synchronized with PAM4 optical signal 820, and may be obtained from a signal output by the threshold decision device 910 through the clock data recovery unit, which drives sampling units 918, 920, and 922. Using clock signal 944, sampling units 918, 920 and 922 respectively sample the output signals of the threshold decision devices 908, 910 and 912. In one aspect, each of threshold decision device 908, 910 and 912 compares the amplitude of an input PAM4 signal with three decision thresholds. The outputs of threshold decision devices 908, 910 and 912 may be respectively sampled by sampling units 918, 920, and 922 to output a temperature code signal.

In one aspect the four possible electrical levels that PAM4 optical signal 820 can take may be represented as four symbols—0, 1, 2, and 3. When the electrical level signal is 3, since 3>a, 3>b, and 3>c, the output of sampling units 922, 920 and 918 is "111," respectively. The respective output of the sampling units 922, 920 and 918 is "011" when the input signal is 2. The respective outputs of sampling units 922, 920 and 918 are "001" and "000" when the input signal is 1 and 0.

In one aspect, decoding circuit 930 converts a three-bit input temperature code received from selection switches 924, 926, and 928 into a 2-bit binary code. The binary code output by decoding circuit 930 may be output to an audio/video interface of, for example, video sink 108 via, for example, buffers 932 and 934.

In one aspect, selection switches 924, 926 and 928 can directly use the outputs of threshold decision devices 908, 910 and 912 respectively, to output a temperature code to decoding circuit 930. This signal path is mainly suitable for transmitting audio/video signals with low bandwidth. At this time, clock data recovery unit 914, and each of sampling unit 918, 920 and 922 can be turned off to save power consumption. Selection between the two signal paths (i.e., a signal path that includes sampling units 918, 920 and 922, or a signal path that does not include sampling units 918, 920 and 922) may be accomplished by appropriately switching selection switches 924, 926 and 928. These selection switches can be automatically switched by using frequency discriminator 916, where frequency discriminator 916 can determine whether the audio/video data is low bandwidth or high bandwidth.

Figure 10:
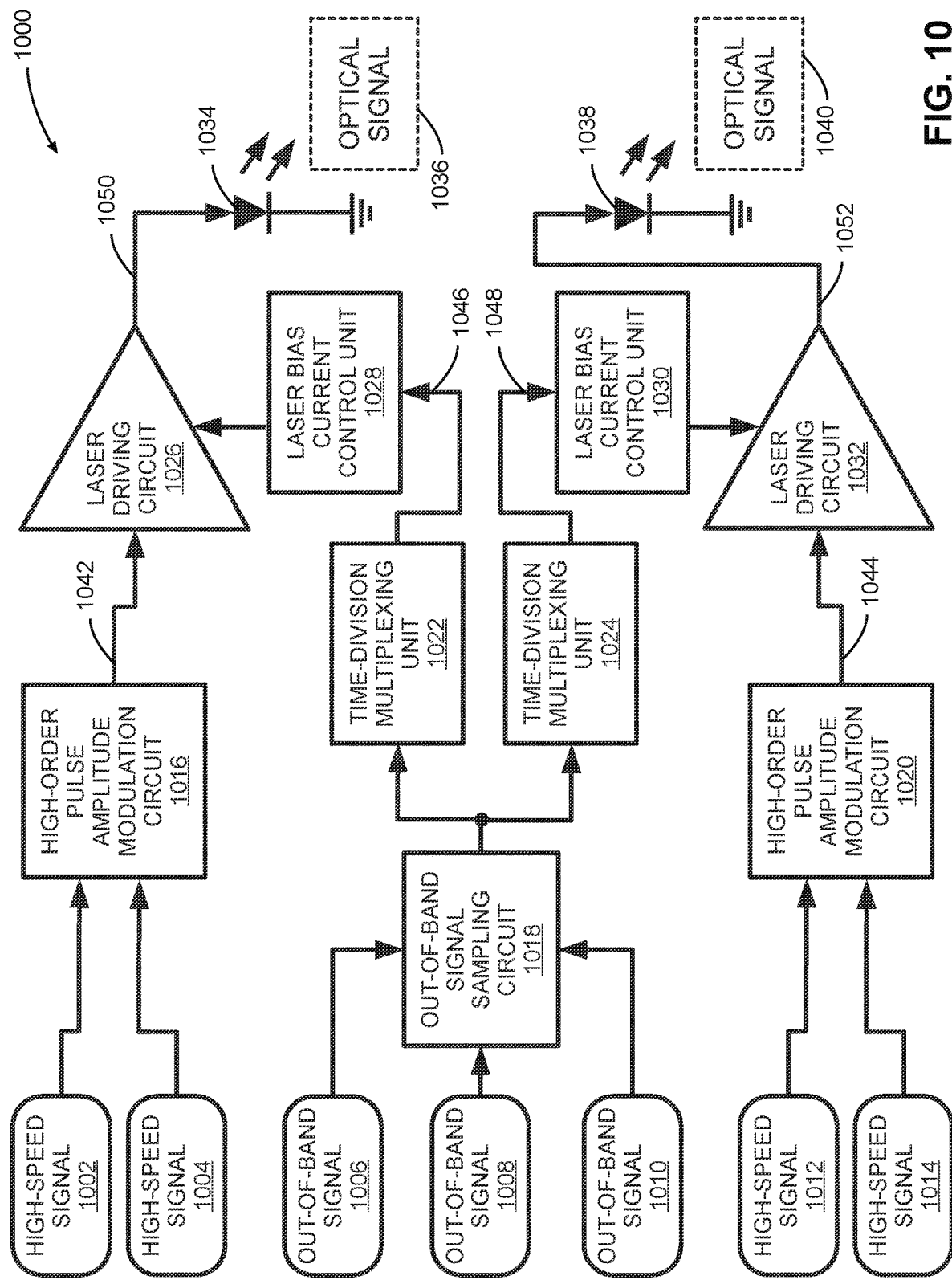
FIG. 10 is a block diagram depicting an embodiment of an out-of-band signal modulation circuit.

FIG. 10 is a block diagram depicting an embodiment of an out-of-band signal modulation circuit 1000. As depicted, out-of-band signal modulation circuit 1000 includes high-order pulse amplitude modulation circuit 1016, out-of-band signal sampling circuit 1018, high-order pulse amplitude modulation circuit 1020, time-division multiplexing unit 1022, time-division multiplexing unit 1024, laser driving circuit 1026, laser driving circuit 1032, laser bias current control unit 1028, laser bias current control unit 1030, laser diode 1034, and laser diode 1038.

As depicted, high-speed modulation circuit 800 in FIG. 8 performs higher order modulation on a pair of high-speed signals (i.e., high-speed signals 802 and 822), and combines these high-speed signals into a PAM4 signal. High-speed modulation circuit 800 is not configured to include out-of-band signals in the modulation scheme. In one aspect, out-of-band signal modulation circuit 1000 includes the higher order modulation aspects of high-speed modulation circuit 800, while also supporting modulation of out-of-band signals.

In one aspect, high-order pulse amplitude modulation circuit 1016 receives high-speed signal 1002 and high-speed signal 1004. High-speed signals 1002 and 1004 may be similar to high-speed signals 802 and 822, respectively. High-order pulse amplitude modulation circuit 1016 can implement features of high-speed modulation circuit 800. For example, high-order pulse amplitude modulation circuit 1016 may implement functionalities of clock data recovery unit 806, frequency discriminator 808, buffers 804 and 824, sampling units 810 and 826, selection switches 812 and 828, and 2:1 weighted adder circuit 814, to combine high-speed signals 1002 and 1004 into a (higher-order) PAM4 electrical signal 1042 that may be similar to PAM4 electrical signal 838. In one aspect, PAM4 electrical signal 1042 is received by laser driving circuit 1026.

In one aspect, high-order pulse amplitude modulation circuit 1020 receives high-speed signal 1012 and high-speed signal 1014. High-speed signals 1012 and 1014 may be similar to high-speed signals 802 and 822, respectively. High-order pulse amplitude modulation circuit 1020 can implement features of high-speed modulation circuit 800. For example, high-order pulse amplitude modulation circuit 1020 may implement functionalities of clock data recovery unit 806, frequency discriminator 808, buffers 804 and 824, sampling units 810 and 826, selection switches 812 and 828, and 2:1 weighted adder circuit 814, to combine high-speed signals 1012 and 1014 into a (higher-order) PAM4 electrical signal 1044 that may be similar to PAM4 electrical signal 838. In one aspect, PAM4 electrical signal 1044 is received by laser driving circuit 1032.

In one aspect, out-of-band signal sampling circuit 1018 samples and synchronizes out-of-band signals 1006, 1008 and 1010. Out-of-band signals 1006, 1008, and 1010 may be similar to one or more out-of-band signals associated with out-of-band signal 214 or out-of-band signal 326. The synchronized out-of-band signals output by out-of-band signal sampling circuit 1018 may be received by time-division multiplexing units 1022 and 1024. In one aspect, a number of out-of-band signals (e.g., out-of-band signals 1006, 1008 and 1010) is more than the number of optical fiber transmission channels (e.g., optical communication channels 110, 114 and 116). In one aspect, the time division multiplexing units 1022 and 1024 can multiplex out-of-band signals 1006, 1008 and 1010 into two channels—a first channel 1046, and a second channel 1048. In one aspect, each of first channel 1046 and second channel 1048 is comprised of one or more distinct time-division multiplexed out-of-band electrical signals. For the transmission of more out-of-band signal channels, each time division multiplexing unit can also be used to multiplex to two channels, for a total of four channels.

In one aspect, the number of channels associated with multiplexed out-of-band signals processed by out-of-band signal modulation circuit 1000 may be identical to the number of optical communication channels used for communicating the high-speed HDMI signals. For example, optical transmitter 104 has two optical communication channels 114 and 116, used for transmitting high-speed HDMI signals 216 through 222. Out-of-band signal modulation circuit 1000 also transmits four high speed signals 1002, 1004, 1012, and 1014. In both cases, two multiplexed channels may be used for multiplexing the out-of-band signals 1006 through 1010.

In one aspect, an electrical signal associated with first channel 1046 is received by laser bias current control unit 1028. Laser bias current control unit 1028 can modulate an average optical power (i.e., an average power of an input signal) of laser driving circuit 1026 based on a power level of the electrical signal associated with first channel 1046. Essentially, laser bias current control unit 1028 can modulate a bias current of laser driving circuit 1026 which, in turn, modulates an average power of PAM4 electrical signal 1042. This results in PAM4 electrical signal 1042 being subject to average optical power modulation by the electrical signal associated with first channel 1046, to generate modulated electrical signal 1050. Modulated electrical signal 1050 may be similar to modulated signal 700. Modulated electrical signal 1050 may be converted to modulated optical signal 1036 by laser diode 1034. Modulated optical signal 1036 may be transmitted over an optical communication channel such as optical communication channel 114.

In one aspect, an electrical signal associated with second channel 1048 is received by laser bias current control unit 1030. Laser bias current control unit 1030 can modulate an average optical power (i.e., an average power of an input signal) of laser driving circuit 1032 based on a power level of the electrical signal associated with second channel 1048. Essentially, laser bias current control unit 1030 can modulate a bias current of laser driving circuit 1032 which, in turn, modulates an average power of PAM4 electrical signal 1044. This results in PAM4 electrical signal 1044 being subject to average optical power modulation by the electrical signal associated with second channel 1048, to generate modulated electrical signal 1052. Modulated electrical signal 1052 may be similar to modulated signal 700. Modulated electrical signal 1052 may be converted to modulated optical signal 1040 by laser diode 1038. Modulated optical signal 1040 may be transmitted over an optical communication channel such as optical communication channel 116.

In one aspect, depending on the number of out-of-band signals, each of time division multiplexing units 1022 and 1024 can multiplex the out-of-band signals into the same number of channels as the audio/video signal transmission channels according to the principle of load balancing. In one aspect each of laser bias current control unit 1028 and 1030 modulates the bias current of laser diodes 1034 and 1038, respectively, to control the average light power of the associated laser. Each time-division multiplexed signal passes through the appropriate laser bias current control unit to control the laser bias current output by the laser driving circuit. The signal optical eye diagram of modulated waveform 700 shown in FIG. 7 shows the offset modulated PAM4 optical eye diagram, in which 702 represents the average electrical or optical power modulated by the out-of-band signal, while remaining signal is the PAM4 signal generated by, for example, high-speed modulation circuit 800. This modulation method increases the modulation dimension of signal in an optical fiber, and further increases the bandwidth of signal transmission in the optical fiber.

Figure 11:
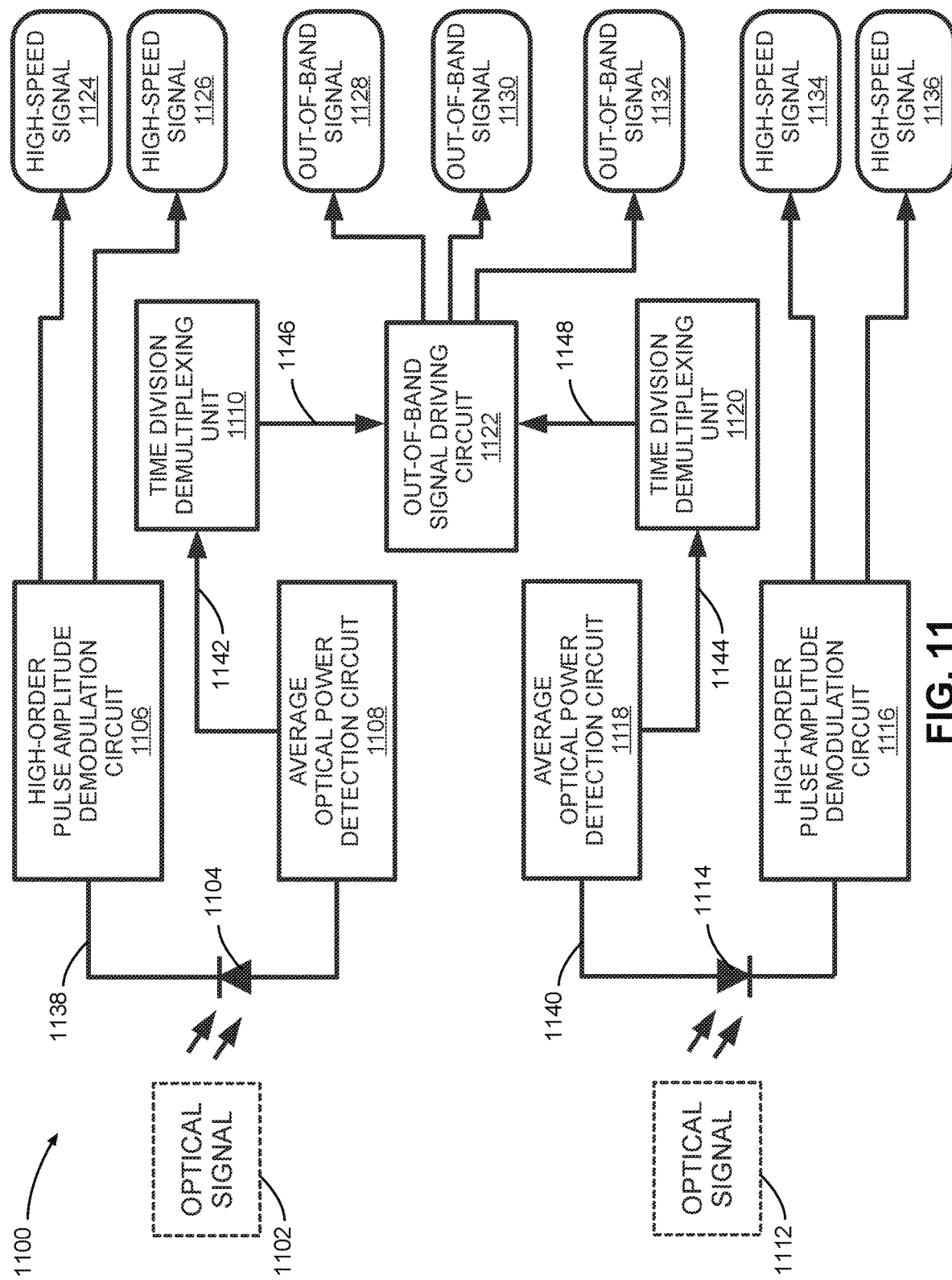
FIG. 11 is a block diagram depicting an embodiment of an out-of-band signal demodulation circuit.

FIG. 11 is a block diagram depicting an embodiment of an out-of-band signal demodulation circuit 1100. As depicted, out-of-band signal demodulation unit 1100 includes photodetectors 1104 and 1114, high-order pulse amplitude demodulation circuit 1106, average optical power detection circuit 1108, average optical power detection circuit 1118, high-order pulse amplitude demodulation circuit 1116, time-division demultiplexing unit 1110, out-of-band signal driving circuit 1122, and time-division demultiplexing unit 1120.

In one aspect, each of photodetector 1104 and 1114 receives optical signal 1102 and 1112 respectively, over one or more optical communication channels. In one aspect, optical signal 1102 and 1112 may be similar or identical to optical signal 1036 or 1040, respectively. Photodetector 1104 may convert optical signal 1102 into modulated electrical signal 1138. Photodetector 1114 may convert optical signal 1112 into modulated electrical signal 1140.

In one aspect, high-order pulse amplitude demodulation circuit 1106 may be similar to high-speed demodulation circuit 900. High-order pulse amplitude demodulation circuit 1106 may extract high-speed signal 1124 and high-speed signal 1126 from modulated electrical signal 1138 in a manner similar to how high-speed demodulation circuit 900 extracts high-speed signals 936 and 938 from PAM4 optical signal 820. In one aspect, high-speed signal 1124 and high-speed signal 1126 are electrical signals that may be similar to high-speed signal 1002 and high-speed signal 1004, respectively.

In one aspect, high-order pulse amplitude demodulation circuit 1116 may be similar to high-speed demodulation circuit 900. High-order pulse amplitude demodulation circuit 1116 may extract high-speed signal 1134 and high-speed signal 1136 from modulated electrical signal 1140 in a manner similar to how high-speed demodulation circuit 900 extracts high-speed signals 936 and 938 from PAM4 optical signal 820. In one aspect, high-speed signal 1134 and high-speed signal 1136 are electrical signals that may be similar to high-speed signal 1012 and high-speed signal 1014, respectively.

In one aspect, average optical power detection circuit 1108 extracts an average optical power (i.e., an average power) associated with optical signal 1102 from modulated electrical signal 1138, and outputs the average optical power as a multiplexed electrical signal 1142 to time-division demultiplexing unit 1110. Time-division demultiplexing unit 1110 demultiplexes multiplexed electrical signal 1142 to extract a first set of out-of-band electrical signals 1146 from multiplexed electrical signal 1142. This first set of out-of-band electrical signals 1146 is received by out-of-band signal driving unit 1122.

In one aspect, average optical power detection circuit 1118 extracts an average optical power (i.e., an average power) associated with optical signal 1112 from modulated electrical signal 1140, and outputs the average optical power as a multiplexed electrical signal 1144 to time-division demultiplexing unit 1120. Time-division demultiplexing unit 1120 demultiplexes multiplexed electrical signal 1144 to extract a second set of out-of-band electrical signals 1148 from multiplexed electrical signal 1144. This second set of out-of-band electrical signals 1148 is received by out-of-band signal driving unit 1122.

Out-of-band signal driving unit 1122 may output the first set of out-of-band electrical signals 1146 and the second set of out-of-band electrical signals as out-of-band signals 1128, 1130, and 1132. In one aspect, out-of-band signals 1128, 1130 and 1132 are electrical signals that may be similar or identical to out-of-band signals 1006, 1008, and 1010, respectively.

Generally, out-of-band signals in audio/video protocols usually communicate in two directions. For example, optical connector 118 includes optical communication channel 112. Optical communication channel 112 is a bidirectional optical communication channel. Optical communication channel 112 includes optical communication channels 114 and 116 for transmitting high-speed optical signals that are average-power modulated by one or more out-of-band signals, from optical transmitter 104 to optical receiver 106. Optical communication channel 112 also includes optical communication channel 110 that transmits out-of-band optical signals from optical receiver 106 to optical transmitter 104. Optical communication channel 110 can be considered a reverse transmission path for transmitting one or more out-of-band signals from optical receiver 106 to optical transmitter 104. This reverse transmission path may include time division multiplexing, high-order pulse amplitude modulation or time division multiplexing plus high-order pulse amplitude modulation to transmit multiple out-of-band signals in one channel. FIGS. 12-17 depict various embodiments that implement a reverse transmission path from an optical receiver to an optical transmitter.

Figure 12:
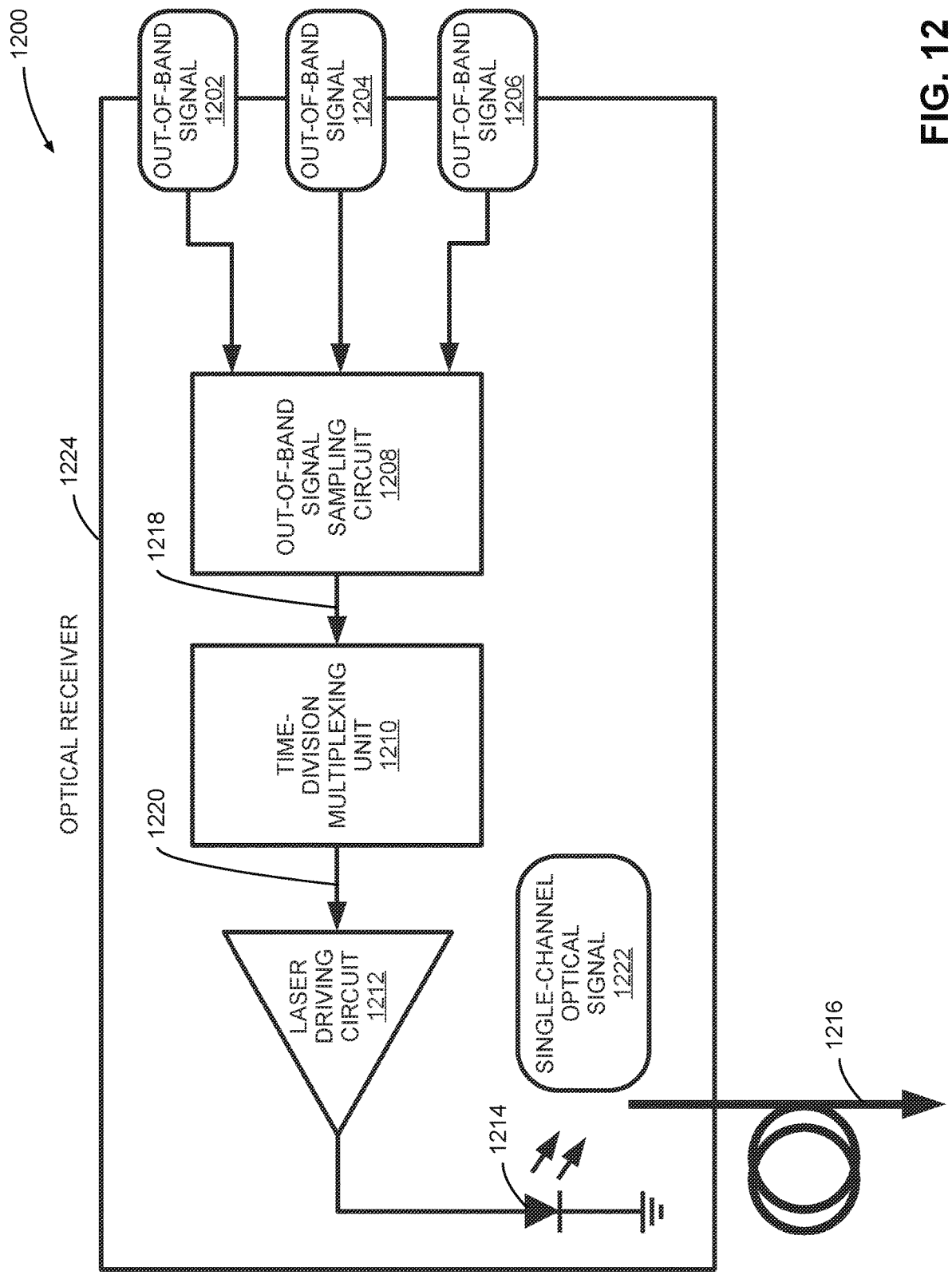
FIG. 12 is a block diagram depicting an optical receiver interface for an out-of-band signal transmission method.

FIG. 12 is a block diagram depicting an optical receiver interface 1200 for an out-of-band signal transmission method. As depicted, optical receiver interface 1200 includes optical receiver 1224, and optical communication channel 1216. Optical receiver 1224 further includes outof-band signal sampling circuit 1208, time-division multiplexing unit 1210, laser driving circuit 1212, and laser diode 1214.

In one aspect, optical receiver 1224 is similar to optical receiver 106. A combination of out-of-band signal sampling circuit 1208 and time-division multiplexing unit 1210 may be similar to modulation circuit 308. A combination of laser driving circuit 1212 and laser diode 1214 may be similar to electro-optical conversion circuit 302. Optical communication channel 1216 may be similar to optical communication channel 110.

In one aspect, out-of-band signal sampling unit 1208 receives out-of-band signal 1202, out-of-band signal 1204, and out-of-band signal 1206. These out-of-band signals may be electrical out-of-band signals that are received from a video sink such as video sink 108. In one-aspect, out-of-band signals 1202, 1204, and 1206 may be similar to one or more out-of-band signals included in out-of-band signal 326. Out-of-band signal sampling unit 1208 may sample out-of-band signals 1202, 1204, and 1206, and transmit the sampled out-of-band electrical signals 1218 to time-division multiplexing unit 1210.

Time-division multiplexing unit 1210 receives the three sampled out-of-band signals 1218 from out-of-band signal sampling unit 1208, and time-division-multiplexes the three sampled out-of-band electrical signals 1218 into a single-channel electrical signal 1220. This single-channel electrical signal 1220 is transmitted by time-division multiplexing unit 1210 to laser driving circuit 1212. Laser driving circuit 1212 uses the single-channel electrical signal 1220 to drive laser diode 1214. Laser diode 1214 can convert the single-channel electrical signal 1220 to a single-channel optical signal 1222, and transmit the single-channel optical signal 1222 over optical communication channel 1216, to an optical transmitter such as optical transmitter 104.

Figure 13:
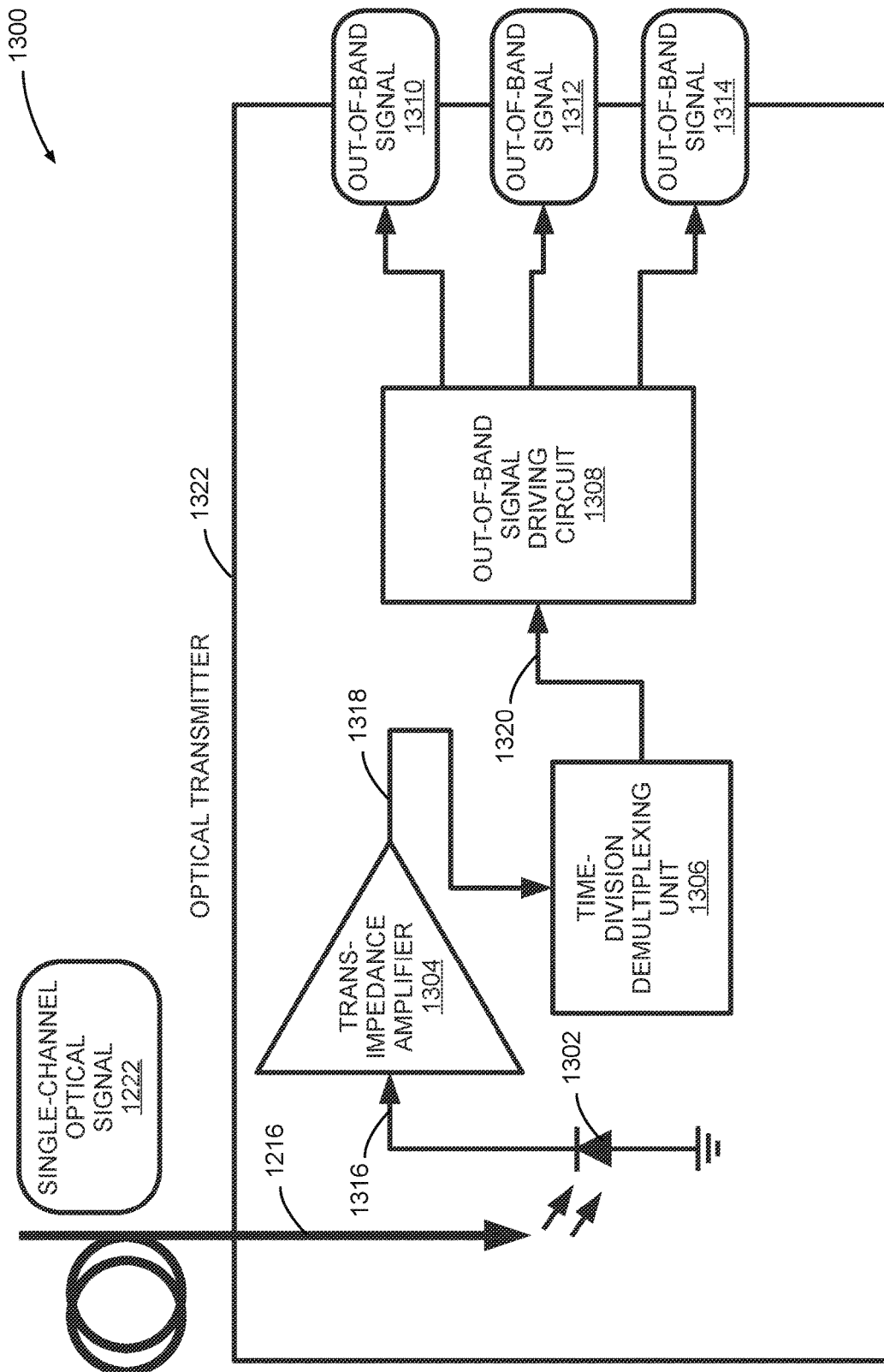
FIG. 13 is a block diagram depicting an optical transmitter interface for an out-of-band signal reception method.

FIG. 13 is a block diagram depicting an optical transmitter interface 1300 for an out-of-band signal reception method. As depicted, optical transmitter interface includes optical communication channel 1216, and optical transmitter 1322. Optical transmitter 1322 further includes photodetector 1302, transimpedance amplifier 1304, time-division demultiplexing unit 1306, and out-of-band signal driving circuit 1308.

In one aspect, optical transmitter 1322 is similar to optical transmitter 104. A combination of photodetector 1302 and transimpedance amplifier 1304 may be similar to photoelectric conversion circuit 208. A combination of time-division demultiplexing unit 1306 and out-of-band signal driving circuit 1308 may be similar to demodulation circuit 202.

In one aspect, photodetector 1302 receives single-channel optical signal 1222 over optical communication channel 1216. Photodetector 1302 may convert single-channel optical signal 1222 to a single-channel electrical signal 1316. Transimpedance amplifier 1304 amplifies single-channel electrical signal 1316 to generate a conditioned single-channel electrical signal 1318.

In one aspect, time-division demultiplexing unit 1306 time-division demultiplexes the single-channel electrical signal 1318 to generate three out-of-band electrical signals 1320. Out-of-band signal driving circuit 1308 performs signal conditioning (e.g., amplification and/or impedance matching) on out-of-band electrical signals 1320, to generate out-of-band signal 1310, out-of-band signal 1312, and out-of-band signal 1314. In one aspect, out-of-band signal 1310, out-of-band signal 1312, and out-of-band signal 1314 may be similar to out-of-band signal 1202, out-of-band signal 1204, and out-of-band signal 1206, respectively.

Out-of-band signal 1310, out-of-band signal 1312, and out-of-band signal 1314 may also be similar to one or more signals included in out-of-band signal 214. In one aspect, optical transmitter 1316 transmits out-of-band signal 1310, out-of-band signal 1312, and out-of-band signal 1314 to a video source such as video source 102.

Figure 14:
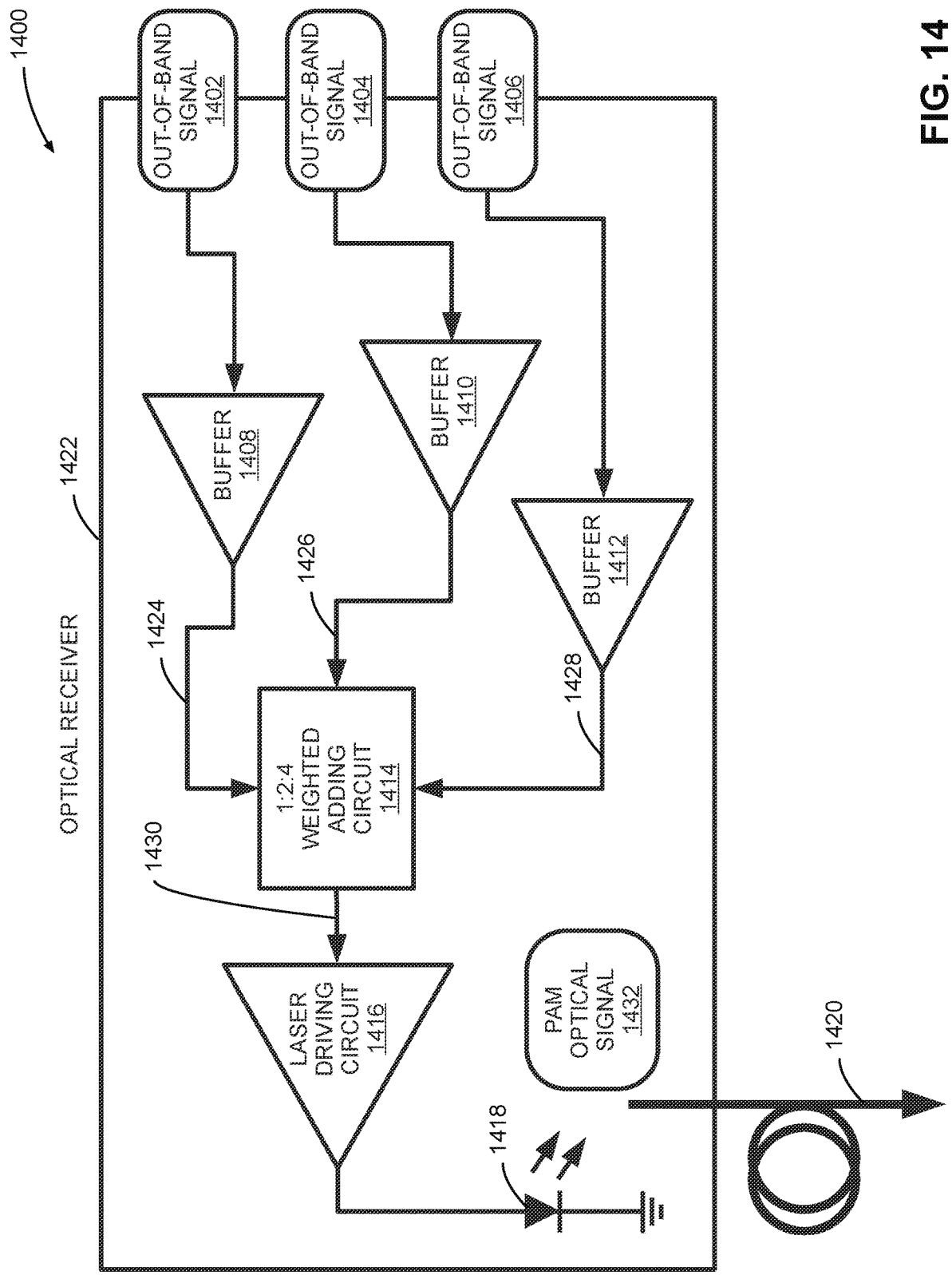
FIG. 14 is a block diagram depicting an optical receiver interface for an out-of-band signal transmission method.

FIG. 14 is a block diagram depicting an optical receiver interface 1400 for an out-of-band signal transmission method. As depicted, optical receiver interface 1400 includes optical receiver 1422, and optical communication channel 1420. Optical receiver 1422 further includes buffer 1408, buffer 1410, buffer 1412, 1:2:4 weighted adding circuit 1414, laser driving circuit 1416, and laser diode 1418.

In one aspect, optical receiver 1422 is similar to optical receiver 106. A combination of buffer 1408, buffer 1410, buffer 1412 and 1:2:4 weighted adding circuit 1414 may be similar to modulation circuit 308. A combination of laser driving circuit 1416 and laser diode 1418 may be similar to electro-optical conversion circuit 302. Optical communication channel 1420 may be similar to optical communication channel 110. In one aspect, optical receiver 1442 implements a high-order pulse-amplitude modulation (PAM) method to transmit one or more out-of-band signals (e.g., out-of-band signals 1402, 1404, and 1406).

In one aspect, optical receiver 1422 receives out-of-band signals 1402, 1404, and 1406 from a video sink such as video sink 108. Out-of-band signals 1402, 1404, and 1406 may be electrical signals. In one aspect, out-of-band signals 1402, 1404, and 1406 are amplified and conditioned by buffers 1408, 1410, and 1412, respectively. Buffers 1410, 1418, and 1412 can respectively output amplified out-of-band signals 1424, 1426, and 1428, that are received by 1:2:4 weighted adding circuit 1414.

In one aspect, 1:2:4 weighted adding circuit 1414 combines output amplified out-of-band signals 1424, 1426, and 1428 into a single PAM electrical signal 1430 using PAM modulation. In one aspect, PAM8 modulation is used by 1:2:4 weighted adding circuit 1414 to combine amplified out-of-band signals 1424, 1426, and 1428 into PAM electrical signal 1430.

In one aspect, PAM electrical signal 1430 is transmitted from 1:2:4 weighted adding circuit 1414 to laser driving circuit 1416. Laser driving circuit 1416 uses PAM electrical signal 1430 to drive laser diode 1418. Laser diode 1418 can convert PAM electrical signal 1430 to a PAM optical signal 1432, and transmit the PAM optical signal 1432 over optical communication channel 1420, to an optical transmitter such as optical transmitter 104.

Figure 15:
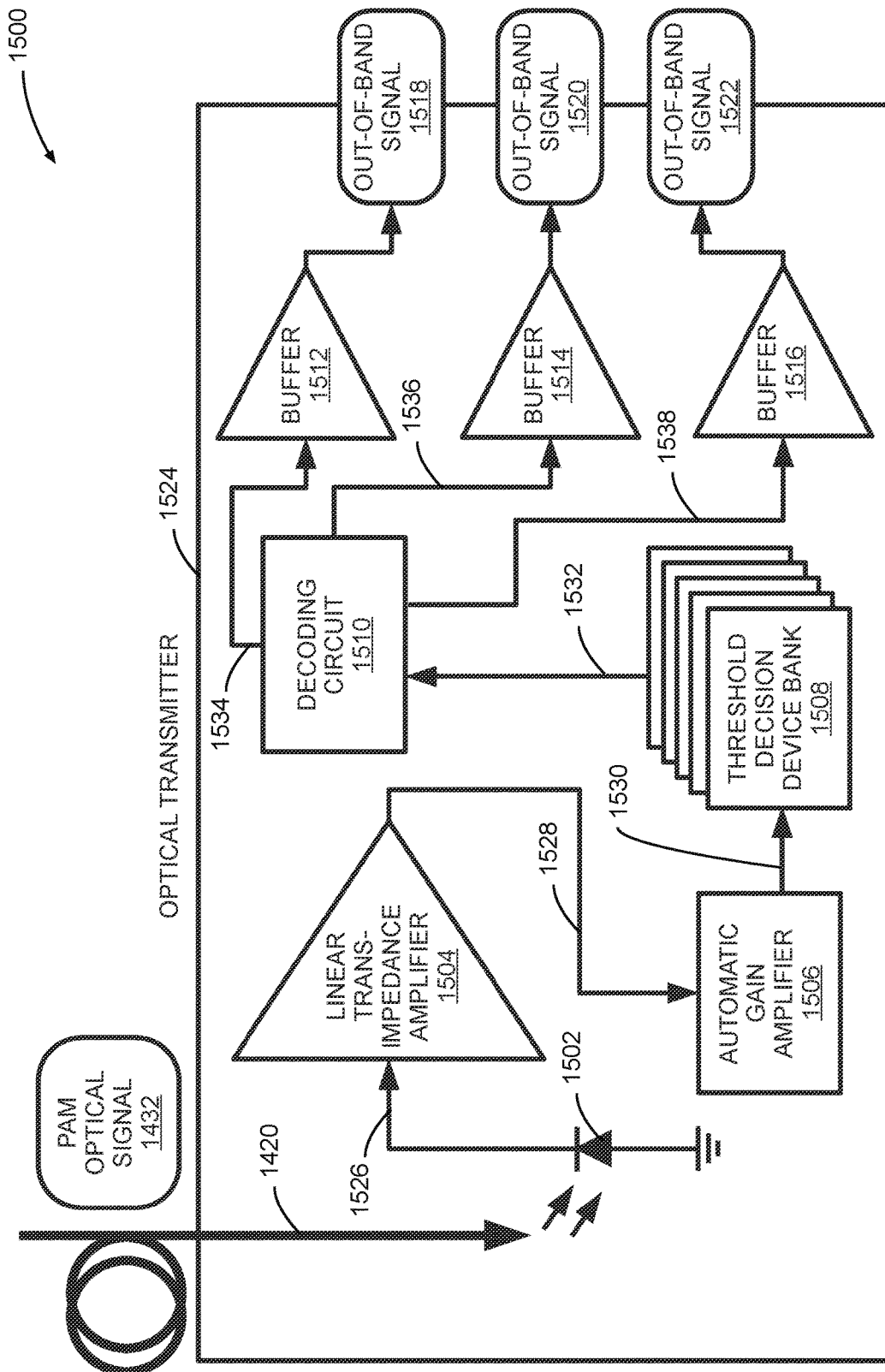
FIG. 15 is a block diagram depicting an optical transmitter interface for an out-of-band signal reception method.

FIG. 15 is a block diagram depicting an optical transmitter interface 1500 for an out-of-band signal reception method. As depicted, optical transmitter interface includes optical communication channel 1420, and optical transmitter 1524. Optical transmitter 1524 further includes photodetector 1502, transimpedance amplifier 1504, automatic gain amplifier 1506, threshold decision device bank 1508, decoding circuit 1510, buffer 1512, buffer 1514, and buffer 1516.

In one aspect, optical transmitter 1524 is similar to optical transmitter 104. A combination of photodetector 1502 and transimpedance amplifier 1504 may be similar to photoelectric conversion circuit 208. A combination of automatic gain amplifier 1506, threshold decision device bank 1508, decoding circuit 1510, buffer 1512, buffer 1514, and buffer 1516 may be similar to demodulation circuit 202.

In one aspect, photodetector 1502 receives PAM optical signal 1432 over optical communication channel 1420. Photodetector 1502 may convert PAM optical signal 1432 to a PAM electrical signal 1526. Transimpedance amplifier 1504 amplifies PAM electrical signal 1526 to generate a conditioned PAM electrical signal 1528.

In one aspect, automatic gain amplifier 1506 adjusts amplification levels of PAM electrical signal 1528 to generate an adjusted PAM electrical signal 1530. Threshold decision device bank 1508 receives adjusted PAM electrical signal 1530. Threshold decision device bank 1508 can decode PAM electrical signal 1530 to generate a temperature code 1532 associated with adjusted PAM electrical signal 1530. In one aspect, threshold decision device bank 1508 may include one or more threshold decision devices such as threshold decision device 908, 910, or 912. If PAM optical signal 1432 is a PAM4 signal, then threshold decision device bank can include three threshold decision devices. If PAM optical signal 1432 is a PAM8 signal, then threshold decision device bank can include seven threshold decision devices. Automatic gain amplifier 1506 can accordingly adjust amplification levels so that adjusted PAM electrical signal 1530 is within the appropriate signal limits and conforms to the appropriate threshold levels associated with threshold decision device bank 1508.

Decoding circuit 1510 can receive and decode temperature code 1532. Decoding circuit 1510 decodes temperature code 1532 to output a first decoded signal 1534, a second decoded signal 1536, and a third decoded signal 1538. Buffers 1512, 1514, and 1516 perform amplification and conditioning on first decoded signal 1534, second decoded signal 1536, and third decoded signal 1538 to generate out-of-band signals 1518, 1520, and 1522, respectively. In one aspect, out-of-band signal 1518, out-of-band signal 1520, and out-of-band signal 1522 may be similar to out-of-band signal 1402, out-of-band signal 1404, and out-of-band signal 1406, respectively. Out-of-band signal 1518, out-of-band signal 1520, and out-of-band signal 1522 may also be similar to one or more signals included in out-of-band signal 214. In one aspect, optical transmitter 1524 transmits out-of-band signal 1518, out-of-band signal 1520, and out-of-band signal 1522 to a video source such as video source 102.

In one aspect, a combination of optical receiver 1422, optical communication channel 1420, and optical transmitter 1524 implements a reverse transmission path for one or more out-of-band signals. When the reverse transmission path uses high-order pulse amplitude modulation for transmission, it includes 1:2:4 signal weighting unit 1414, and laser linear driving circuit 1416.

In one aspect, 1:2:4 signal weighting unit (i.e., 1:2:4 weighted adding circuit 1414) modulates out-of-band signals 1402 through 1406 into high-order pulse amplitude modulated signals (e.g., PAM electrical signal 1430). In one aspect, laser linear driving circuit 1416 converts the high-order pulse amplitude modulated signals into optical signals (e.g., PAM optical signal 1432) with minimal distortion. In one aspect, the out-of-band signals 1402, 1404, and 1406 are subjected to PAM8 modulation. These PAM8-modulated signals can be converted into optical signals by laser driving circuit 1414 and laser 1416, and transmitted over an optical fiber (e.g., optical communication channel 1420), to optical transmitter 1524.

In one aspect, linear transimpedance amplifier 1514 converts PAM electrical signal 1526 signals into conditioned PAM electrical signal 1528 electrical signals with minimal distortion. Automatic gain amplifier 1506 can adjust PAM electrical signal 1528 signals to a certain amplitude consistent with threshold decision device bank 1508. Multiple (e.g., eight) threshold decision devices in threshold decision device bank 1508 can be used to determine signal amplitude information and output temperature-coded information. In one aspect, a decoding unit (i.e., decoding circuit 1510) converts temperature codes into binary codes and outputs them to a video source (e.g., video source 102).

In one aspect, PAM optical signal 1432 is converted into PAM electrical signal 1526 by photodetector 1502. Linear transimpedance amplifier 1504 provides amplification for PAM electrical signal 1526. The output from linear transimpedance amplifier is conditioned PAM electrical signal 1528 that is converted into specific amplitudes (i.e., adjusted PAM electrical signal 1530) by automatic gain amplifier 1506. Adjusted PAM electrical signal 1530 may pass through threshold decision device bank 1508. Threshold decision device bank 1508 can include eight threshold decision devices. The decision result from threshold decision device bank 1508 may be converted into a 3-bit binary signal by decoding circuit 1510. This 3-bit binary may be comprised of first decoded signal 1534, second decoded signal 1536, and third decoded signal 1538. This three-bit binary signal is output to the source end (i.e., to video source 102) through the buffers 1512, 1514, and 1516, as out-of-band signals 1518, 1520, and 1522. This high-order modulation mode is different from that of audio/video signals, as no clock data recovery unit is used. Because the bandwidth of out-of-band signals is relatively low, the structure without a clock recovery unit is chosen to save the power consumption of the scheme.

When there are more than three out-of-band signals in the audio/video signal transmission protocol, using higher-order pulse amplitude modulation may result in more complex circuit designs for optical transmitter 104 and optical receiver 106. In one aspect, the complexity of the circuit increases exponentially with the order of pulse amplitude modulation, so higher-order pulse amplitude modulation may result in a complex implementation, and may have a larger power consumption overhead.

Figure 16:
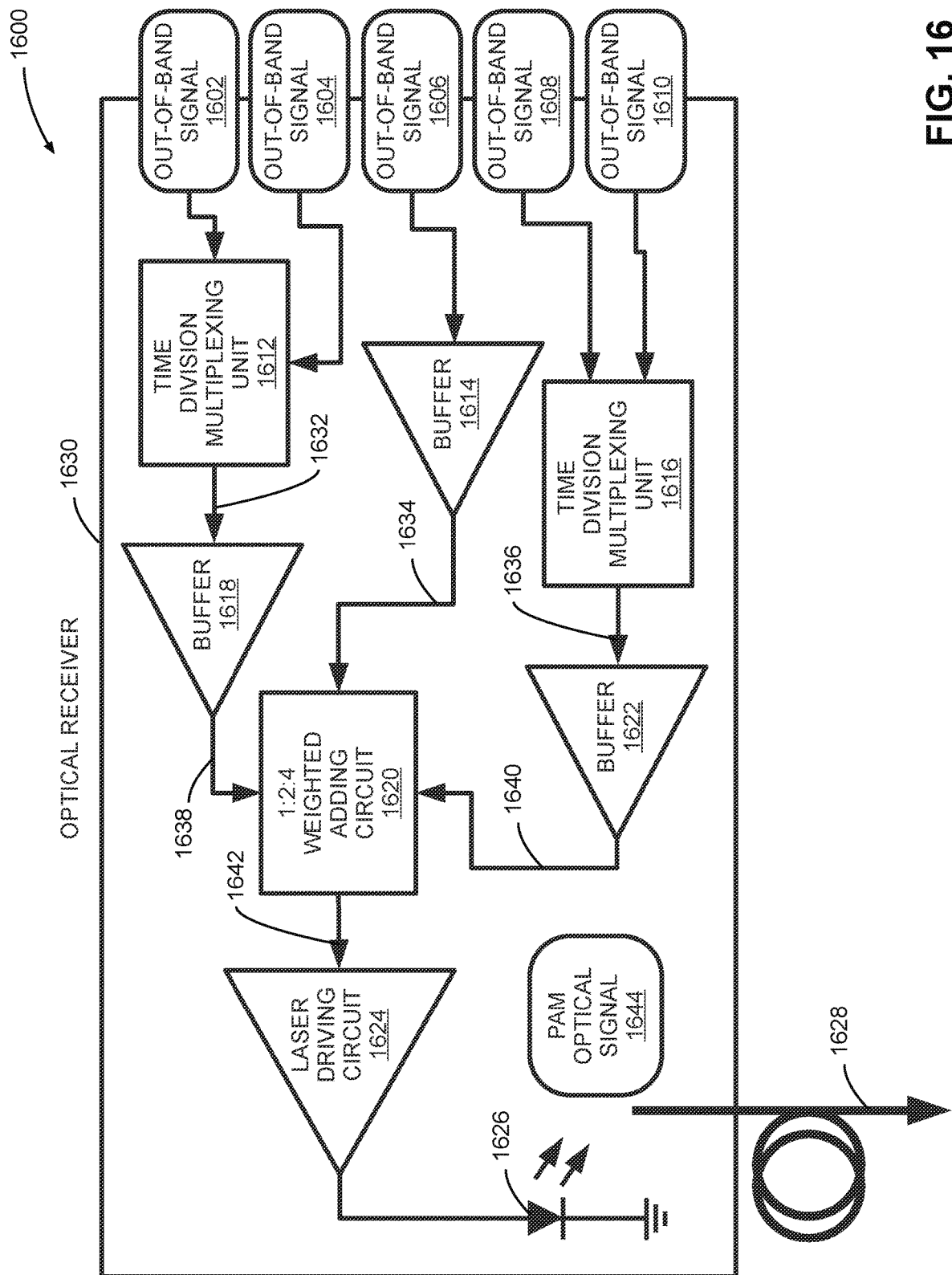
FIG. 16 is a block diagram depicting an optical receiver interface for an out-of-band signal transmission method.

FIG. 16 is a block diagram depicting an optical receiver interface 1600 for an out-of-band signal transmission method. As depicted, optical receiver interface 1600 includes optical receiver 1630, and optical communication channel 1628. Optical receiver 1630 further includes time division multiplexing unit 1612, time division multiplexing unit 1616, buffer 1618, buffer 1614, buffer 1622, 1:2:4 weighted adding circuit 1620, laser driving circuit 1624, and laser diode 1626.

In one aspect, optical receiver 1630 is similar to optical receiver 106. A combination of time division multiplexing unit 1612, time division multiplexing unit 1616, buffer 1618, buffer 1614, buffer 1622 and 1:2:4 weighted adding circuit 1620 may be similar to modulation circuit 308. A combination of laser driving circuit 1624 and laser diode 1626 may be similar to electro-optical conversion circuit 302. Optical communication channel 1628 may be similar to optical communication channel 110. In one aspect, optical receiver 1630 implements a combination of time-division multiplexing and high-order pulse-amplitude modulation (PAM) method to transmit one or more out-of-band signals (e.g., out-of-band signals 1602, 1604, 1606, 1608, and 1610).

In one aspect, optical receiver 1630 receives out-of-band signals 1602, 1604, 1606, 1608 and 1610 from a video sink such as video sink 108. Out-of-band signals 1602, 1604, 1606, 1608 and 1610 may be electrical signals. Of these signals, out-of-band signal 1606 may have a higher bandwidth as compared to out-of-band signals 1602, 1604, 1608, and 1610.

In one aspect, out-of-band signals 1602 and 1604 are time-division multiplexed by time-division multiplexing unit 1612, to generate time-division multiplexed signal 1632. Out-of-band signals 1608 and 1610 can be time-division multiplexed by time-division multiplexing unit 1616, to generate time-division multiplexed signal 1636. In one aspect, the following bandwidth relationships hold:

- A bandwidth of time-division multiplexed signal 1632 is substantially equal to combined bandwidths of out-of-band signals 1602 and 1604.
- A bandwidth of time-division multiplexed signal 1636 is substantially equal to combined bandwidths of out-of-band signals 1608 and 1610.
- The bandwidths of time-division multiplexed signal 1632, time-division multiplexed signal 1636, and out-of-band signal 1606 are substantially equal.

In one aspect, time-division multiplexed signal 1632, out-of-band signal 1610, and time-division multiplexed signal 1636 are amplified and conditioned by buffers 1618, 1614, and 1622, respectively. Buffers 1618, 1614, and 1622 can output amplified time-division multiplexed signal 1638, amplified out-of-band signal 1634, and amplified time-division multiplexed signal 1640, that are received by 1:2:4 weighted adding circuit 1620.

In one aspect, 1:2:4 weighted adding circuit 1620 combines output amplified time-division multiplexed signal 1638, amplified out-of-band signal 1634, and amplified time-division multiplexed signal 1640 into a single PAM electrical signal 1642 using PAM modulation. In one aspect, PAM8 modulation is used by 1:2:4 weighted adding circuit 1620 to combine amplified time-division multiplexed signal 1638, amplified out-of-band signal 1634, and amplified time-division multiplexed signal 1640 into PAM electrical signal 1642.

In one aspect, PAM electrical signal 1642 is transmitted from 1:2:4 weighted adding circuit 1620 to laser driving circuit 1624. Laser driving circuit 1624 uses PAM electrical signal 1642 to drive laser diode 1626. Laser diode 1626 can convert PAM electrical signal 1642 to a PAM optical signal 1644, and transmit the PAM optical signal 1644 over optical communication channel 1628, to an optical transmitter such as optical transmitter 104.

Figure 17:
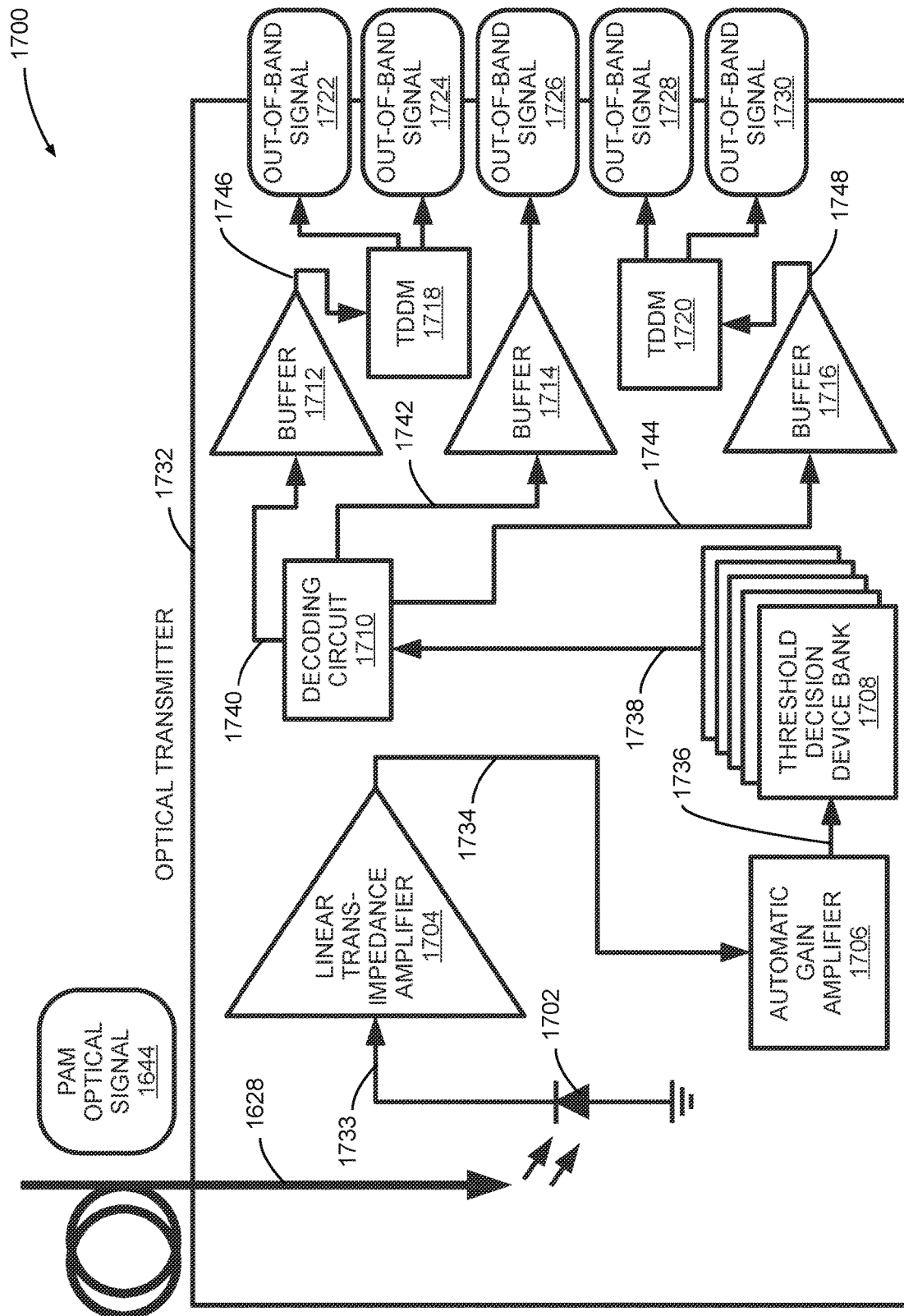
FIG. 17 is a block diagram depicting an optical transmitter interface for an out-of-band signal reception method.

FIG. 17 is a block diagram depicting an optical transmitter interface 1700 for an out-of-band signal reception method. As depicted, optical transmitter interface includes optical communication channel 1644, and optical transmitter 1732. Optical transmitter 1732 further includes photodetector 1702, transimpedance amplifier 1704, automatic gain amplifier 1706, threshold decision device bank 1708, decoding circuit 1710, buffer 1712, buffer 1714, buffer 1716, time-division demultiplexing unit TDDM 1718, and time-division demultiplexing unit TDDM 1720.

In one aspect, optical transmitter 1732 is similar to optical transmitter 104. A combination of photodetector 1702 and transimpedance amplifier 1704 may be similar to photoelectric conversion circuit 208. A combination of automatic gain amplifier 1706, threshold decision device bank 1708, decoding circuit 1710, buffer 1712, buffer 1714, buffer 1716, time-division demultiplexing unit TDDM 1718, and time-division demultiplexing unit TDDM 1720 may be similar to demodulation circuit 202.

In one aspect, photodetector 1702 receives PAM optical signal 1644 over optical communication channel 1628. Photodetector 1702 may convert PAM optical signal 1644 to a PAM electrical signal 1733. Transimpedance amplifier 1704 amplifies PAM electrical signal 1733 to generate a conditioned PAM electrical signal 1734.

In one aspect, automatic gain amplifier 1706 adjusts amplification levels of PAM electrical signal 1734 to generate an adjusted PAM electrical signal 1736. Threshold decision device bank 1708 receives adjusted PAM electrical 1736. Threshold decision device bank 1708 can decode PAM electrical signal 1736 to generate a temperature code 1738 associated with adjusted PAM electrical signal 1736. In one aspect, threshold decision device bank 1708 may include one or more threshold decision devices such as threshold decision device 908, 910, or 912. If PAM optical signal 1644 is a PAM4 signal, then threshold decision device bank can include three threshold decision devices. If PAM optical signal 1644 is a PAM8 signal, then threshold decision device bank can include seven threshold decision devices. Automatic gain amplifier 1706 can accordingly adjust amplification levels so that adjusted PAM electrical signal 1736 is within the appropriate signal limits and conforms to the appropriate threshold levels associated with threshold decision device bank 1708.

Decoding circuit 1710 can receive and decode temperature code 1738. Decoding circuit 1710 decodes temperature code 1738 to output a first decoded signal 1740, a second decoded signal 1742, and a third decoded signal 1744. Buffers 1712, 1714, and 1716 perform amplification and conditioning on first decoded signal 1740, second decoded signal 1742, and third decoded signal 1744 to generate time-division demultiplexed signal 1746, out-of-band signal 1726, and time-division demultiplexed signal 1748 respectively. Time-division demultiplexing unit 1718 can demultiplex time-division demultiplexed signal 1746 to generate out-of-band signals 1722 and 1724. Time-division demultiplexing unit 1720 can demultiplex time-division demultiplexed signal 1748 to generate out-of-band signals 1728 and 1730.

In one aspect, out-of-band signal 1722, out-of-band signal 1724, out-of-band signal 1726, out-of-band signal 1728, and out-of-band signal 1730 may be similar to out-of-band signal 1602, out-of-band signal 1604, out-of-band signal 1606, out-of-band signal 1608 and out-of-band signal 1610, respectively. Out-of-band signal 1722, out-of-band signal 1724, out-of-band signal 1726, out-of-band signal 1728, and out-of-band signal 1730 may also be similar to one or more signals included in out-of-band signal 214. In one aspect, optical transmitter 1732 transmits out-of-band signal 1722, out-of-band signal 1724, out-of-band signal 1726, out-of-band signal 1728, and out-of-band signal 1730 to a video source such as video source 102.

In one aspect, a combination of optical receiver 1630, optical transmitter 1732, and optical communication channel 1628 implements a reverse transmission path for one or more out-of-band signals. In one aspect, this reverse transmission path is implemented by using a combination of time division multiplexing and higher-order pulse amplitude modulation.

In one aspect, time-division demultiplexing units 1718 and 1720 demultiplex respective signals received from decoding circuit 1710 via buffers 1712 and 1716, respectively. In one aspect, the order of the high-order pulse amplitude modulation associated with PAM optical signal 1644 is less than or equal to 3, and the time-division multiplexing is based on bandwidth equalization. Bandwidth equalization reduces the time-division multiplexing degree of out-of-band signals (e.g., out-of-band signal 1606) with a relatively high band width and increases the multiplexing degree of out-of-band signals with a relatively low bandwidth (e.g., out-of-band signals 1602, 1604, 1608, and 1610).

In one aspect, an optical connector implemented using optical receiver 1630, optical transmitter 1732, and optical communication channel 1620 combines the time-division multiplexing of the reverse transmission path depicted in the architectures of FIGS. 12 and 13 and the high-order pulse amplitude modulation of the reverse transmission path depicted in the architectures of FIGS. 14 and 15.

In one aspect, optical receiver 1630:

Classifies signals according to bandwidth requirements,

Time-division multiplexes signals with lower bandwidth requirements (e.g., out-of-band signals 1602, 1604, 1608, and 1610), Does not time-division multiplex signals with higher bandwidth requirements (e.g., out-of-band signal 1606), and Performs PAM8 modulation on the time-division multiplexed and high-bandwidth out-of-band signals.

The PAM8 modulated signal (e.g., PAM electrical signal 1642) can be converted into an optical signal (e.g., PAM optical signal 1644) by laser driving circuit 1624 and laser 1626. The optical signal can be transmitted to the transmitting end through an optical fiber (e.g., optical fiber 1628).

In one aspect, a combination of photodetector 1702 and transimpedance amplifier 1704 at optical transmitter 1732 convert the optical signal (e.g., PAM optical signal 1644) into an electrical signal (e.g., conditioned PAM electrical signal 1734). Automatic gain amplifier 1706 can convert conditioned PAM electrical signal 1734 signal into a specific amplitude (e.g., adjusted PAM electrical signal 1736). Adjusted PAM electrical signal 1736 may pass through eight threshold decision devices (e.g., threshold decision device bank 1708). The decision result is converted into a 3-bit binary signal (e.g., first, second and third decoded signals 1740, 1742, and 1744) by decoding circuit 1710. The binary signal is output to a video source (e.g., video source 102) through the buffers 1712, 1714 and 1716, after time-division demultiplexing the binary signals associated with the relatively low-bandwidth out-of-band signals. The output signals transmitted to the video source may be out-of-bands signals 1722, 1724, 1726, 1728, and 1730.

Figure 18:
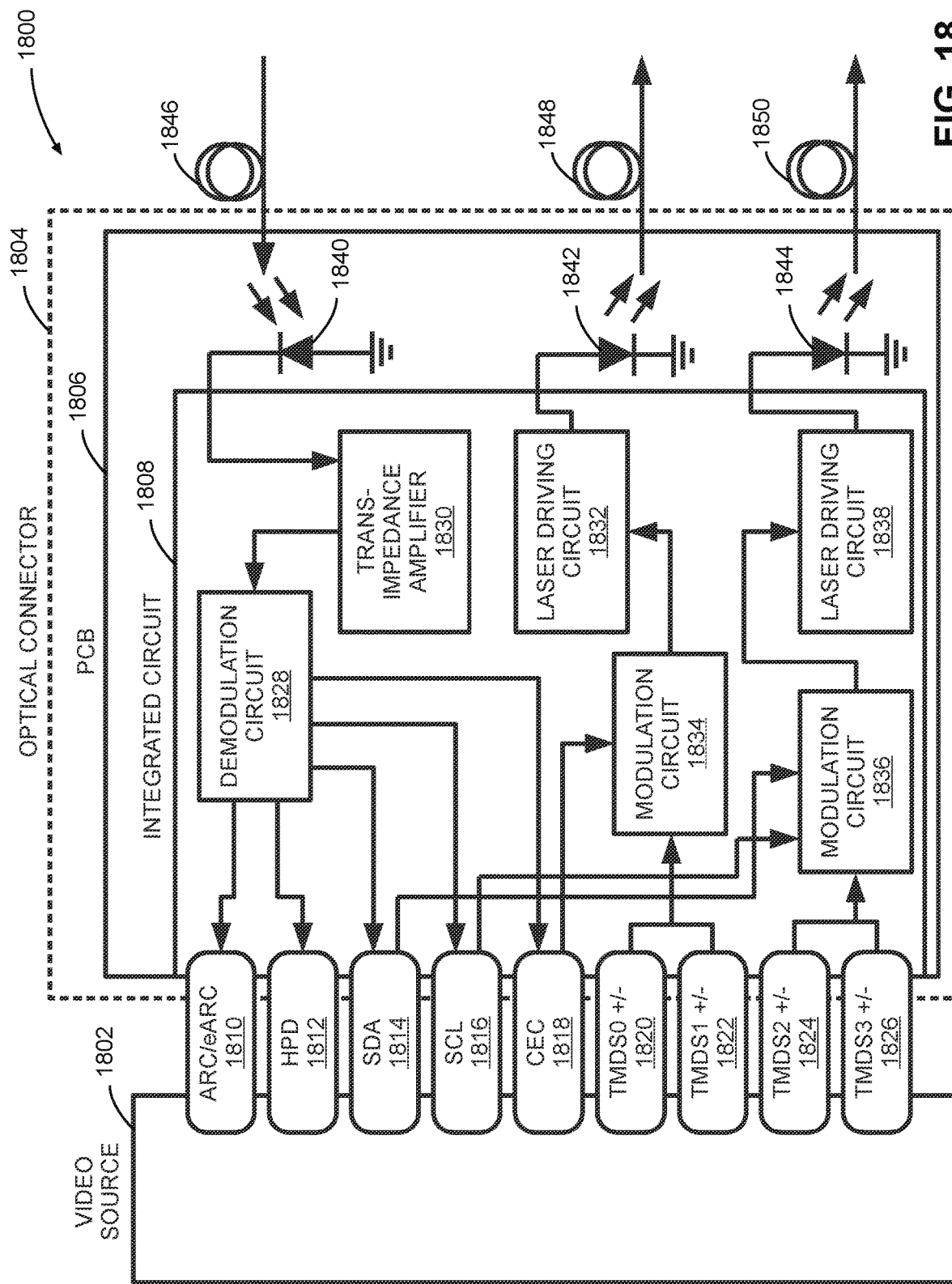
FIG. 18 is a block diagram depicting an embodiment of an optical transmitter interface.

FIG. 18 is a block diagram depicting an embodiment of an optical transmitter interface 1800. As depicted, optical transmitter interface 1800 includes video source 1802, optical connector 1804, optical communication channel 1846, optical communication channel 1848, and optical communication channel 1850. Optical connector 1804 further includes printed circuit board PCB 1806. Printed circuit board 1806 further includes integrated circuit 1808, photodetector 1840, laser diode 1842, and laser diode 1844. Integrated circuit 1808 further includes demodulation circuit 1828, modulation circuit 1834, modulation circuit 1836, transimpedance amplifier 1830, laser driving circuit 1832, and laser driving circuit 1838. In one aspect, optical communication channels 1846, 1848, and 1850 are integrated into optical connector 1804.

In one aspect, video source 1802 may be similar to video source 102, optical connector 1804 may be similar to optical connector 118, and integrated circuit 1808 may be similar to optical transmitter 104. Video source 1802 may be an HDMI video source that communicates one or more high-speed and low-speed HDMI signals with a video sink (e.g., video sink 108), via optical connector 1804 and integrated circuit 1808.

In one aspect, video source 1802 may communicate the following low-speed HDMI signals with the video sink via optical connector 1804 and integrated circuit 1808:

ARC/eARC 1810 (HDMI Audio/Enhanced Audio Return Channel signal—signal received from the video sink)

HPD 1812 (HDMI Hot Plug Detect signal—signal received from the video sink)

SDA 1814 (HDMI Serial DDC Data—signal transmitted to or received from the video sink)

SCL 1816 (HDMI Serial DDC Clock—signal transmitted to or received from the video sink)

CEC 1818 (HDMI Consumer Electronics Control signal—signal transmitted to or received from the video sink)

In one aspect, video source 1802 may transmit the following high-speed HDMI signals to the video sink:

TMDS0+/−1820 (HDMI transition-minimized differential signaling high-speed signal 0)

TMDS1+/−1822 (HDMI transition-minimized differential signaling high-speed signal 1)

TMDS2+/−1824 (HDMI transition-minimized differential signaling high-speed signal 2)

TMDS3+/−1826 (HDMI transition-minimized differential signaling high-speed signal 3)

In one aspect, each of modulation circuit 1834 and 1836 may be similar to out-of-band signal modulation circuit 1000. In one aspect, TMDS0+/−1820 and TMDS1+/−1822 signals received by modulation circuit 1834 from video source 1802 may be similar to high-speed signals 1002 and 1004, respectively. These two signals may be PAM4-modulated via a high-order pulse amplitude modulation circuit included in modulation circuit 1834, and converted to a PAM4 optical signal by a laser driving circuit (e.g., laser driving circuit 1832 that may be similar to laser driving circuit 1026) and a laser diode (e.g., laser diode 1842 that may be similar to laser diode 1034). At the same time, CEC signal 1818 received by modulation circuit 1834 from video source 1802 may be used to perform an average optical power modulation on the PAM4 signal comprising TMDS0+/−1820 and TMDS1+/−1822 signals. CEC signal 1818 may be similar to out-of-band signal 1006. In one aspect, laser diode 1842 outputs a PAM4 optical signal comprising TMDS0+/−1820 and TMDS1+/−1822 signals, that is average optical power-modulated by CEC signal 1818. This PAM4 optical signal may be transmitted to an optical receiver over optical communication channel 1848 (that may be similar to optical communication channel 114).

In one aspect, CEC signal 1818 is similar to out-of-band signal 228, TMDS0+/−1820 and TMDS1+/−1822 signals are similar to high-speed signals 216 and 218 respectively, modulation circuit 1834 is similar to modulation circuit 204, a combination of laser driving circuit 1832 and laser diode 1842 is similar to electro-optical conversion circuit 210, and optical communication channel 1848 is similar to optical communication channel 114.

In one aspect, TMDS2+/−1824 and TMDS3+/−1826 signals received by modulation circuit 1836 from video source 1802 may be similar to high-speed signals 1002 and 1004, respectively. These two signals may be PAM4-modulated via a high-order pulse amplitude modulation circuit, and converted to a PAM4 optical signal by a laser driving circuit (e.g., laser driving circuit 1838 that may be similar to laser driving circuit 1026) and a laser diode (e.g., laser diode 1844 that may be similar to laser diode 1034). At the same time, SDA signal 1814 and SCL signal 1816 received by modulation circuit 1836 from video source 1802 may be time-division multiplexed and used to perform an average optical power modulation on the PAM4 signal comprising TMDS2+/−1824 and TMDS3+/−1826 signals. SDA signal 1814 and SCL signal 1816 may be similar to out-of-band signals 1008 and 1010, respectively. In one aspect, laser diode 1844 outputs a PAM4 optical signal comprising TMDS2+/−1824 and TMDS3+/−1826 signals, that is average optical power-modulated by a time-division multiplexed signal that further includes SDA signal 1814 and SCL signal 1816. This PAM4 optical signal may be transmitted to an optical receiver over optical communication channel 1850 (that may be similar to optical communication channel 116).

In one aspect, SDA signal 1814 and SCL signal 1816 are similar to out-of-band signal 232, TMDS2+/−1824 and TMDS3+/−1826 signals are similar to high-speed signals 220 and 222 respectively, modulation circuit 1836 is similar to modulation circuit 206, a combination of laser driving circuit 1838 and laser diode 1844 is similar to electro-optical conversion circuit 212, and optical communication channel 1850 is similar to optical communication channel 116.

In one aspect, integrated circuit 1808 (e.g., optical transmitter 104) receives one or more modulated out-of-band optical signals from an optical receiver via a reverse transmission channel that may include optical communication channel 1846. These modulated out-of-band optical signals may be modulated using any combination of time-division multiplexing and higher-order pulse-amplitude modulation, as presented in the architectural circuit diagrams in FIGS. 12-17. In one aspect, the modulated out-of-band optical signals may be similar to single-channel optical signal 1222, PAM optical signal 1432, or PAM optical signal 1644.

In one aspect, optical communication channel 1846 may be similar to any of optical communication channel 1216, 1420, or 1628. Optical communication channel 1846 may be similar to optical communication channel 110.

In one aspect, the out-of-band optical signals received over optical communication channel 1846 may be converted to out-of-band electrical signals by photodetector 1840. Photodetector 1840 may be similar to any of photodetector 1302, 1502, or 1702. The out-of-band electrical signals may be amplified by transimpedance amplifier 1830. Transimpedance amplifier 1830 may be similar to any of linear transimpedance amplifier 1304, 1504, or 1704. The amplified out-of-band electrical signals output by transimpedance amplifier 1830 may be received by demodulation circuit 1828. Demodulation circuit 1828 may include architectural and functional aspects of optical transmitter interface 1300, 1500, or 1700. Demodulation circuit 1828 may extract multiple out-of-band signals such as ARC/eARC signal 1810, HPD signal 1812, SDA signal 1814, SCL signal 1816, and CEC signal 1818 from the amplified out-of-band electrical signals. These out-of-band electrical signals may be transmitted to video source 1802.

In one aspect, a collection of ARC/eARC signal 1810, HPD signal 1812, SDA signal 1814, SCL signal 1816, and CEC signal 1818 is similar to out-of-band signal 224. Demodulation circuit 1828 may be similar to demodulation circuit 202, a combination of photodetector 1840 and transimpedance amplifier 1830 may be similar to photoelectric conversion circuit 208, and optical communication channel 1846 may be similar to optical communication channel 110.

In one aspect, integrated circuit 1808 is an embodiment of optical transmitter 104 fabricated on an integrated circuit. Integrated circuit 1808 may be implemented on a printed circuit board (e.g., PCB 1806).

Figure 19:
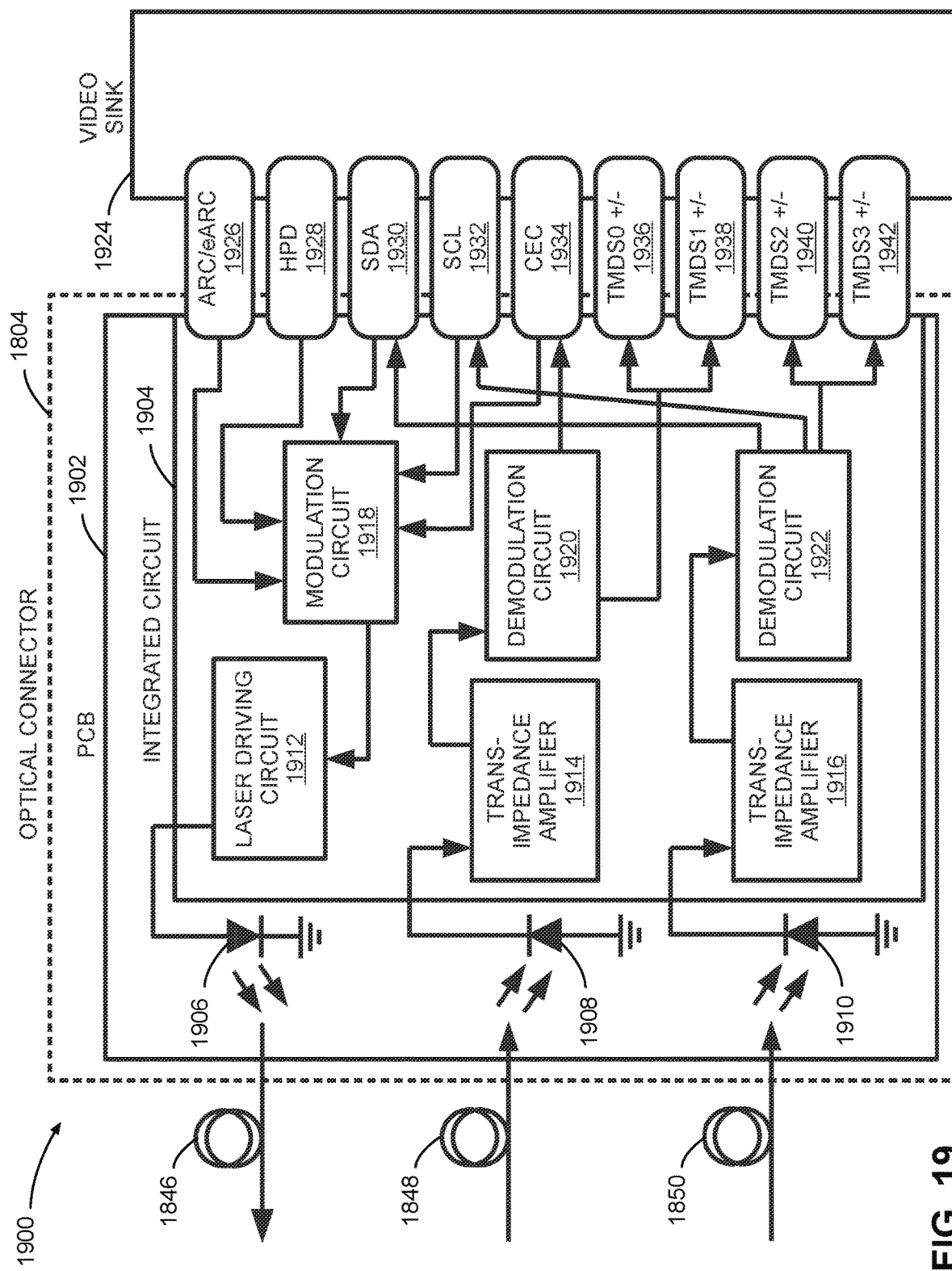
FIG. 19 is a block diagram depicting an embodiment of an optical receiver interface.

FIG. 19 is a block diagram depicting an embodiment of an optical receiver interface 1900. As depicted, optical transmitter interface 1900 includes video sink 1924, optical connector 1804, optical communication channel 1846, optical communication channel 1848, and optical communication channel 1850. Optical connector 1804 further includes printed circuit board PCB 1902. Printed circuit board 1902 further includes integrated circuit 1904, laser diode 1906, photodetector 1908, and photodetector 1910. Integrated circuit 1904 further includes modulation circuit 1918, demodulation circuit 1920, demodulation circuit 1922, laser driving circuit 1912, transimpedance amplifier 1914, and transimpedance amplifier 1916. In one aspect, optical communication channels 1846, 1848, and 1850 are integrated into optical connector 1804.

In one aspect, video sink 1924 may be similar to video sink 108, optical connector 1804 may be similar to optical connector 118, and integrated circuit 1904 may be similar to optical receiver 106. Video sink 1924 may be an HDMI video sink that communicates one or more high-speed and low-speed HDMI signals with a video source (e.g., video source 102), via optical connector 1804 and integrated circuit 1904.

In one aspect, video sink 1924 may communicate the following low-speed HDMI signals with the video source (e.g., video source 1802) via optical connector 1804 and integrated circuit 1904:

ARC/eARC 1926 (HDMI Audio/Enhanced Audio Return Channel signal—signal transmitted to the video source)

HPD 1928 (HDMI Hot Plug Detect signal—signal transmitted to the video source)

SDA 1930 (HDMI Serial DDC Data—signal transmitted to or received from the video source)

SCL 1932 (HDMI Serial DDC Clock—signal transmitted to or received from the video source)

CEC 1934 (HDMI Consumer Electronics Control signal— signal transmitted to or received from the video source)

In one aspect, video sink 1924 may receive the following high-speed HDMI signals from the video source:

TMDS0+/−1936 (HDMI transition-minimized differential signaling high-speed signal 0)

TMDS1+/−1938 (HDMI transition-minimized differential signaling high-speed signal 1)

TMDS2+/−1940 (HDMI transition-minimized differential signaling high-speed signal 2)

TMDS3+/−1942 (HDMI transition-minimized differential signaling high-speed signal 3)

In one aspect, each of demodulation circuit 1920 and 1922 may be similar to out-of-band signal demodulation circuit 1100. In one aspect, the PAM4 optical signal comprising TMDS0+/−1820 and TMDS1+/−1822 signals is received by photodetector 1908, via optical communication channel 1848. Photodetector 1908 may be similar to photodetector 1104. Photodetector 1908 may convert the PAM4 optical received via optical communication channel 1848 to a corresponding PAM4 electrical signal. Transimpedance amplifier 1914 may receive this PAM4 electrical signal and perform amplification and signal conditioning on the PAM4 electrical signal. Transimpedance amplifier 1914 may be similar in form and function to linear transimpedance amplifier 904. In one aspect, transimpedance amplifier 1914 outputs a conditioned PAM4 electrical signal that is received by demodulation circuit 1920. Demodulation circuit 1920 can perform an average optical power demodulation and decoding to extract CEC signal 1934, TMDS0+/−signal 1936, and TMDS1+/−signal 1938 as electrical signals from the conditioned PAM4 electrical signal. In one aspect, each of SDA signal 1930, SCL signal 1932, CEC signal 1934, TMDS0+/−signal 1936, and TMDS1+/−signal 1938 is an electrical signal. In one aspect, SDA signal 1930, SCL signal 1932, CEC signal 1934, TMDS0+/−signal 1936, and TMDS1+/−signal 1938 are similar to SDA signal 1814, SCL signal 1816, CEC signal 1818, TMDS0+/−signal 1820, and TMDS1+/−signal 1822, respectively.

In one aspect, CEC signal 1934 is similar to out-of-band signal 318, TMDS0+/−1936 and TMDS1+/−1938 signals are similar to high-speed signals 328 and 330 respectively, demodulation circuit 1920 is similar to demodulation circuit 310, a combination of photodetector 1908 and transimpedance amplifier 1914 is similar to photoelectric conversion circuit 304, and optical communication channel 1848 is similar to optical communication channel 114.

In one aspect, the PAM4 optical signal comprising TMDS2+/−1828 and TMDS3+/−1830 signals is received by photodetector 1910, via optical communication channel 1850. Photodetector 1910 may be similar to photodetector 1104. Photodetector 1910 may convert the PAM4 optical received via optical communication channel 1850 to a corresponding PAM4 electrical signal. Transimpedance amplifier 1916 may receive this PAM4 electrical signal and perform amplification and signal conditioning on the PAM4 electrical signal. Transimpedance amplifier 1916 may be similar in form and function to linear transimpedance amplifier 904. In one aspect, transimpedance amplifier 1916 outputs a conditioned PAM4 electrical signal that is received by demodulation circuit 1922. Demodulation circuit 1922 can perform an average optical power demodulation and decoding to extract SDA signal 1930, SCL signal 1932, TMDS2+/−signal 1940, and TMDS3+/−signal 1942 as electrical signals from the conditioned PAM4 electrical signal. In one aspect, each of TMDS2+/−signal 1940 and TMDS3+/−signal 1942 is an electrical signal. In one aspect, TMDS2+/−signal 1940 and TMDS3+/−signal 1942 are similar to TMDS2+/−signal 1824 and TMDS3+/−signal 1826, respectively.

In one aspect, SDA signal 1930 and SCL signal 1932 are similar to out-of-band signal 322, TMDS2+/−1940 and TMDS3+/−1942 signals are similar to high-speed signals 332 and 334 respectively, demodulation circuit 1922 is similar to demodulation circuit 312, a combination of photodetector 1910 and transimpedance amplifier 1916 is similar to photoelectric conversion circuit 306, and optical communication channel 1850 is similar to optical communication channel 116.

In one aspect, integrated circuit 1904 (e.g., optical receiver 106) receives one or more out-of-band electrical signals from video sink 1924. These out-of-band electrical signals may include ARC/eARC signal 1926, HPD signal 1928, SDA signal 1930, SCL signal 1932, and CEC signal 1934. In one aspect, modulation circuit 1918 may include architectural aspects of optical receiver interface optical receiver interface 1200, 1400, or 1600, and may modulate these out-of-band signals in a manner similar to optical receiver 1224, optical receiver 1422, or optical receiver 1630. Modulation circuit 1918 can modulate ARC/eARC signal 1926, HPD signal 1928, SDA signal 1930, SCL signal 1932, and CEC signal 1934 into an electrical signal that may be similar to single-channel electrical signal 1220, PAM electrical signal 1430, or PAM electrical signal 1642. In one aspect, the electrical signal output by modulation circuit 1918 can be conditioned by laser driving circuit 1912 and converted into a corresponding optical signal by laser diode 1906. In one aspect, laser driving circuit 1912 is similar to laser driving circuit 1212, laser driving circuit 1416, or laser driving circuit 1624. Laser diode 1906 may be similar to laser diode 1214, laser diode 1418, or laser diode 1626. The optical signal output by laser diode 1906 may be similar to single-channel optical signal 1222, PAM optical signal 1432, or PAM optical signal 1644. This optical signal may be transmitted to an optical transmitter (e.g., optical transmitter 104) via optical communication channel 1846.

In one aspect, a collection of ARC/eARC signal 1926, HPD signal 1928, SDA signal 1930, SCL signal 1930, and CEC signal 1934 is similar to out-of-band signal 316. Modulation circuit 1918 may be similar to modulation circuit 308, a combination of laser driving circuit 1912 and laser diode 1906 may be similar to electro-optical conversion circuit 302, and optical communication channel 1846 may be similar to optical communication channel 110.

In one aspect, integrated circuit 1904 is an embodiment of optical receiver 106 fabricated on an integrated circuit. Integrated circuit 1904 may be implemented on a printed circuit board (e.g., PCB 1902).

In one aspect, optical connector 1804 implements a HDMI three-core active optical cable, with a total of three optical communication channels. Out-of-band signals SDA 1814, SCL 1816 and CEC 1818 are modulated to the bias current of laser diodes 1842 and 1844 by modulation circuit 1834 and modulation circuit 1836. At the same time, and TMDS0+/−signal 1820 and TMDS1+/−signal 1822 are converted into PAM4 signals by the modulation circuit 1834 and modulated to the modulation current of laser diode 1842. TMDS3+/−signal 1824 and TMDS4+/−signal 1826 are converted into PAM4 signals by the modulation circuit 1836 and modulated to the modulation current of laser diode 1844. The modulated PAM4 optical signals are transmitted through two optical fibers (e.g., optical communication channels 1848 and 1850) to integrated circuit 1904.

At integrated circuit 1904, the received optical signals are converted into TMDS0+/−1936, TMDS1+/−1938, TMDS2+/−1940, TMDS3+/−1942, SDA 1930, SCL 1932, and CEC 1934 signals, and transmitted to the display end (i.e., to video sink 1924). Out-of-band signals SDA 1930, SCL 1932, CEC 1934, HPD 1928 and ARC/eARC 1926 from video sink 1924 are transmitted to integrated circuit 1808 via integrated circuit 1904, and then to video source 1802. This transmission may be via optical communication channel 1846. As depicted in FIGS. 18 and 19, optical connector includes integrated circuits 1808 and 1904. In one aspect, integrated circuit 1808 and integrated circuit 1904 are pasted and wired on PCB 1806 and PCB 1902, respectively. Two lasers (e.g., laser diodes 1842 and 1844) and one photodetector (e.g., photodetector 1840) may be integrated onto PCB 1806. Two photodetectors (e.g., photodetectors 1908 and 1910) and one laser (e.g., laser diode 1906) may be integrated onto PCB 1902. Therefore, a total of three lasers, three photodetectors and three optical fibers (i.e., optical communication channels 1846, 1848, and 1850) are used to realize the HDMI three-core active optical cable (i.e., optical connector 1804). This structure has the advantages of low implementation complexity, low cost, long transmission distance and good cable flexibility.

Figure 20:
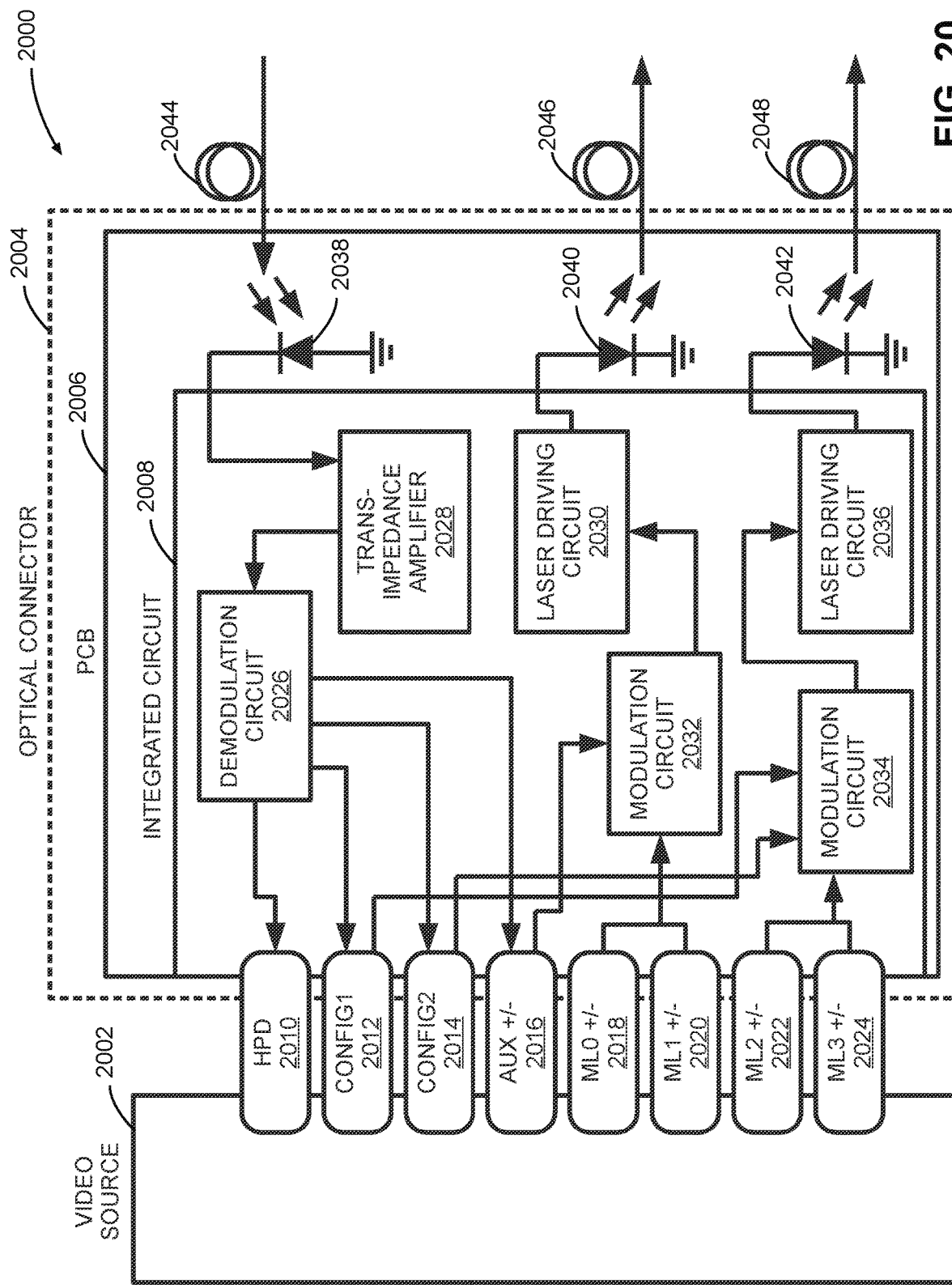
FIG. 20 is a block diagram depicting an embodiment of an optical transmitter interface.

FIG. 20 is a block diagram depicting an embodiment of an optical transmitter interface 2000. As depicted, optical transmitter interface 2000 includes video source 2002, optical connector 2004, optical communication channel 2044, optical communication channel 2046, and optical communication channel 2048. Optical connector 2004 further includes printed circuit board PCB 2006. Printed circuit board 2006 further includes integrated circuit 2008, photodetector 2038, laser diode 2040, and laser diode 2042. Integrated circuit 2008 further includes demodulation circuit 2026, modulation circuit 2032, modulation circuit 2034, transimpedance amplifier 2028, laser driving circuit 2030, and laser driving circuit 2036. In one aspect, optical communication channels 2044, 2046, and 2048 are integrated into optical connector 2004.

In one aspect, video source 2002 may be similar to video source 102, optical connector 2004 may be similar to optical connector 118, and integrated circuit 2008 may be similar to optical transmitter 104. Video source 2002 may be a DisplayPort (DP) video source that communicates one or more high-speed and low-speed DP signals with a video sink (e.g., video sink 108), via optical connector 2004 and integrated circuit 2008.

In one aspect, video source 2002 may communicate the following low-speed DP signals with the video sink via optical connector 2004 and integrated circuit 2008:

HPD 2010 (DP Hot Plug Detect signal—signal received from the video sink)

CONFIG1 2012 (DP CONFIG1—signal transmitted to or received from the video sink)

CONFIG2 2014 (DP CONFIG2—signal transmitted to or received from the video sink)

AUX+/−2016 (DP Auxiliary channel signal—signal transmitted to or received from the video sink)

In one aspect, video source 2002 may transmit the following high-speed HDMI signals to the video sink:

ML0+/−2018 (DP Main Link high-speed signal 0)
ML1+/−2020 (DP Main Link high-speed signal 1)
ML2+/−2022 (DP Main Link high-speed signal 2)
ML3+/−2024 (DP Main Link high-speed signal 3)

In one aspect, each of modulation circuit 2032 and 2034 may be similar to out-of-band signal modulation circuit 1000. In one aspect, ML0+/−2018 and ML1+/−2020 signals received by modulation circuit 2032 from video source 2002 may be similar to high-speed signals 1002 and 1004, respectively. These two signals may be PAM4-modulated via a high-order pulse amplitude modulation circuit included in modulation circuit 2032, and converted to a PAM4 optical signal by a laser driving circuit (e.g., laser driving circuit 2030 that may be similar to laser driving circuit 1026) and a laser diode (e.g., laser diode 2040 that may be similar to laser diode 1034). At the same time, AUX+/−signal 2016 received by modulation circuit 2032 from video source 2002 may be used to perform an average optical power modulation on the PAM4 signal comprising ML0+/−2018 and ML1+/−2020 signals. AUX+/−signal 2016 may be similar to out-of-band signal 1006. In one aspect, laser diode 2040 outputs a PAM4 optical signal comprising ML0+/−2018 and ML1+/−2020 signals, that is average optical power-modulated by AUX+/−signal 2016. This PAM4 optical signal may be transmitted to an optical receiver over optical communication channel 2046 (that may be similar to optical communication channel 114).

In one aspect, AUX+/−signal 2016 is similar to out-of-band signal 228, ML0+/−2018 and ML1+/−2020 signals are similar to high-speed signals 216 and 218 respectively, modulation circuit 2032 is similar to modulation circuit 204, a combination of laser driving circuit 2030 and laser diode 2040 is similar to electro-optical conversion circuit 210, and optical communication channel 2046 is similar to optical communication channel 114.

In one aspect, ML2+/−2022 and ML3+/−2024 signals received by modulation circuit 2034 from video source 2002 may be similar to high-speed signals 1002 and 1004, respectively. These two signals may be PAM4-modulated via a high-order pulse amplitude modulation circuit, and converted to a PAM4 optical signal by a laser driving circuit (e.g., laser driving circuit 2036 that may be similar to laser driving circuit 1026) and a laser diode (e.g., laser diode 2042 that may be similar to laser diode 1034). At the same time, CONFIG1 signal 2012 and CONFIG2 signal 2014 received by modulation circuit 2034 from video source 2002 may be time-division multiplexed and used to perform an average optical power modulation on the PAM4 signal comprising ML2+/−2022 and ML3+/−2024 signals. CONFIG1 signal 2012 and CONFIG2 signal 2014 may be similar to out-of-band signals 1008 and 1010, respectively. In one aspect, laser diode 2042 outputs a PAM4 optical signal comprising ML2+/−2022 and ML3+/−2024 signals, that is average optical power-modulated by a time-division multiplexed signal that further includes CONFIG1 signal 2012 and CONFIG2 signal 2014. This PAM4 optical signal may be transmitted to an optical receiver over optical communication channel 2048 (that may be similar to optical communication channel 116).

In one aspect, CONFIG1 signal 2012 and CONFIG2 signal 2014 are similar to out-of-band signal 232, ML2+/−2022 and ML3+/−2024 signals are similar to high-speed signals 220 and 222 respectively, modulation circuit 2034 is similar to modulation circuit 206, a combination of laser driving circuit 2036 and laser diode 2042 is similar to electro-optical conversion circuit 212, and optical communication channel 2048 is similar to optical communication channel 116.

In one aspect, integrated circuit 2008 (e.g., optical transmitter 104) receives one or more modulated out-of-band optical signals from an optical receiver via a reverse transmission channel that may include optical communication channel 2044. These modulated out-of-band optical signals may be modulated using any combination of time-division multiplexing and higher-order pulse-amplitude modulation, as presented in the architectural circuit diagrams in FIGS. 12-17. In one aspect, the modulated out-of-band optical signals may be similar to single-channel optical signal 1222, PAM optical signal 1432, or PAM optical signal 1644.

In one aspect, optical communication channel 2044 may be similar to any of optical communication channel 1216, 1420, or 1628. Optical communication channel 2044 may be similar to optical communication channel 110.

In one aspect, the out-of-band optical signals received over optical communication channel 2044 may be converted to out-of-band electrical signals by photodetector 2038. Photodetector 2038 may be similar to any of photodetector 1302, 1502, or 1702. The out-of-band electrical signals may be amplified by transimpedance amplifier 2028. Transimpedance amplifier 2028 may be similar to any of linear transimpedance amplifier 1304, 1504, or 1704. The amplified out-of-band electrical signals output by transimpedance amplifier 2028 may be received by demodulation circuit 2026. Demodulation circuit 2026 may include architectural and functional aspects of optical transmitter interface 1300, 1500, or 1700. Demodulation circuit 2026 may extract multiple out-of-band signals such as HPD signal 2010, CONFIG1 signal 2012, CONFIG1 signal 2014, and AUX+/−signal 2016 from the amplified out-of-band electrical signals. These out-of-band electrical signals may be transmitted to video source 2002.

In one aspect, a collection of HPD signal 2010, CONFIG1 signal 2012, CONFIG1 signal 2014, and AUX+/−signal 2016 is similar to out-of-band signal 224. Demodulation circuit 2026 may be similar to demodulation circuit 202, a combination of photodetector 2038 and transimpedance amplifier 2028 may be similar to photoelectric conversion circuit 208, and optical communication channel 2044 may be similar to optical communication channel 110.

In one aspect, integrated circuit 2008 is an embodiment of optical transmitter 104 fabricated on an integrated circuit. Integrated circuit 2008 may be implemented on a printed circuit board (e.g., PCB 2006).

Figure 21:
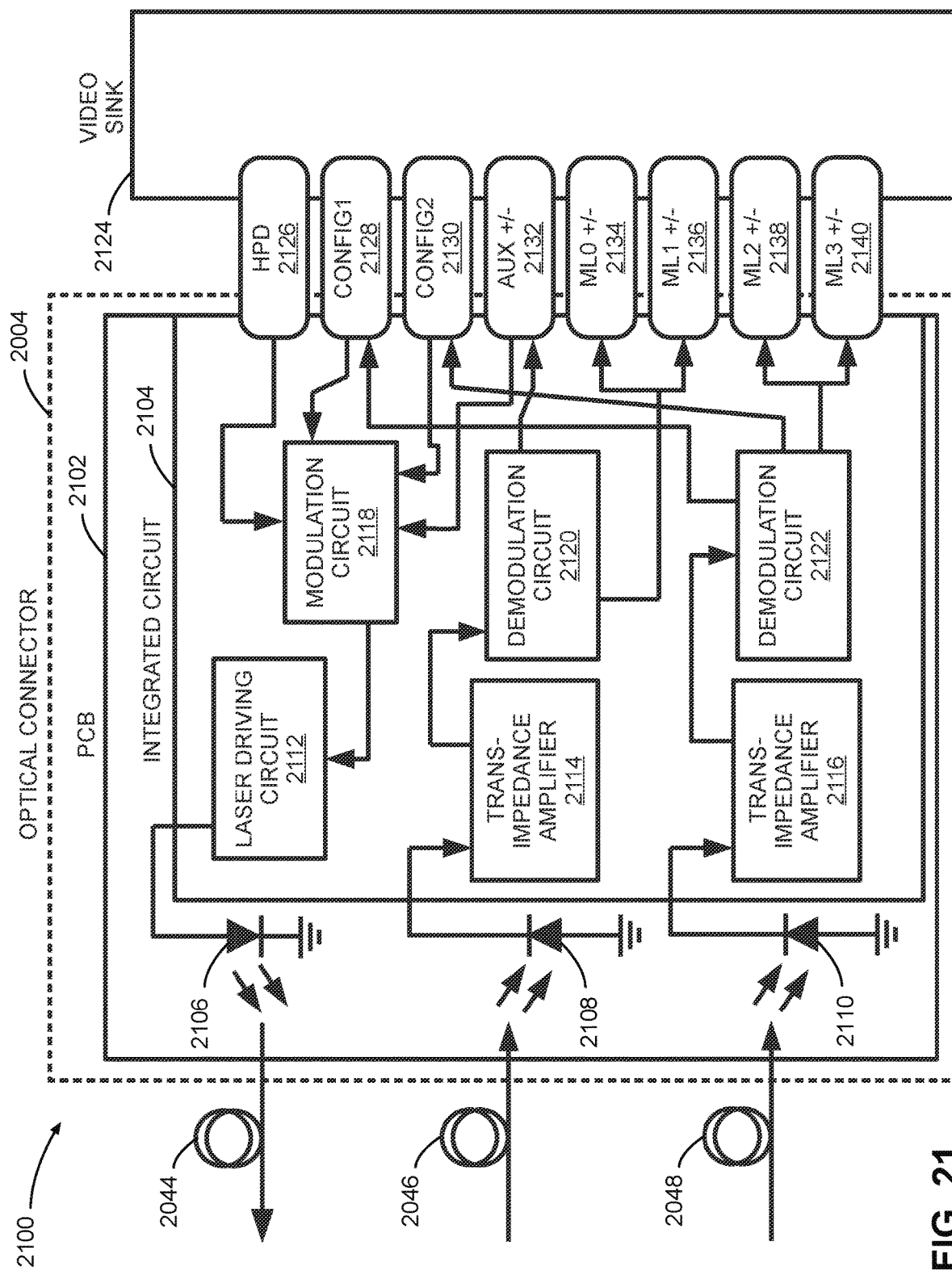
FIG. 21 is a block diagram depicting an embodiment of an optical receiver interface.

FIG. 21 is a block diagram depicting an embodiment of an optical receiver interface 2100. As depicted, optical transmitter interface 2100 includes video sink 2124, optical connector 2004, optical communication channel 2044, optical communication channel 2046, and optical communication channel 2048. Optical connector 2004 further includes printed circuit board PCB 2102. Printed circuit board 2102 further includes integrated circuit 2104, laser diode 2106, photodetector 2108, and photodetector 2110. Integrated circuit 2104 further includes modulation circuit 2118, demodulation circuit 2120, demodulation circuit 2122, laser driving circuit 2112, transimpedance amplifier 2114, and transimpedance amplifier 2116. In one aspect, optical communication channels 2044, 2046, and 2048 are integrated into optical connector 2004.

In one aspect, video sink 2124 may be similar to video sink 108, optical connector 2004 may be similar to optical connector 118, and integrated circuit 2104 may be similar to optical receiver 106. Video sink 2124 may be a DisplayPort (DP) video sink that communicates one or more high-speed and low-speed DP signals with a video source (e.g., video source 102), via optical connector 2004 and integrated circuit 2104.

In one aspect, video sink 2124 may communicate the following low-speed DP signals with the video source (e.g., video source 2002) via optical connector 2004 and integrated circuit 2104:

HPD 2126 (DP Hot Plug Detect signal—signal transmitted to the video source)
CONFIG1 2128 (DP CONFIG1—signal transmitted to or received from the video source)
CONFIG2 2130 (DP CONFIG2—signal transmitted to or received from the video source)
AUX+/−2132 (DP Auxiliary channel signal—signal transmitted to or received from the video source)

In one aspect, video sink 2124 may receive the following high-speed HDMI signals from the video source:

ML0+/−2134 (DP Main Link high-speed signal 0)
ML 1+/−2136 (DP Main Link high-speed signal 1)
ML 2+/−2138 (DP Main Link high-speed signal 2)
ML 3+/−2140 (DP Main Link high-speed signal 3)

In one aspect, each of demodulation circuit 2120 and 2122 may be similar to out-of-band signal demodulation circuit 1100. In one aspect, the PAM4 optical signal comprising ML0+/−2018 and ML1+/−2020 signals is received by photodetector 2108, via optical communication channel 2046. Photodetector 2108 may be similar to photodetector 1104. Photodetector 2108 may convert the PAM4 optical received via optical communication channel 2046 to a corresponding PAM4 electrical signal. Transimpedance amplifier 2114 may receive this PAM4 electrical signal and perform amplification and signal conditioning on the PAM4 electrical signal. Transimpedance amplifier 2114 may be similar in form and function to linear transimpedance amplifier 904. In one aspect, transimpedance amplifier 2114 outputs a conditioned PAM4 electrical signal that is received by demodulation circuit 2120. Demodulation circuit 2120 can perform an average optical power demodulation and decoding to extract AUX+/−signal 2132, ML0+/−signal 2134, and ML1+/−signal 2136 as electrical signals from the conditioned PAM4 electrical signal. In one aspect, each of CONFIG1 signal 2128, CONFIG2 signal 2130, AUX+/−signal 2132, ML0+/−signal 2134, and ML1+/−signal 2136 is an electrical signal. In one aspect, CONFIG1 signal 2128, CONFIG2 signal 2130, AUX+/−signal 2132, ML0+/−signal 2134, and ML1+/−signal 2136 are similar to CONFIG1 signal 2012, CONFIG2 signal 2014, AUX+/−signal 2016, ML0+/−signal 2018, and ML1+/−signal 2020, respectively.

In one aspect, AUX+/−signal 2132 is similar to out-of-band signal 318, ML0+/−signal 2134, and ML1+/−signal 2136 signals are similar to high-speed signals 328 and 330 respectively, demodulation circuit 2120 is similar to demodulation circuit 310, a combination of photodetector 2108 and transimpedance amplifier 2114 is similar to photoelectric conversion circuit 304, and optical communication channel 2046 is similar to optical communication channel 114.

In one aspect, the PAM4 optical signal comprising ML2+/−2022 and ML3+/−2024 signals is received by photodetector 2110, via optical communication channel 2048. Photodetector 2110 may be similar to photodetector 1104. Photodetector 2110 may convert the PAM4 optical received via optical communication channel 2048 to a corresponding PAM4 electrical signal. Transimpedance amplifier 2116 may receive this PAM4 electrical signal and perform amplification and signal conditioning on the PAM4 electrical signal. Transimpedance amplifier 2116 may be similar in form and function to linear transimpedance amplifier 904. In one aspect, transimpedance amplifier 2116 outputs a conditioned PAM4 electrical signal that is received by demodulation circuit 2122. Demodulation circuit 2122 can perform an average optical power demodulation and decoding to extract CONFIG1 signal 2128, CONFIG2 signal 2130, ML2+/−signal 2138, and ML3+/−signal 2140 as electrical signals from the conditioned PAM4 electrical signal. In one aspect, each of ML2+/−signal 2138, and ML3+/−signal 2140 is an electrical signal. In one aspect, ML2+/−signal 2138, and ML3+/−signal 2140 are similar to ML2+/−signal 2022, and ML3+/−signal 2024, respectively.

In one aspect, CONFIG1 signal 2128 and CONFIG2 signal 2130 are similar to out-of-band signal 322, ML2+/−signal 2138, and ML3+/−signal 2140 signals are similar to high-speed signals 332 and 334 respectively, demodulation circuit 2122 is similar to demodulation circuit 312, a combination of photodetector 2110 and transimpedance amplifier 2116 is similar to photoelectric conversion circuit 306, and optical communication channel 2048 is similar to optical communication channel 116.

In one aspect, integrated circuit 2104 (e.g., optical receiver 106) receives one or more out-of-band electrical signals from video sink 2124. These out-of-band electrical signals may include HPD signal 2126, CONFIG1 signal 2128, CONFIG2 signal 2120, and AUX+/−signal 2122. In one aspect, modulation circuit 2118 may include architectural aspects of optical receiver interface optical receiver interface 1200, 1400, or 1600, and may modulate these out-of-band signals in a manner similar to optical receiver 1224, optical receiver 1422, or optical receiver 1630. Modulation circuit 2118 can modulate HPD signal 2126, CONFIG1 signal 2128, CONFIG2 signal 2130, and AUX+/−signal 2132 into an electrical signal that may be similar to single-channel electrical signal 1220, PAM electrical signal 1430, or PAM electrical signal 1642. In one aspect, the electrical signal output by modulation circuit 2118 can be conditioned by laser driving circuit 2112 and converted into a corresponding optical signal by laser diode 2106. In one aspect, laser driving circuit 2112 is similar to laser driving circuit 1212, laser driving circuit 1416, or laser driving circuit 1624. Laser diode 2106 may be similar to laser diode 1214, laser diode 1418, or laser diode 1626. The optical signal output by laser diode 2106 may be similar to single-channel optical signal 1222, PAM optical signal 1432, or PAM optical signal 1644. This optical signal may be transmitted to an optical transmitter (e.g., optical transmitter 104) via optical communication channel 2044.

In one aspect, a collection of HPD signal 2126, CONFIG1 signal 2128, CONFIG2 signal 2120, and AUX+/−signal 2122 is similar to out-of-band signal 316. Modulation circuit 2118 may be similar to modulation circuit 308, a combination of laser driving circuit 2112 and laser diode 2106 may be similar to electro-optical conversion circuit 302, and optical communication channel 2044 may be similar to optical communication channel 110.

In one aspect, integrated circuit 2104 is an embodiment of optical receiver 106 fabricated on an integrated circuit. Integrated circuit 2104 may be implemented on a printed circuit board (e.g., PCB 2102).

In one aspect, optical connector 2004 implements a DisplayPort three-core active optical cable, with a total of three optical communication channels. In one aspect, out-of-band signals AUX 2016, CONFIG1 2012 and CONFIG2 2014 are modulated to a bias current of laser diodes 2040 and 2042 by modulation circuit 2032 and modulation circuit 2034. ML0+/−2018 and ML1+/−2020 signals can be converted into PAM4 signals by the modulation circuit 2032 and modulated onto a modulation current of laser diode 2040. ML2+/−2022 and ML3+/−2024 signals are converted into PAM4 signals by modulation circuit 2034, and modulated onto a modulation current of laser diode 2042. Outputs from laser diodes 204 and 2042 are optical signals that are transmitted to an optical receiver (e.g., integrated circuit 2104) through two optical fibers (e.g., optical fibers 2046 and 2048, respectively).

At the receiver (e.g., at integrated circuit 2104), the received optical signals are converted into ML0+/−2134, ML1+/−2136, ML2+/−2138, ML3+/−2140, AUX+/−2132, CONFIG1 2128 and CONFIG2 2130 signals to the display end (e.g., video sink 2124). Out-of-band signals HPD 2126, AUX+/−2132, CONFIG1 2128 and CONFIG2 2130 from video sink 2124 are transmitted to the transmitting end (e.g., integrated circuit 2008) through a reverse transmission path that includes optical communication channel 2044.

In one aspect, an optical transmitter (e.g., optical transmitter 104) and an optical receiver (e.g., optical receiver 106) are integrated as integrated circuits 2008 and 2104, respectively. Integrated circuits 2008 and 2104 may be pasted and wired on PCB 2006 and PCB 2102 respectively. Two lasers (e.g., laser diodes 2040 and 2042), and one photodetector (e.g., photodetector 2038) may be integrated onto PCB 2006. Two photodetectors (e.g., photodetectors 2108 and 2110) and one laser (e.g., laser diode 2106) are integrated onto PCB 2102. Therefore, a total of three lasers, three photodetectors and three optical fibers are used to realize the DisplayPort three-core active optical cable (i.e., optical connector 2004). The structure has the advantages of low implementation complexity, low cost, long transmission distance and good cable flexibility.

Figure 22:
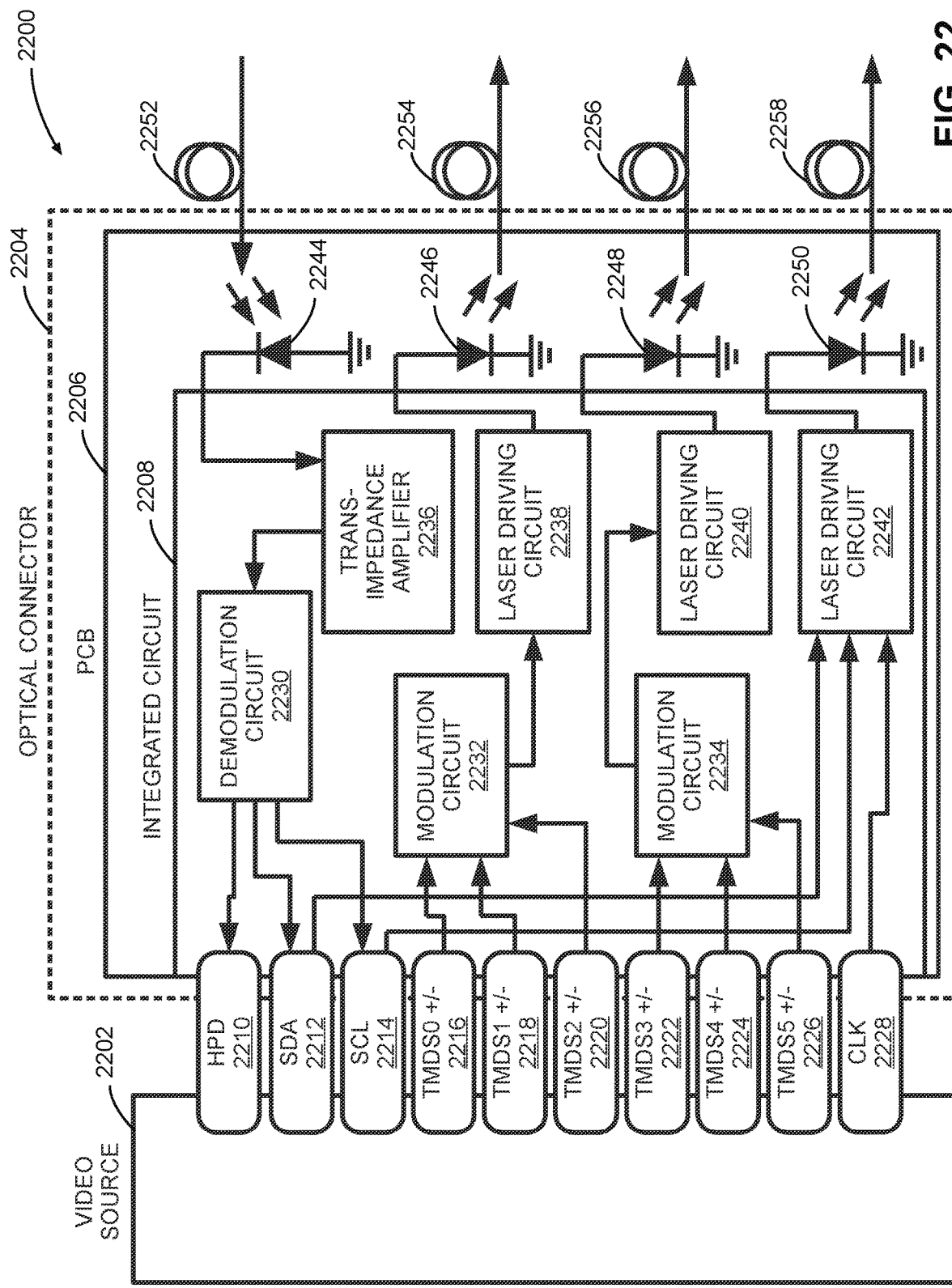
FIG. 22 is a block diagram depicting an embodiment of an optical transmitter interface.

FIG. 22 is a block diagram depicting an embodiment of an optical transmitter interface 2200. As depicted, optical transmitter interface 2200 includes video source 2202, optical connector 2204, optical communication channel 2252, optical communication channel 2254, optical communication channel 2256, and optical communication channel 2258. Optical connector 2204 further includes printed circuit board PCB 2206. Printed circuit board 2206 further includes integrated circuit 2208, photodetector 2244, laser diode 2246, laser diode 2248, and laser diode 2250. Integrated circuit 2208 further includes demodulation circuit 2230, modulation circuit 2232, modulation circuit 2234, transimpedance amplifier 2236, laser driving circuit 2238, laser driving circuit 2240, and laser driving circuit 2242. In one aspect, optical communication channels 2252, 2254, 2256, and 2258 are integrated into optical connector 2204.

In one aspect, video source 2202 may be similar to video source 102, optical connector 2204 may be similar to optical connector 118, and integrated circuit 2208 may be similar to optical transmitter 104. Video source 2202 may be a digital visual interface (DVI) video source that communicates one or more high-speed and low-speed DVI signals with a video sink (e.g., video sink 108), via optical connector 2204 and integrated circuit 2208.

In one aspect, video source 2202 may communicate the following low-speed DVI signals with the video sink via optical connector 2204 and integrated circuit 2208:
  HPD 2210 (DVI Hot Plug Detect signal—signal received from the video sink)
  SDA 2212 (DVI Serial DDC Data—signal transmitted to or received from the video sink)
  SCL 2214 (DVI Serial DDC Clock—signal transmitted to or received from the video sink)
  CLK 2228 (DVI clock—signal transmitted to the video sink)

In one aspect, video source 2202 may transmit the following high-speed DVI signals to the video sink:
  TMDS0+/−2216 (DVI transition-minimized differential signaling high-speed signal 0)
  TMDS1+/−2218 (DVI transition-minimized differential signaling high-speed signal 1)
  TMDS2+/−2220 (DVI transition-minimized differential signaling high-speed signal 2)
  TMDS3+/−2222 (DVI transition-minimized differential signaling high-speed signal 3)
  TMDS4+/−2224 (DVI transition-minimized differential signaling high-speed signal 3)
  TMDS5+/−2226 (DVI transition-minimized differential signaling high-speed signal 3)

In one aspect, each of modulation circuit 2232 and 2234 may be similar to high-speed modulation circuit 800. In one aspect, TMDS0+/−2216, TMDS1+/−2218 and TMDS2+/−2220 signals received by modulation circuit 2232 from video source 2202 may be similar to high-speed signals 802 or 822. These three signals may be PAM8-modulated via a high-order pulse amplitude modulation circuit (e.g., a 4:2:1 weighted adder circuit) included in modulation circuit 2232, and converted to a PAM8 optical signal by a laser driving circuit (e.g., laser driving circuit 2238 that may be similar to linear laser circuit 816) and a laser diode (e.g., laser diode 2246 that may be similar to laser 818). In one aspect, laser diode 2246 outputs a PAM8 optical signal comprising TMDS0+/−2216, TMDS1+/−2218 signals, and TMDS2+/−2220 signals. This PAM8 optical signal may be transmitted to an optical receiver over optical communication channel 2254 (that may be similar to optical communication channel 114).

In one aspect, TMDS0+/−2216, TMDS1+/−2218, and TMDS2+/−2220 signals are similar to high-speed signal 216 or 218, modulation circuit 2232 is similar to modulation circuit 204, a combination of laser driving circuit 2238 and laser diode 2246 is similar to electro-optical conversion circuit 210, and optical communication channel 2254 is similar to optical communication channel 114.

In one aspect, TMDS3+/−2222, TMDS4+/−2224, and TMDS5+/−2226 signals received by modulation circuit 2234 from video source 2202 may be similar to high-speed signals 802 or 822. These three signals may be PAM8-modulated via a high-order pulse amplitude modulation circuit (e.g., a 4:2:1 weighted adder circuit) included in modulation circuit 2234, and converted to a PAM8 optical signal by a laser driving circuit (e.g., laser driving circuit 2240 that may be similar to linear laser circuit 816) and a laser diode (e.g., laser diode 2248 that may be similar to laser 818). In one aspect, laser diode 2248 outputs a PAM8 optical signal comprising TMDS3+/−2222, TMDS4+/−2224, and TMDS5+/−2226. This PAM8 optical signal may be transmitted to an optical receiver over optical communication channel 2256 (that may be similar to optical communication channel 116).

In one aspect, SDA 2214 and SCL 2216 signals are received by laser driving circuit 2242. Laser driving circuit 2242 also receives CLK signal 2228. Laser driving circuit 2242 may modulate an NRZ signal associated with CLK signal 2228 with SDA 2212 and SCL 2214 signals, using average power modulation. The modulated output signal of laser driving circuit is converted to an optical signal by laser diode 2250. This optical signal is an NRZ signal corresponding to CLK signal 2228, with average optical power modulation based on SDA 2212 and SCL 2214 signals. The optical signal may be transmitted over optical communication channel 2258.

In one aspect, integrated circuit 2208 (e.g., optical transmitter 104) receives one or more modulated out-of-band optical signals from an optical receiver via a reverse transmission channel that may include optical communication channel 2252. These modulated out-of-band optical signals may be modulated using any combination of time-division multiplexing and higher-order pulse-amplitude modulation, as presented in the architectural circuit diagrams in FIGS. 12-17. In one aspect, the modulated out-of-band optical signals may be similar to single-channel optical signal 1222, PAM optical signal 1432, or PAM optical signal 1644.

In one aspect, optical communication channel 2252 may be similar to any of optical communication channel 1216, 1420, or 1628. Optical communication channel 1846 may be similar to optical communication channel 110.

In one aspect, the out-of-band optical signals received over optical communication channel 2252 may be converted to out-of-band electrical signals by photodetector 2244. Photodetector 2244 may be similar to any of photodetector 1302, 1502, or 1702. The out-of-band electrical signals may be amplified by transimpedance amplifier 2236. Transimpedance amplifier 2236 may be similar to any of linear transimpedance amplifier 1304, 1504, or 1704. The amplified out-of-band electrical signals output by transimpedance amplifier 2236 may be received by demodulation circuit 2230. Demodulation circuit 2230 may include architectural and functional aspects of optical transmitter interface 1300, 1500, or 1700. Demodulation circuit 2230 may extract multiple out-of-band signals such as HPD signal 2210, SDA signal 2212, and SCL signal 2214 from the amplified out-of-band electrical signals. These out-of-band electrical signals may be transmitted to video source 2202.

In one aspect, a collection of HPD signal 2210, SDA signal 2212, and SCL signal 2214 is similar to out-of-band signal 224. Demodulation circuit 2230 may be similar to demodulation circuit 202, a combination of photodetector 2244 and transimpedance amplifier 2236 may be similar to photoelectric conversion circuit 208, and optical communication channel 2252 may be similar to optical communication channel 110.

In one aspect, integrated circuit 2208 is an embodiment of optical transmitter 104 fabricated on an integrated circuit. Integrated circuit 2208 may be implemented on a printed circuit board (e.g., PCB 2206).

Figure 23:
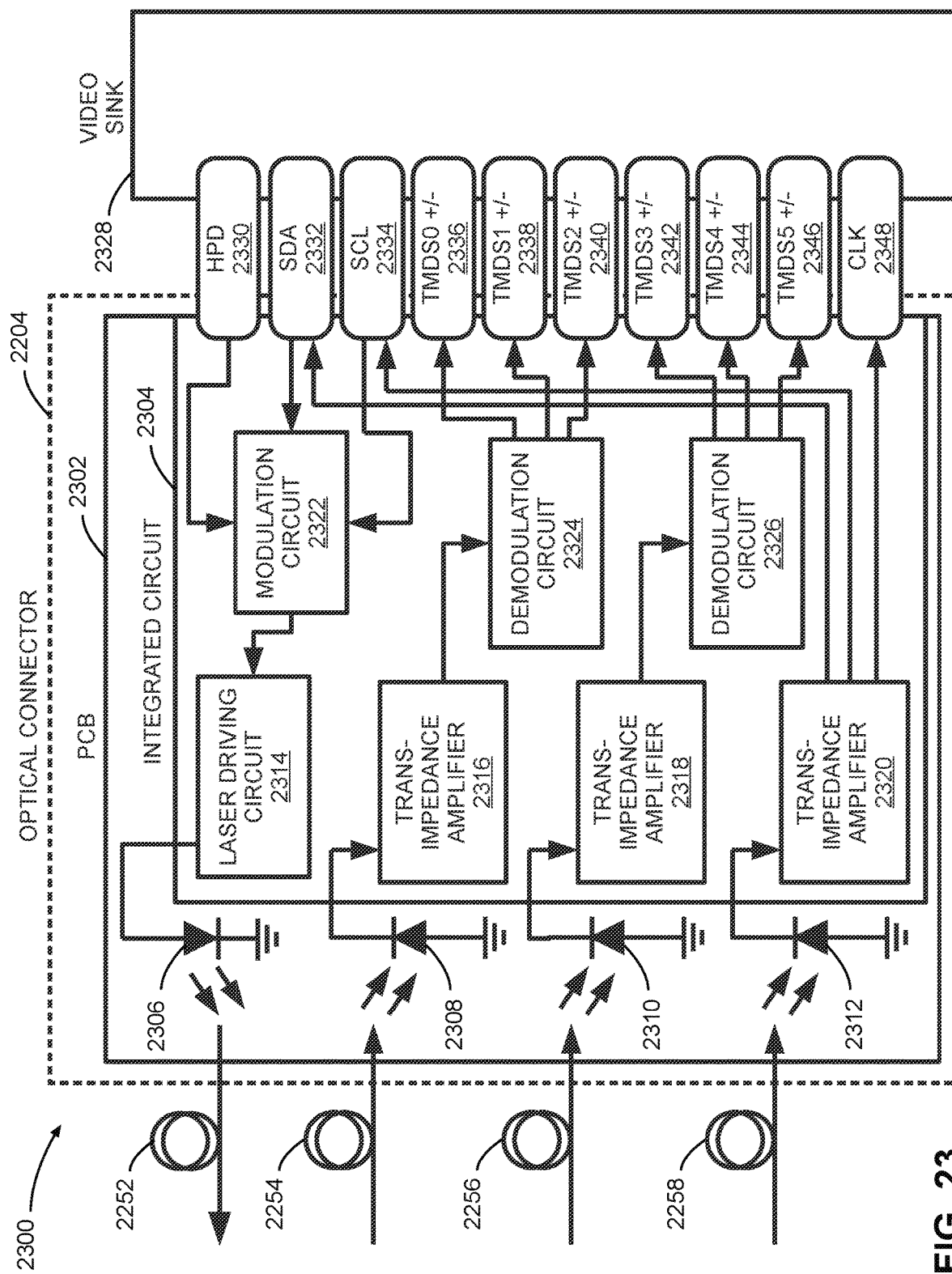
FIG. 23 is a block diagram depicting an embodiment of an optical receiver interface.

FIG. 23 is a block diagram depicting an embodiment of an optical receiver interface 2300. As depicted, optical transmitter interface 2300 includes video sink 2328, optical connector 2204, optical communication channel 2252, optical communication channel 2254, optical communication channel 2256, and optical communication channel 2258. Optical connector 2204 further includes printed circuit board PCB 2302. Printed circuit board 2302 further includes integrated circuit 2304, laser diode 2306, photodetector 2308, photodetector 2310, and photodetector 2312. Integrated circuit 2304 further includes modulation circuit 2322, demodulation circuit 2324, demodulation circuit 2326, laser driving circuit 2314, transimpedance amplifier 2316, transimpedance amplifier 2318, and transimpedance amplifier 2320. In one aspect, optical communication channels 2252, 2254, 2256, and 2258 are integrated into optical connector 2204.

In one aspect, video sink 2328 may be similar to video sink 108, optical connector 2204 may be similar to optical connector 118, and integrated circuit 2304 may be similar to optical receiver 106. Video sink 2328 may be an DVI video sink that communicates one or more high-speed and low-speed DVI signals with a video source (e.g., video source 102), via optical connector 2204 and integrated circuit 2304.

In one aspect, video sink 2328 may communicate the following low-speed DVI signals with the video source (e.g., video source 2202) via optical connector 2204 and integrated circuit 2304:

HPD 2330 (DVI Hot Plug Detect signal—signal transmitted to the video source)

SDA 2332 (DVI Serial DDC Data—signal transmitted to or received from the video source)

SCL 2334 (DVI Serial DDC Clock—signal transmitted to or received from the video source)

CLK 2348 (DVI clock—signal received from the video source)

In one aspect, video sink 1924 may receive the following high-speed HDMI signals from the video source:

TMDS0+/−2336 (DVI transition-minimized differential signaling high-speed signal 0)

TMDS1+/−2338 (DVI transition-minimized differential signaling high-speed signal 1)

TMDS2+/−2340 (DVI transition-minimized differential signaling high-speed signal 2)

TMDS3+/−2342 (DVI transition-minimized differential signaling high-speed signal 3)

TMDS4+/−2344 (DVI transition-minimized differential signaling high-speed signal 3)

TMDS5+/−2346 (DVI transition-minimized differential signaling high-speed signal 3)

In one aspect, each of demodulation circuit 2324 and 2326 may be similar to high-speed demodulation circuit 900. In one aspect, the PAM8 optical signal comprising TMDS0+/−2216, TMDS1+/−2218, and TMDS2+/−2220 signals is received by photodetector 2308, via optical communication channel 2254. Photodetector 2308 may be similar to photodetector PD 902. Photodetector 2308 may convert the PAM8 optical received via optical communication channel 2254 to a corresponding PAM8 electrical signal. Transimpedance amplifier 2316 may receive this PAM8 electrical signal and perform amplification and signal conditioning on the PAM8 electrical signal. Transimpedance amplifier 2316 may be similar in form and function to linear transimpedance amplifier 904. In one aspect, transimpedance amplifier 2316 outputs a conditioned PAM8 electrical signal that is received by demodulation circuit 2324. Demodulation circuit 2324 can decode this conditioned PAM8 electrical signal to extract DVI high-speed electrical signals—TMDS0+/−signal 2336, TMDS1+/−signal 2338, and TMDS2+/−signal 2340 as electrical signals from the conditioned PAM8 electrical signal. This decoding may be performed by using one or more threshold decision devices as depicted in FIG. 9. In one aspect, each of TMDS0+/−signal 2336, TMDS1+/−signal 2338, and TMDS2+/−signal 2340 is an electrical signal. In one aspect, TMDS0+/−signal 2336, TMDS1+/−signal 2338, and TMDS2+/−signal 2340 are similar to TMDS0+/−signal 2216, TMDS1+/−signal 2218, and TMDS2+/−signal 2220, respectively.

In one aspect, TMDS0+/−signal 2336, TMDS1+/−signal 2338, and TMDS2+/−signal 2340 signals are similar to high-speed signal 328 or 330, demodulation circuit 2324 is similar to demodulation circuit 310, a combination of photodetector 2308 and transimpedance amplifier 2316 is similar to photoelectric conversion circuit 304, and optical communication channel 2254 is similar to optical communication channel 114.

In one aspect, the PAM8 optical signal comprising TMDS3+/−2222, TMDS4+/−2224, and TMDS5+/−2226 signals is received by photodetector 2310, via optical communication channel 2256. Photodetector 2310 may be similar to photodetector PD 902. Photodetector 2310 may convert the PAM8 optical received via optical communication channel 2256 to a corresponding PAM8 electrical signal. Transimpedance amplifier 238 may receive this PAM8 electrical signal and perform amplification and signal conditioning on the PAM8 electrical signal. Transimpedance amplifier 2318 may be similar in form and function to linear transimpedance amplifier 904. In one aspect, transimpedance amplifier 2318 outputs a conditioned PAM8 electrical signal that is received by demodulation circuit 2326. Demodulation circuit 2326 can decode this conditioned PAM8 electrical signal to extract DVI high-speed electrical signals—TMDS3+/−signal 2342, TMDS4+/−signal 2344, and TMDS5+/−signal 2346 as electrical signals from the conditioned PAM8 electrical signal. This decoding may be performed by using one or more threshold decision devices as depicted in FIG. 9. In one aspect, each of TMDS3+/−signal 2342, TMDS4+/−signal 2344, and TMDS5+/−signal 2346 is an electrical signal. In one aspect, TMDS3+/−signal 2342, TMDS4+/−signal 2344, and TMDS5+/−signal 2346 are similar to TMDS3+/−signal 2222, TMDS4+/−signal 2224, and TMDS5+/−signal 2226, respectively.

In one aspect, TMDS3+/−signal 2342, TMDS4+/−signal 2344, and TMDS5+/−signal 2346 signals are similar to high-speed signal 332 or 334, demodulation circuit 2326 is similar to demodulation circuit 312, a combination of photodetector 2310 and transimpedance amplifier 2318 is similar to photoelectric conversion circuit 306, and optical communication channel 2256 is similar to optical communication channel 116.

In one aspect, photodetector 2312 receives an optical signal comprising an NRZ optical signal corresponding to CLK signal 2228, with average optical power modulation based on SDA 2212 and SCL 2214 signals via optical communication channel 2258. Photodetector 2312 may convert the NRZ optical signal into an NRZ electrical signal. Transimpedance amplifier 2320 may extract SDA signal 2332, SCL signal 2334, and CLK signal 2348 from the NRZ electrical signal. These signals may be electrical signals, and may be transmitted to video sink 2328.

In one aspect, integrated circuit 2304 (e.g., optical receiver 106) receives one or more out-of-band electrical signals from video sink 2328. These out-of-band electrical signals may include HPD signal 2330, SDA signal 2332, and SCL signal 2334. In one aspect, modulation circuit 2322 may include architectural aspects of optical receiver interface optical receiver interface 1200, 1400, or 1600, and may modulate these out-of-band signals in a manner similar to optical receiver 1224, optical receiver 1422, or optical receiver 1630. Modulation circuit 2322 can modulate HPD signal 2330, SDA signal 2332, and SCL signal 2334 into an electrical signal that may be similar to single-channel electrical signal 1220, PAM electrical signal 1430, or PAM electrical signal 1642. In one aspect, the electrical signal output by modulation circuit 2322 can be conditioned by laser driving circuit 2314 and converted into a corresponding optical signal by laser diode 2306. In one aspect, laser driving circuit 2314 is similar to laser driving circuit 1212, laser driving circuit 1416, or laser driving circuit 1624. Laser diode 2306 may be similar to laser diode 1214, laser diode 1418, or laser diode 1626. The optical signal output by laser diode 2306 may be similar to single-channel optical signal 1222, PAM optical signal 1432, or PAM optical signal 1644. This optical signal may be transmitted to an optical transmitter (e.g., optical transmitter 104) via optical communication channel 2252.

In one aspect, a collection of HPD signal 2330, SDA signal 2332, and SCL signal 2334 is similar to out-of-band signal 316. Modulation circuit 2322 may be similar to modulation circuit 308, a combination of laser driving circuit 2314 and laser diode 2306 may be similar to electro-optical conversion circuit 302, and optical communication channel 2252 may be similar to optical communication channel 110.

In one aspect, integrated circuit 2304 is an embodiment of optical receiver 106 fabricated on an integrated circuit. Integrated circuit 2304 may be implemented on a printed circuit board (e.g., PCB 2302).

In one aspect, optical connector 2204 implements a DVI-Dual four-core active optical cable, with a total of four optical communication channels. Because of the low signal transmission rate in DVI, PAM8 modulation is used to transmit audio/video signals in this implementation. At the transmitter (e.g., integrated circuit 2208), out-of-band signals SDA 2212 and SCL 2214 are modulated into bias current of the laser by laser driving circuit 2242, and TMDS0+/−2216, TMDS1+/−2218, and TMDS2+/−2220 signals are converted into PAM8 signals by the modulation circuit 2232 and modulated into modulation current of laser diode 2246. The TMDS3+/−2222, TMDS4+/−2224, and TMDS5+/−2226 signals are converted into PAM8 signals by the modulation circuit 2234 and modulated to laser diode 2248. CLK signal 2228 is directly modulated on the modulated signal of laser diode 2250, via laser driving circuit 2242, by NRZ code. The high-speed and low-speed optical signals are transmitted to an optical receiver (e.g., integrated circuit 2304) using three optical communication channels 2254, 2256, and 2258. At integrated circuit 2304, the received optical signals are converted into TMDS0+/−2336, TMDS1+/−2338, TMDS2+/−2340, TMDS3+/−2342, TMDS4+/−2344, TMDS5+/−2346, CLK 2348, SDA 2332 and SCL 2334 signals at the integrated circuit 2344, and transmitted to the display end (i.e., video sink 2328). Out-of-band signals SDA 2332, SCL 2334 and HPD 2330 at integrated circuit 2304 are transmitted to the transmitting end and the source end by using another optical path (i.e., optical communication channel 2252) through a reverse transmission path (e.g., optical communication channel 110).

In one aspect, an optical transmitter (e.g., optical transmitter 104) and an optical receiver (e.g., optical receiver 106) are integrated as integrated circuits 2208 and 2304, respectively. Three lasers (e.g., laser diodes 2246, 2248, and 2250) and one photodetector (e.g., photodetector 2244) may be integrated onto PCB 2206. Three photodetectors (e.g., photodetectors 2308, 2310 and 2312) and one laser (e.g., laser diode 2306) are integrated onto PCB 2302. Therefore, four lasers, four photodetectors and four optical fibers are used to realize a DVI-Dual four-core active optical cable. The structure has the advantages of low implementation complexity, low cost, long transmission distance and good cable flexibility.

Figure 24:
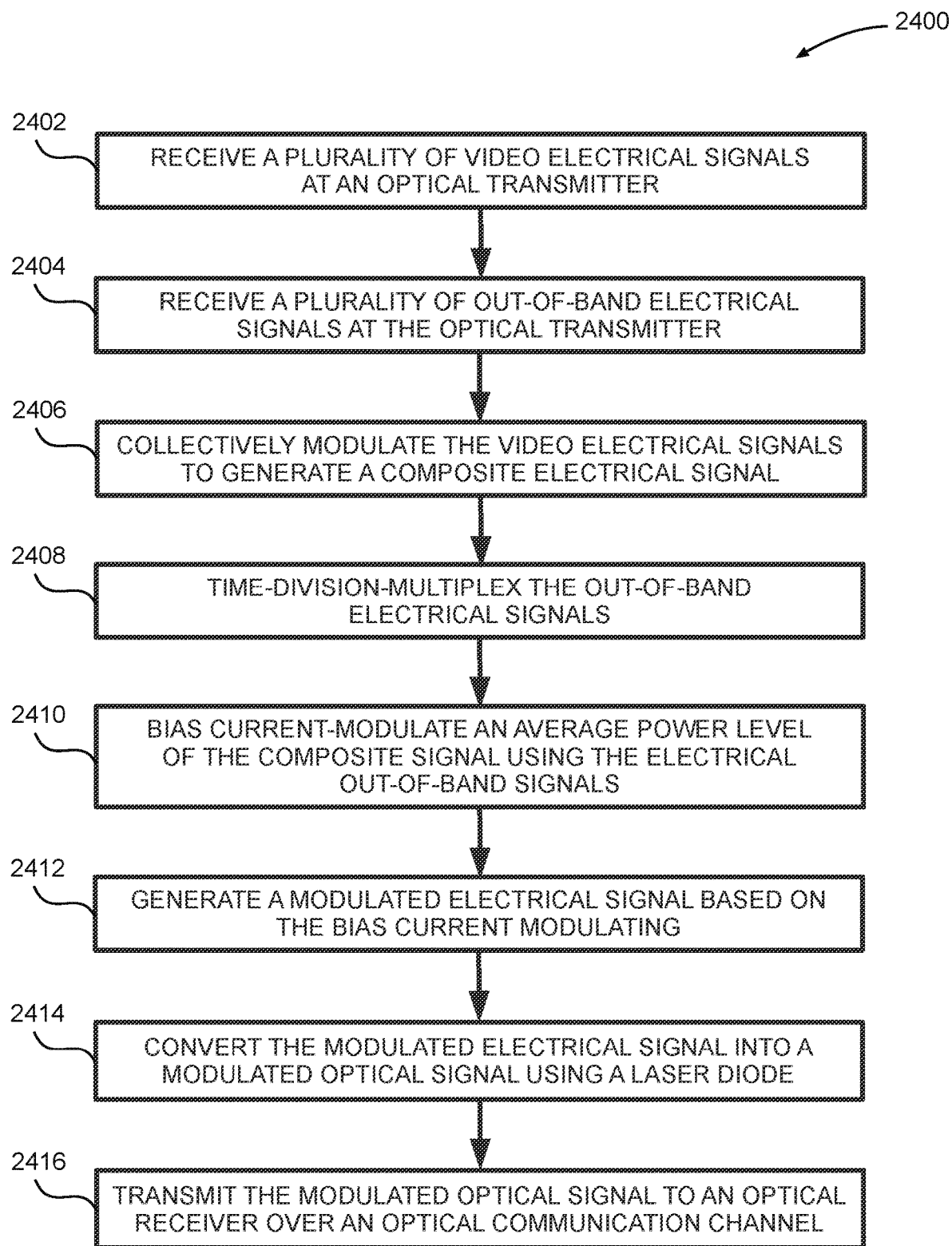
FIG. 24 is a flow diagram depicting a method to transmit a modulated optical signal.

FIG. 24 is a flow diagram depicting a method 2400 to transmit a modulated optical signal. Method 2400 may include receiving a plurality of audio-video electrical signals at an optical transmitter (2402). For example, optical transmitter 104 may receive a plurality of audio-video electrical signals (e.g., high-speed signals 216 through 222) from video source 102.

Method 2400 may include receiving a plurality of out-of-band signals electrical at the optical transmitter (2404). For example, optical transmitter 104 may receive a plurality of out-of-band electrical signals (e.g., out-of-band signals 228 and 232) from video source 102.

Method 2400 may include collectively modulating the audio-video electrical signals to generate a composite electrical signal (2406). For example, high-order pulse amplitude modulation circuit 1016 may collectively modulate high-speed signals 1002 and 1004 to generate PAM4 electrical signal 1042.

Method 2400 may include time-division multiplexing the out-of-band electrical signals (2048). For example, time division multiplexing units 1022 and 1024 may time-division multiplex out-of-band signals 1008, 1010, and 1012.

Method 2400 may include bias current-modulating an average power level of the composite signal using the electrical out-of-band signals (2410). In one aspect, the time-division multiplexed out-of-band signals may be used to perform the bias current modulation. For example, first channel 1046 may be used to power-modulate PAM4 electrical signal 1042, via laser driving circuit 1026.

Method 2400 may include generating a modulated electrical signal based on the bias current modulating (2412). For example, laser driving circuit 1026 may generate modulated electrical signal 1050.

Method 2400 may include converting the modulated electrical signal into a modulated optical signal using a laser diode (2414). For example, laser diode 1034 may convert modulated electrical signal 1050 into (modulated) optical signal 1036.

Method 2400 may include transmitting the modulated optical signal to an optical receiver over an optical communication channel (2416). For example, optical signal 1036 may be transmitted from optical transmitter 104 to optical receiver 106 via optical communication channel 114.

Figure 25:
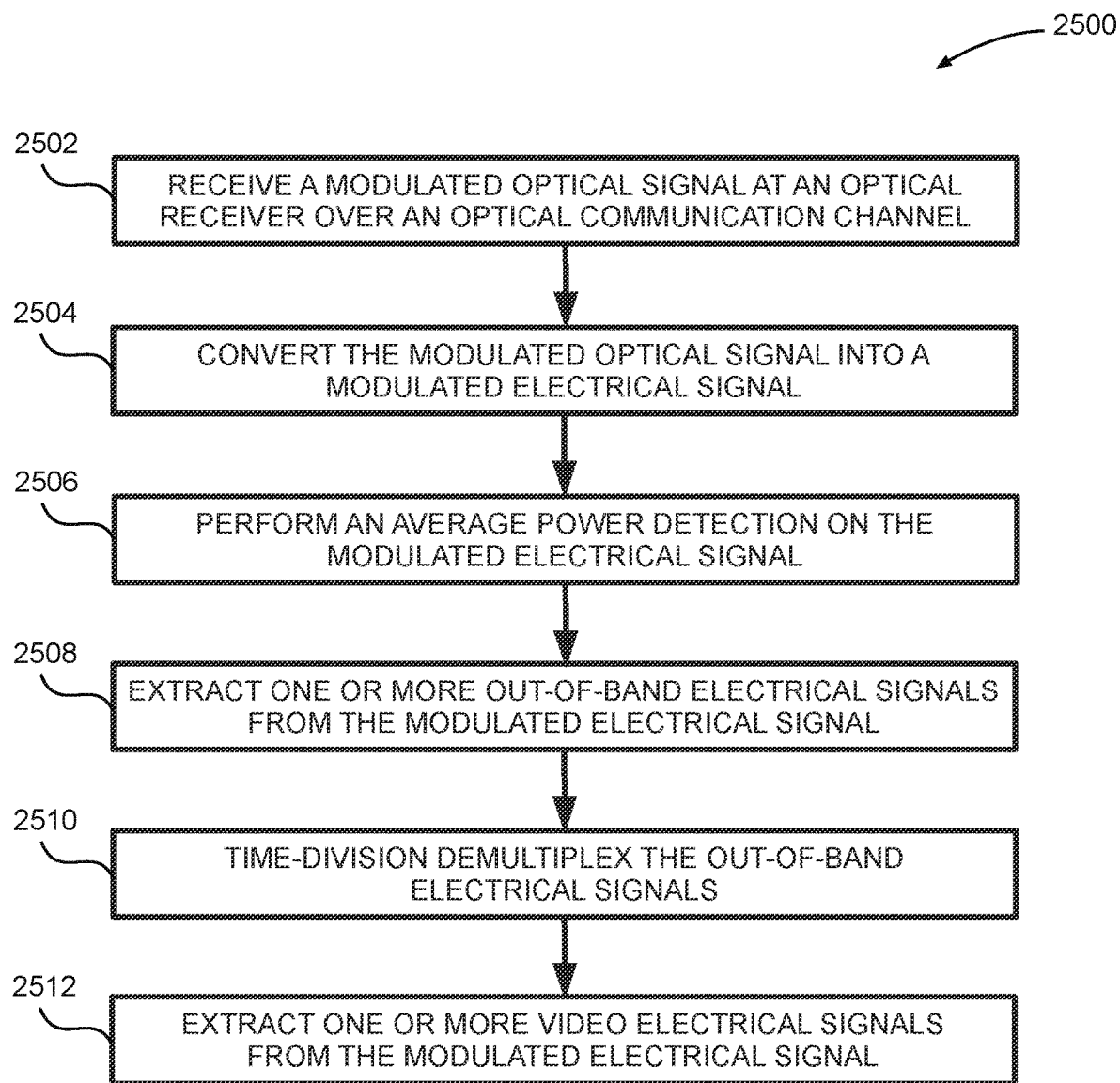
FIG. 25 is a flow diagram depicting a method to receive a modulated optical signal.

FIG. 25 is a flow diagram depicting a method 2500 to receive a modulated optical signal. Method 2500 may include receiving a modulated optical signal at an optical receiver over an optical communication channel (2502). In one aspect, the modulated optical signal collectively represents a composite electrical signal of a one or more audio-video signals, and one or more out-of-band signals. For example, out-of-band signal demodulation unit 1100 (that may be included in optical receiver 106) receives optical signal 1102 via optical communication channel 114.

Method 2500 may include converting the modulated optical signal into a modulated electrical signal (2504). For example, photodetector 1104 may convert optical signal 1102 into modulated electrical signal 1138.

Method 2500 may include performing an average power detection from the modulated electrical signal (2506). For example, average optical power detection circuit 1108 may perform an average power detection on modulated electrical signal 1138.

Method 2500 may include extracting one or more out-of-band electrical signals from the modulated electrical signal (2508). In one aspect, the out-of-band electrical signals are multiplexed. For example, based on the average power detection, optical power detection circuit 1108 may extract multiplexed electrical signal 1142 from modulated electrical signal 1138.

Method 2500 may include time-division demultiplexing the out-of-band electrical signals (2510). For example, time-division demultiplexing unit 1110 may demultiplex multiplexed electrical signal 1142 to generate first set of out-of-band electrical signals 1146.

Method 2500 may include extracting one or more audio-video electrical signals from the modulated electrical signal (2512). For example, high-order pulse amplitude demodulation circuit 1106 may extract high-speed signals 1124 and 1126 from modulated electrical signal 1138.

Figure 26:
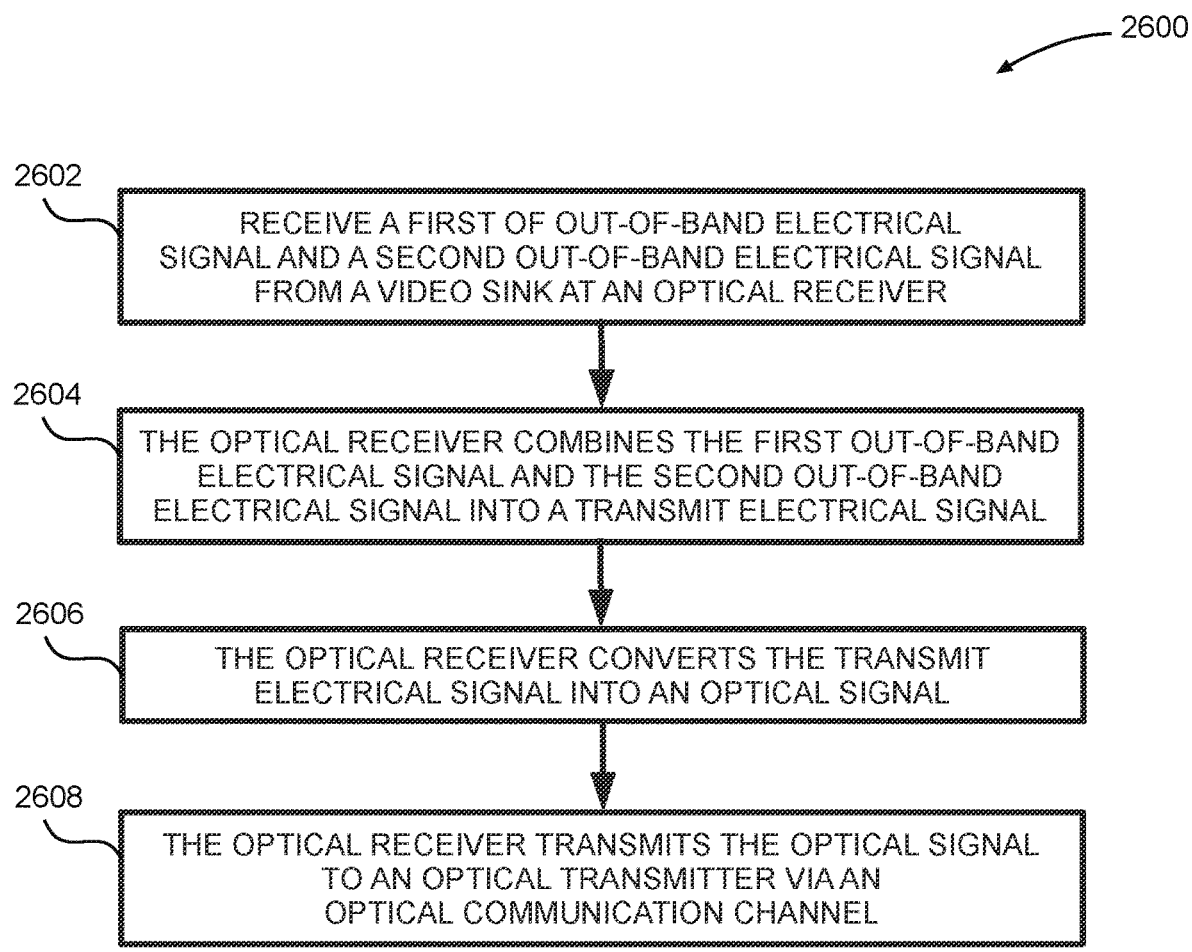
FIG. 26 is a flow diagram depicting a method to transmit an optical signal.

FIG. 26 is a flow diagram depicting a method 2600 to transmit an optical signal. Method 2600 may include receiving a first out-of-band signal and a second out-of-band signal from a video sink at an optical receiver (2602). In one aspect, the first out-of-band electrical signal corresponds to a audio-video stream previously received or concurrently being received from a video source optical transmitter at the optical receiver, and the second out-of-band electrical signal also corresponds to the audio-video stream. For example, optical receiver 106 may receive out-of-band signals similar to out-of-band signals 1202 and 1204, 1402 and 1404, or 1602 and 1604, from video sink 108. In one aspect, the first and second out-of-band signals correspond to, for example, a combination of high-speed signals 216 and 218 received from optical transmitter 104 via optical communication channel 114. Examples of such out-of-band signals include SDA signal 1930 and SCL signal 1932.

Method 2600 may include the optical receiver combining the first out-of-band electrical signal and the second out-of-band electrical signal into a transmit electrical signal (2604). For example, time-division multiplexing unit 1210, 1:2:4 weighted adding circuit 1414, or a combination of time-division multiplexing units 1612 and 1616, and 1:2:4 weighted adding circuit 1620 may combine two or more out-of-band signals into transmit electrical signal 1220, PAM electrical signal 1430, or PAM electrical signal 1642, respectively.

Method 2600 may include the optical receiver converting the transmit electrical signal into an optical signal (2606). For example, laser diode 1214 converts transmit electrical signal 1220 into single-channel optical signal 1222; laser diode 1418 converts PAM electrical signal 1430 into PAM optical signal 1432; and laser diode 1626 converts PAM electrical signal 1642 into PAM optical signal 1644.

Method 2600 may include the optical receiver transmitting the optical signal to an optical transmitter via an optical communication channel (2608). For example, single-channel optical signal 1222, PAM optical signal 1432, or PAM optical signal 1644 may be transmitted to optical transmitter 104 via optical communication channel 1216, optical communication channel 1420, or optical communication channel 1628, respectively.

Figure 27:
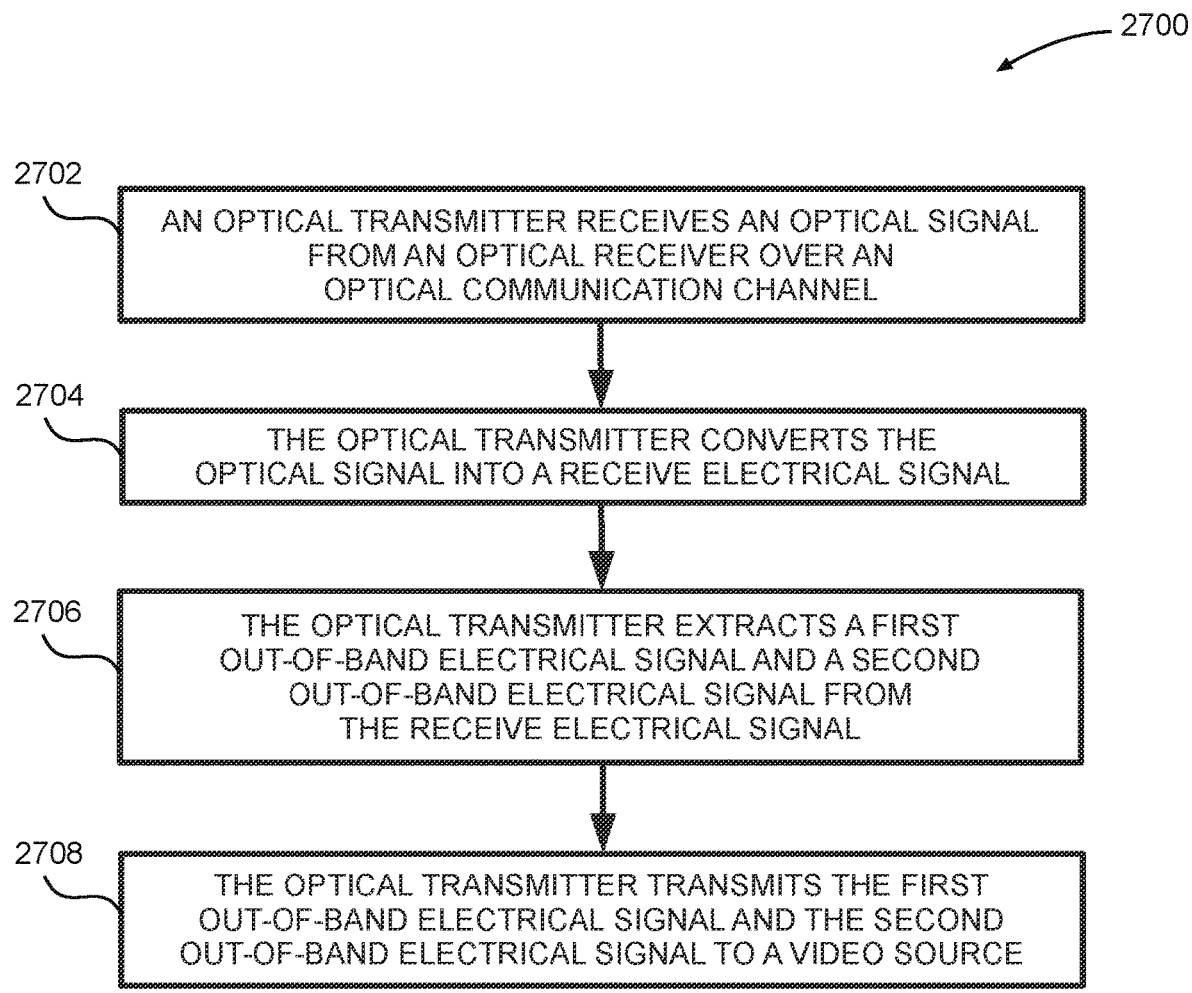
FIG. 27 is a flow diagram depicting a method to receive an optical signal.

FIG. 27 is a flow diagram depicting a method 2700 to receive an optical signal. Method 2700 may include an optical transmitter receiving an optical signal from an optical receiver over an optical communication channel (2702). In one aspect, the optical signal is comprised of a first out-of-band signal and a second out-of-band signal. The first out-of-band signal may correspond to a audio-video stream transmitted by the optical transmitter, and the second out-of-band signal may correspond to the audio-video stream. For example, optical transmitter 104 may receive two or more out-of-band signals from optical receiver 106 via optical communication channel 110. In one aspect, the first and second out-of-band signals correspond to, for example, a combination of high-speed signals 216 and 218 transmitted by optical transmitter 104 via optical communication channel 114. Examples of such out-of-band signals include SDA signal 1930 and SCL signal 1932.

Method 2700 may include the optical transmitter converting the optical signal into a receive electrical signal (2704). For example, photodetector 1302 may convert single-channel optical signal 1222 into single-channel electrical signal 1316, photodetector 1502 may convert PAM optical signal 1432 into PAM electrical signal 1526, or photodetector 1702 may convert PAM optical signal 1644 to PAM electrical signal 1733.

Method 2700 may include the optical transmitter extracting a first out-of-band electrical signal corresponding to the first out-of-band signal and a second out-of-band electrical signal corresponding to the second out-of-band signal from the receive electrical signal (2706). For example, optical transmitter 1322 may extract out-of-band electrical signals 1312 and 1314 from single-channel electrical signal 1316, optical transmitter 1524 may extract out-of-band signals 1518 and 1520 from PAM electrical signal 1526, or optical transmitter 1732 may extract out-of-band signals 1722 and 1724 from PAM electrical signal 1733.

Method 2700 may include the optical transmitter transmitting the first out-of-band electrical signal and the second out-of-band electrical signal to a video source (2708). For example, optical transmitter 104 may transmit two or more out-of-band signals included in out-of-band signal 214 to video source 102.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
receiving a first out-of-band electrical signal and a second out-of-band electrical signal from a video sink at an optical receiver, wherein the first out-of-band electrical signal and the second out-of-band electrical signal correspond to an out-of-band signal transmission protocol included in a digital video communication standard and are associated with an audio-video stream previously received or concurrently being received from a video source optical transmitter by the optical receiver, wherein the audio-video stream is distinct from each of the first out-of-band electrical signal and the second out-of-band electrical signal, wherein the digital video communication standard includes transmitting the audio-video stream from the optical transmitter to the optical receiver, and wherein the out-of-band signal transmission protocol includes transmitting first and the second the out-of-band signals from the optical receiver to the optical transmitter;

the optical receiver combining the first out-of-band electrical signal and the second out-of-band electrical signal into a transmit electrical signal;
the optical receiver converting the transmit electrical signal into an optical signal; and
the optical receiver transmitting the optical signal to the optical transmitter via an optical communication channel.

2. The method of claim 1, wherein the combining is performed using time-division multiplexing.

3. The method of claim 1, wherein the combining is performed using pulse-amplitude modulation.

4. The method of claim 1, wherein the combining is performed by a 1:2:4 weighted adding circuit, and wherein the transmit electrical signal is a PAM8 electrical signal.

5. The method of claim 1, wherein the combining is performed using a combination of time-division multiplexing and pulse-amplitude modulation.

6. The method of claim 1, wherein the first out-of-band electrical signal corresponds to the audio-video stream, and the second out-of-band electrical signal corresponds to a third out-of-band electrical signal received by the optical receiver from the optical transmitter.

7. The method of claim 1, wherein the optical communication channel is comprised of at least one optical fiber.

8. The method of claim 1, wherein the converting is performed by a laser diode.

9. The method of claim 1, wherein the first out-of-band signal and the second out-of-band signal are associated with any of an HDMI communication mode, a DP communication mode, or a DVI communication mode between the optical transmitter and the optical receiver.

10. A method comprising:
an optical transmitter receiving an optical signal from an optical receiver over an optical communication channel, the optical signal comprising a first out-of-band signal and a second out-of-band signal, wherein the first out-of-band signal and the second out-of-band signal correspond to an out-of-band signal transmission protocol included in a digital video communication standard and associated with an audio-video stream previously transmitted or concurrently being transmitted from the optical transmitter to the optical receiver, wherein the audio-video stream is distinct from each of the first out-of-band signal and the second out-of-band signal, wherein the digital video communication standard includes transmitting the audio-video stream from the optical transmitter to the optical receiver, and wherein the out-of-band signal transmission protocol includes transmitting the first and the second out-of-band signals from the optical receiver to the optical transmitter;
the optical transmitter converting the optical signal into a receive electrical signal;
the optical transmitter extracting a first out-of-band electrical signal corresponding to the first out-of-band signal and a second out-of-band electrical signal corresponding to the second out-of-band signal from the receive electrical signal; and
the optical transmitter transmitting the first out-of-band electrical signal and the second out-of-band electrical signal to a video source.

11. The method of claim 10, wherein the extracting is performed using time-division demultiplexing.

12. The method of claim 10, wherein the extracting is performed using pulse-amplitude demodulation.

13. The method of claim 12, wherein the pulse-amplitude demodulation is performed by a threshold decision device bank.

14. The method of claim 13, wherein the extracting includes decoding a decision result generated by the threshold decision device bank to generate a multi-bit output signal.

15. The method of claim 10, wherein the extracting is performed using a combination of time-division demultiplexing and pulse-amplitude demodulation.

16. The method of claim 10, wherein the first out-of-band electrical signal corresponds to the audio-video stream, and the second out-of-band electrical signal corresponds to a third out-of-band electrical signal transmitted from the optical transmitter to the optical receiver.

17. The method of claim 10, wherein the optical communication channel is comprised of at least one optical fiber.

18. The method of claim 10, wherein the converting is performed by a photodetector.

19. The method of claim 10, wherein the first out-of-band signal and the second out-of-band signal are associated with any of an HDMI communication mode, a DP communication mode, or a DVI communication mode between the optical transmitter and the optical receiver.

20. The method of claim 1, further comprising linearly amplifying the receive electrical signal prior to the extracting.

21. An optical receiver comprising:
an electrical interface configured to receive a first out-of-band electrical signal and a second out-of-band electrical signal from a video sink at an optical receiver, wherein the first out-of-band electrical signal and the second out-of-band electrical signal correspond to an out-of-band signal transmission protocol included in a digital video communication standard and are associated with an audio-video stream previously received or concurrently being received from a video source optical transmitter by the optical receiver, wherein the audio-video stream is distinct from each of the first out-of-band electrical signal and the second out-of-band electrical signal, wherein the digital video communication standard includes transmitting the audio-video stream from the optical transmitter to the optical receiver, and wherein the out-of-band signal transmission protocol includes transmitting first and the second the out-of-band signals from the optical receiver to the optical transmitter;
a modulation circuit configured to combine the first out-of-band electrical signal and the second out-of-band electrical signal into a transmit electrical signal; and
an electro-optical conversion circuit configured to:
convert the transmit electrical signal into an optical signal; and
transmit the optical signal to an optical transmitter via an optical communication channel.

22. An optical transmitter comprising:
a photoelectric conversion circuit configured to:
receive an optical signal from an optical receiver over an optical communication channel, the optical signal comprising a first out-of-band signal and a second out-of-band signal, wherein the first out-of-band signal and the second out-of-band signal correspond to an out-of-band signal transmission protocol included in a digital video communication standard and associated with an audio-video stream previously transmitted or concurrently being transmitted from the optical transmitter to the optical receiver, wherein the audio-video stream is distinct from each of the first out-of-band signal and the second out-of-band signal, wherein the digital video communication standard includes transmitting the audio-video stream from the optical transmitter to the optical receiver, and wherein the out-of-band signal transmission protocol includes transmitting the first and the second out-of-band signals from the optical receiver to the optical transmitter; and
convert the optical signal into a receive electrical signal; and
a demodulation circuit configured to:
extract a first out-of-band electrical signal corresponding to the first out-of-band signal and a second out-of-band electrical signal corresponding to the second out-of-band signal from the receive electrical signal; and
transmit the first out-of-band electrical signal and the second out-of-band electrical signal to a video source.

* * * * *